US009680538B2

(12) United States Patent
Xia et al.

(10) Patent No.: US 9,680,538 B2
(45) Date of Patent: Jun. 13, 2017

(54) METHOD FOR WIFI BEAMFORMING, FEEDBACK, AND SOUNDING (WIBEAM)

(71) Applicant: INTERDIGITAL PATENT HOLDINGS, INC., Wilmington, DE (US)

(72) Inventors: Pengfei Xia, San Diego, CA (US); Monisha Ghosh, Chappaqua, NY (US); Hanqing Lou, Mineola, NY (US); Robert L. Olesen, Huntington, NY (US); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/040,249

(22) Filed: Sep. 27, 2013

(65) Prior Publication Data

US 2014/0093005 A1    Apr. 3, 2014

Related U.S. Application Data

(60) Provisional application No. 61/707,452, filed on Sep. 28, 2012, provisional application No. 61/770,879, (Continued)

(51) Int. Cl.
| | |
|---|---|
| *H04B 7/04* | (2006.01) |
| *H04B 7/06* | (2006.01) |
| *H04L 1/00* | (2006.01) |

(52) U.S. Cl.
CPC .......... *H04B 7/0421* (2013.01); *H04B 7/066* (2013.01); *H04B 7/0617* (2013.01);
(Continued)

(58) Field of Classification Search
CPC .......... H04B 1/40; H04B 3/23; H04L 1/0618; H04L 5/0007; H04L 27/2647; H04W 28/04
See application file for complete search history.

(56) References Cited

U.S. PATENT DOCUMENTS

| | | | |
|---|---|---|---|
| 2001/0033622 A1 | 10/2001 | Joengren et al. | |
| 2006/0291544 A1* | 12/2006 | Fischer | H04B 7/0617 375/219 |

(Continued)

FOREIGN PATENT DOCUMENTS

| | | |
|---|---|---|
| CN | 101151816 A | 3/2008 |
| CN | 101388699 A | 3/2009 |
| WO | WO 2012/058327 A1 | 5/2012 |

OTHER PUBLICATIONS

Chen et al., "MAC and PHY Proposal for 802.11af," IEEE 802.11-10/0258r0 (Mar. 2010).

(Continued)

*Primary Examiner* — Leon-Viet Nguyen
(74) *Attorney, Agent, or Firm* — Condo Roccia Koptiw LLP

(57) ABSTRACT

Methods for WiFi beamforming, feedback, and sounding (WiBEAM) are described. Codebook based beamforming feedback signaling and sounding mechanisms for use in wireless communications are disclosed. The methods described herein improve the feedback efficiency by using Givens rotation based decompositions and quantizing the resulting angles of the Givens rotation based decompositions using a range from a subset of [0, 2π]. Feedback may also be divided into multiple components to improve feedback efficiency/accuracy. Time domain beamforming reports for taking advantage of channel reciprocity while still taking into account practical radio frequency (RF) channel impairments are also described. Beamforming feedback that pri-
(Continued)

oritizes the feedback bits in accordance with the significance of the bits is also disclosed. A preamble structure to enable the use of smoothing methods for improved channel estimation, codebook designs that may be used for codebook based beamforming feedback, and multi-resolution explicit feedback are disclosed as well.

20 Claims, 34 Drawing Sheets

Related U.S. Application Data filed on Feb. 28, 2013, provisional application No. 61/783,918, filed on Mar. 14, 2013.

(52) U.S. Cl.
CPC ......... *H04B 7/0628* (2013.01); *H04B 7/0634* (2013.01); *H04B 7/0639* (2013.01); *H04B 7/0641* (2013.01); *H04L 1/007* (2013.01); *H04L 1/0073* (2013.01)

(56) References Cited

U.S. PATENT DOCUMENTS

| | | | |
|---|---|---|---|
| 2007/0213013 A1 | 9/2007 | Kim | |
| 2009/0080546 A1 | 3/2009 | Zhao et al. | |
| 2010/0284351 A1 | 11/2010 | Liang et al. | |
| 2011/0116579 A1 | 5/2011 | Kim et al. | |
| 2012/0033592 A1* | 2/2012 | Kim | H04B 7/0452 370/310 |
| 2012/0243492 A1* | 9/2012 | Muharemovic | H04L 1/1671 370/329 |
| 2012/0269281 A1* | 10/2012 | Kim | H04B 7/0417 375/267 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D2.0 (Jul. 2012).
Erceg et al., "TGn Channel Models," IEEE P802.11 Wireless LANs, IEEE 802.11-03/940r4 (May 2004).
Halasz, "Sub 1 GHz license-exempt PAR and 5C," IEEE P802.11, Wireless LANs, IEEE 802.11-10/0001r13.
IEEE P802.11ac/D3.1, Draft Standard for Information Technology—Telecommunications and information exchange between systems—Local and metropolitan area networks—Secific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D3.1 (Aug. 2012).
IEEE P802.11ad/D8.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad/D8.0 (May 2012).
IEEE Standard for Information technology—Telecommunications and information exchange between systems—Local and Metropolitan area networks—Specific requirements; Part 11: Wireless LAN Medium Access Control (MAC) and Physical Layer (PHY) Specifications, IEEE Std. 802.11-REVmb/D12 (Nov. 2011).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 7: Extensions to Direct-Link Setup (DLS), IEEE 802.11z-2010 (Oct. 14, 2010).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 2005).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Ikram et al., "Closed Loop MIMO Pre-Coding using Givens Rotation," IEEE 802.16 Broadband Wireless Access Working Group, IEEE C802.16e-04/516r3 (Jan. 24, 2005).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.5.0 (Jun. 2012).
Third Generation Partnership Project, "Technical Specification Group Radio Access Network;Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.4.0 (Sep. 2013).
Wong et al., "Proposed TGah Draft Amendment," IEEE 802.11-13/0500r0 (May 2013).
Yuen et al., "Beamforming Matrix Quantization with Variable Feedback Rate", IEEE, 19th International Symposium on Personal, Indoor, and Mobile Radio Communications, Sep. 2008, 5 pages.
Horn, et al., "Matrix Analysis", Cambridge University Press, New York, 1985, 2013, 18 pages.

* cited by examiner

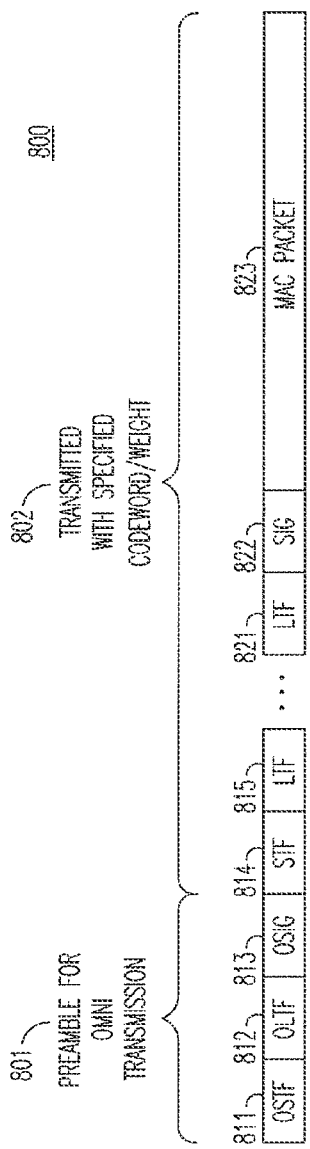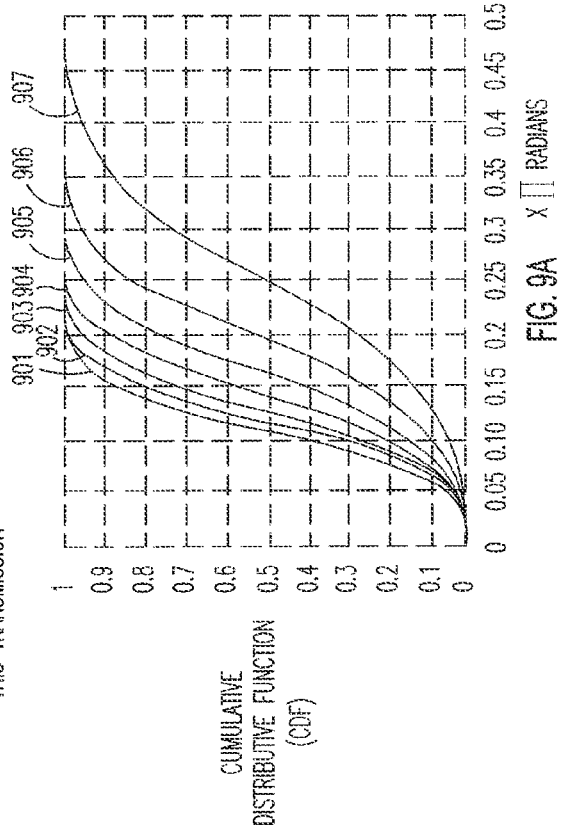

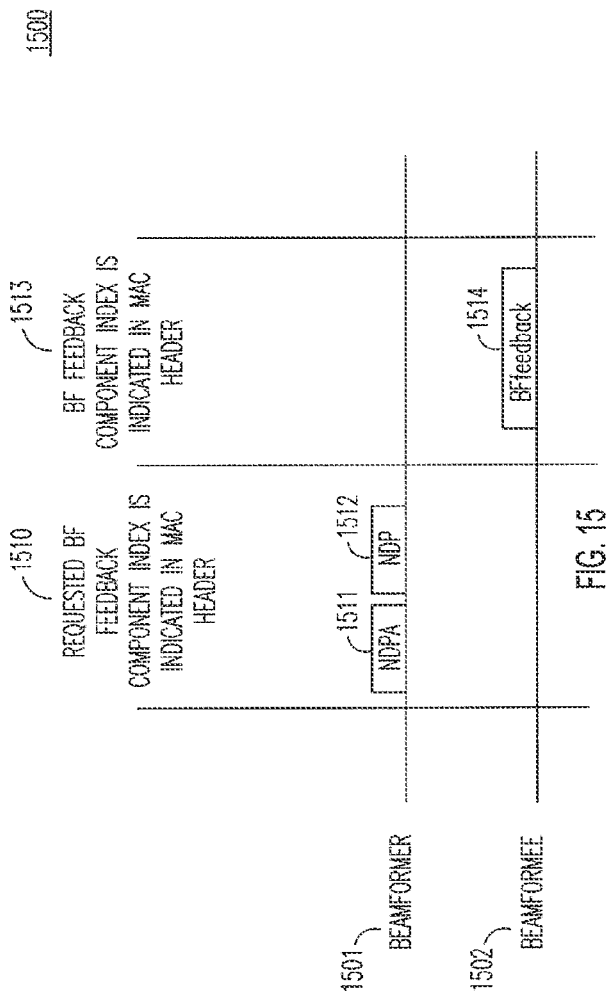
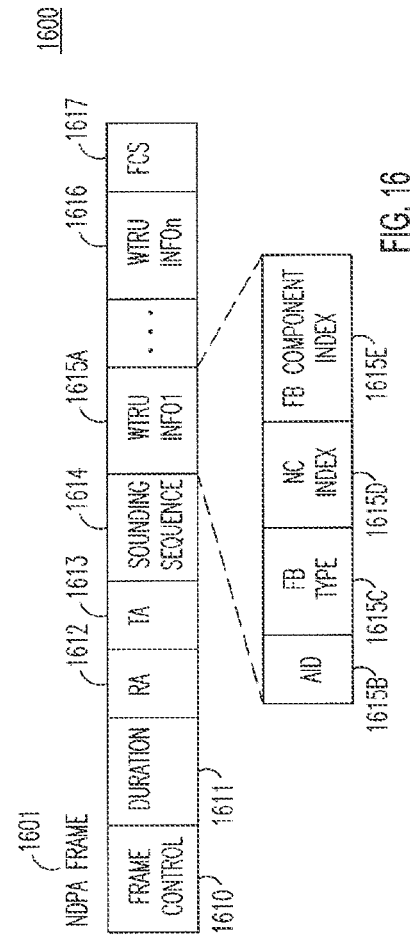

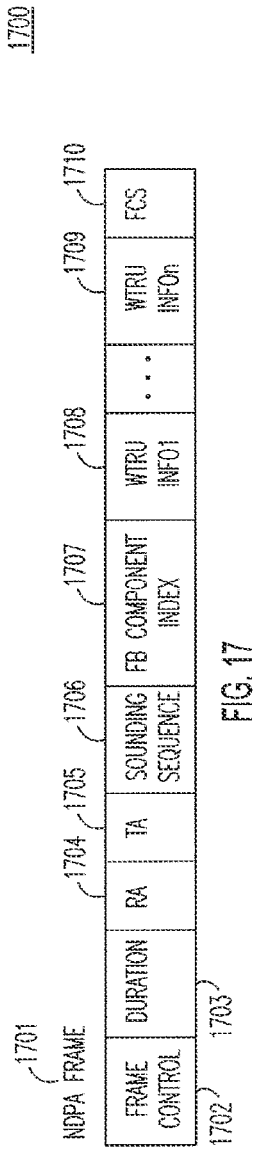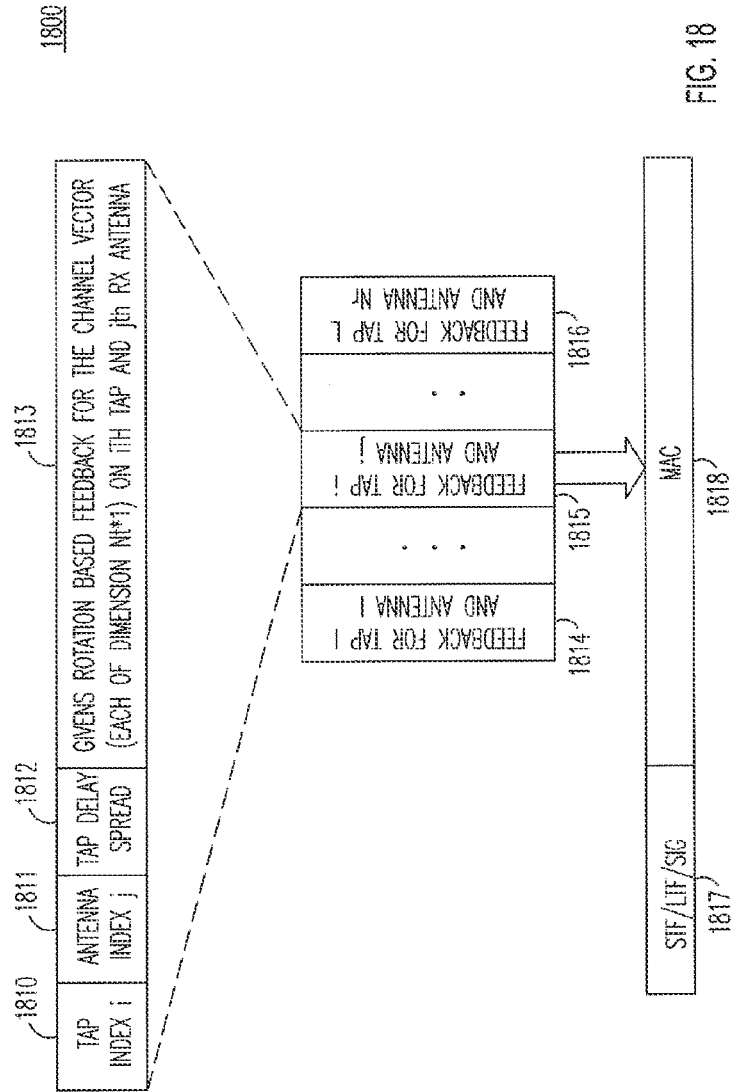

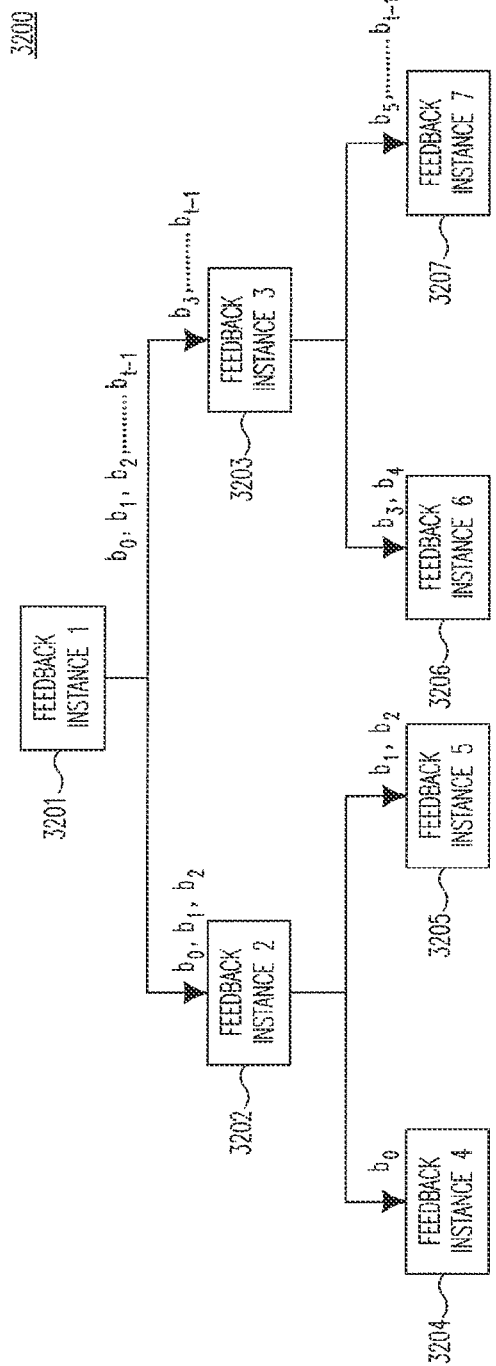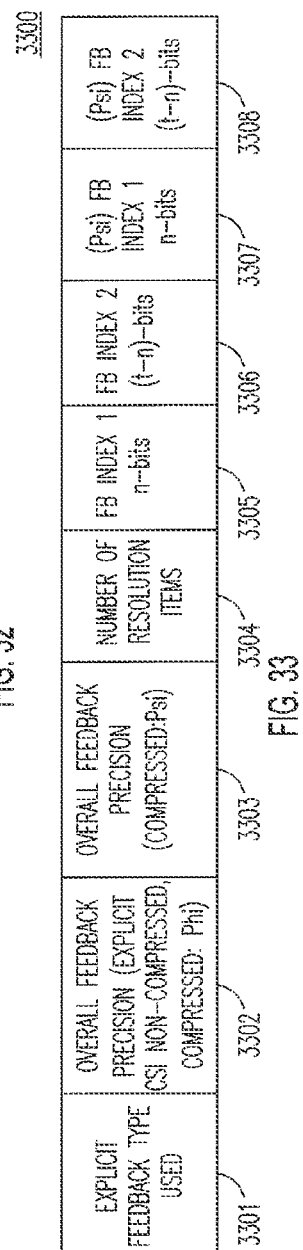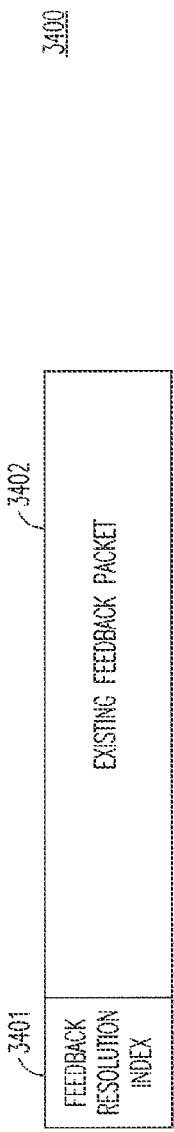

FIG. 35

| Nc INDEX | Nr INDEX | Fb RESOLUTION INDEX | CHANNEL WIDTH | GROUPING | CODEBOOK INFORMATION | FEEDBACK TYPE | REMAINING SEGMENT | FIRST SEGMENT | RESERVED | SOUNDING SEGMENT |
|---|---|---|---|---|---|---|---|---|---|---|
| 3501 | 3502 | 3503 | 3504 | 3505 | 3506 | 3507 | 3508 | 3509 | 3510 | 3511 |

3500

---

SINGLE-RESOLUTION FEEDBACK PACKET GIVENS-ROTATION-BASED FB — 3601

| PREAMBLE | MAC HEADER | VHT MIMO CTRL | COMPRESSED BEAMFORMING REPORT (CBR) 5-BITS FOR Phi (EACH) | COMPRESSED BEAMFORMING REPORT (CBR) 7-BITS FOR Psi (EACH) |
|---|---|---|---|---|
| 3611 | 3612 | 3613 | 3614 | 3615 |

MULTI-RESOLUTION FEEDBACK PACKET GIVENS-ROTATION-BASED FB — 3602

| PREAMBLE | MAC HEADER | VHT MIMO CTRL + FB ELEMENT INDEX 1 | COMPRESSED BEAMFORMING REPORT (CBR) 2-BITS FOR Phi (EACH) | COMPRESSED BEAMFORMING REPORT (CBR) 3-BITS FOR Psi (EACH) |
|---|---|---|---|---|
| 3621 | 3622 | 3623 | 3624 | 3625 |

| PREAMBLE | MAC HEADER | VHT MIMO CTRL + FB ELEMENT INDEX 2 | COMPRESSED BEAMFORMING REPORT (CBR) 3-BITS FOR Phi (EACH) | COMPRESSED BEAMFORMING REPORT (CBR) 4-BITS FOR Psi (EACH) |
|---|---|---|---|---|
| 3631 | 3632 | 3633 | 3634 | 3635 |

FIG. 36B

METHOD FOR WIFI BEAMFORMING, FEEDBACK, AND SOUNDING (WIBEAM)

CROSS REFERENCE TO RELATED APPLICATIONS

This application claims the benefit of U.S. Provisional Application Ser. No. 61/707,452 filed Sep. 28, 2012, U.S. Provisional Application Ser. No. 61/770,879 filed Feb. 28, 2013, and U.S. Provisional Application Ser. No. 61/783,918 filed Mar. 14, 2013, the contents of which are hereby incorporated by reference herein.

BACKGROUND

Current wireless local area network (WLAN) systems such as IEEE 802.11n, IEEE 802.11ac, and IEEE 802.11ad support multiple transmit antennas at both the transmitter (Tx) and the receiver (Rx). Multiple transmit and receive antennas are supported in access points (APs), wireless transmit/receive units (WTRU), and other non-WTRU devices. For example, 802.11n supports up to 4 transmit and 4 receive antennas, while 802.11ac supports up to 8 transmit and 8 receive antennas. For such systems, transmit beamforming (also referred to as "precoding") may be used to improve the coverage area and/or throughput.

For transmit beamforming the transmitter may need to acquire channel state information (CSI) of the channel (e.g. amplitude/phase) prior to transmission, using channel reciprocity and/or CSI feedback. The actual transmit beamforming coefficients are then derived as a function of the channel state information. The more accurate the transmitter-side CSI is, the more beneficial transmit beamforming may be.

It is anticipated that a requirement of future WLAN specifications may be higher spectral efficiency than is currently available. Also, systems which support a large number of meter type control (MTC) devices may require an improvement in BSS capacity. Several general issues may be hindrances to achieving higher spectral efficiencies and capacity. Current beamforming report methods lead to significant feedback overhead, thereby reducing spectral efficiency and BSS capacity. Therefore there is a need for improved methods for beamforming, feedback, and sounding.

SUMMARY

Methods for WiFi beamforming, feedback, and sounding (WiBEAM) are described. Codebook based beamforming feedback signaling and sounding mechanisms for use in wireless communications are disclosed. The methods described herein improve the feedback efficiency by using Givens rotation based decompositions and quantizing the resulting angles of the Givens rotation based decompositions using a range from a subset of [0, 2π]. Feedback may also be divided into multiple components to improve feedback efficiency/accuracy. Time domain beamforming reports for taking advantage of channel reciprocity while still taking into account practical radio frequency (RF) channel impairments are also described. Beamforming feedback that prioritizes the feedback bits in accordance with the significance of the bits is also disclosed. Hybrid explicit/implicit feedback is also disclosed. Feedback improvements are described which prioritize feedback bits with different priorities. Different modulation coding scheme (MCS) levels may be used to better utilize the feedback radio resources. A preamble structure to enable the use of smoothing methods for improved channel estimation, codebook designs that may be used for codebook based beamforming feedback, and multi-resolution explicit feedback are disclosed as well.

BRIEF DESCRIPTION OF THE DRAWINGS

A more detailed understanding may be had from the following description, given by way of example in conjunction with the accompanying drawings wherein:

FIG. 8 is an example PPDU format of the data packet transmitted during MU-MIMO protection/monitoring period;

FIG. 9A is an illustration of the CDF for different angles after Givens rotations;

FIG. 15 is an example of a sounding and multi component BF feedback procedure;

FIG. 16 is an example of inserting a BF feedback component index to each WTRU info field of the NDPA frame;

FIG. 17 is an example of inserting a BF feedback component index to the NDPA frame;

FIG. 18 is an illustration of feedback of multipath taps using Givens rotation based feedback;

FIG. 32 is an example of a hierarchical feedback representation;

FIG. 33 is an illustration of multi-resolution MAC signaling from an AP to a WTRU;

FIG. 34 is an illustration of additional feedback signaling used to indicate the feedback index of the current feedback packet;

FIG. 35 is an example of a modified VHT MIMO control field;

FIG. 36A is an example of single resolution feedback packets using compressed beamforming;

FIG. 36B is an example of multi-resolution feedback packets using compressed beamforming.

DETAILED DESCRIPTION

Figure 1A:
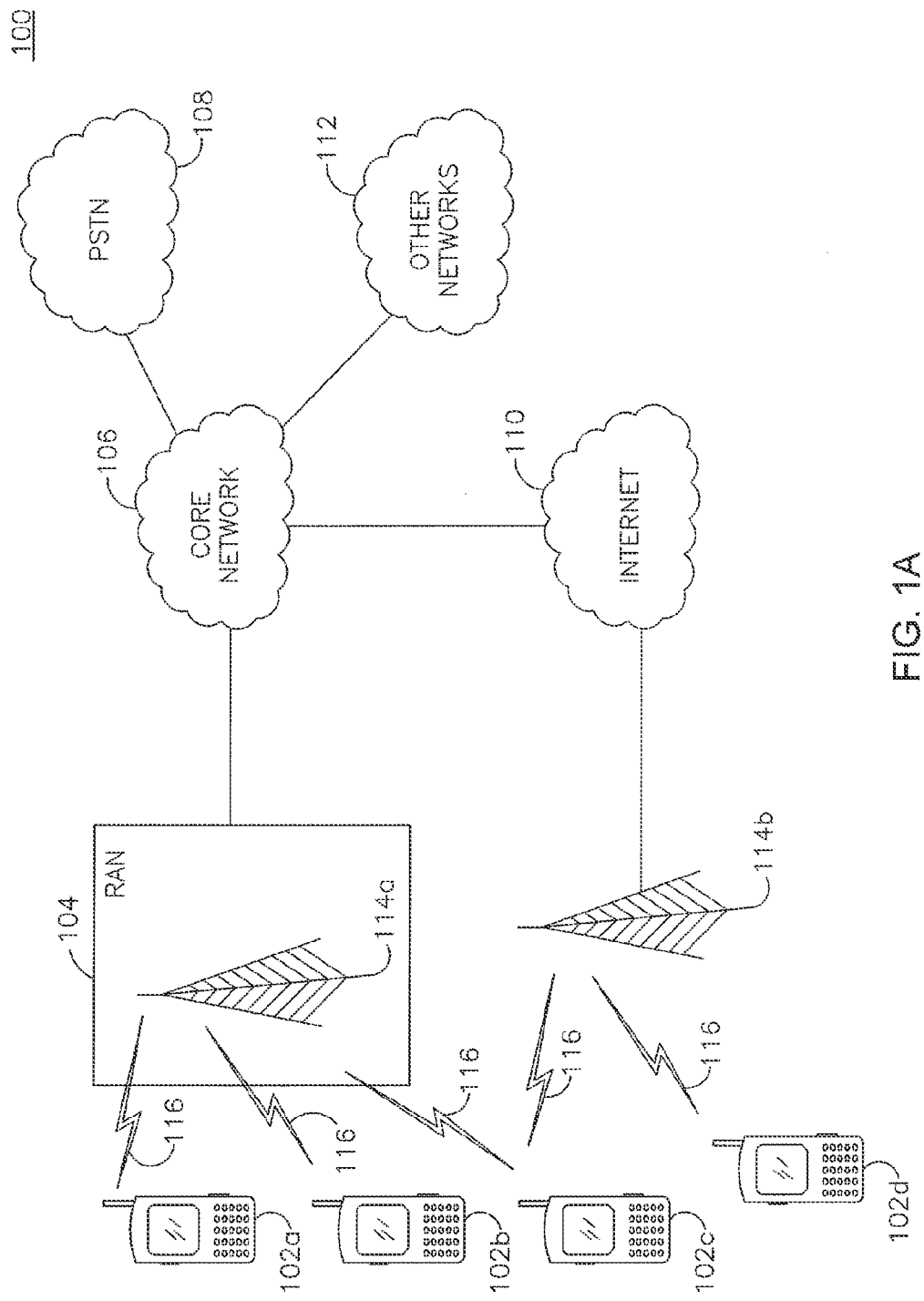
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
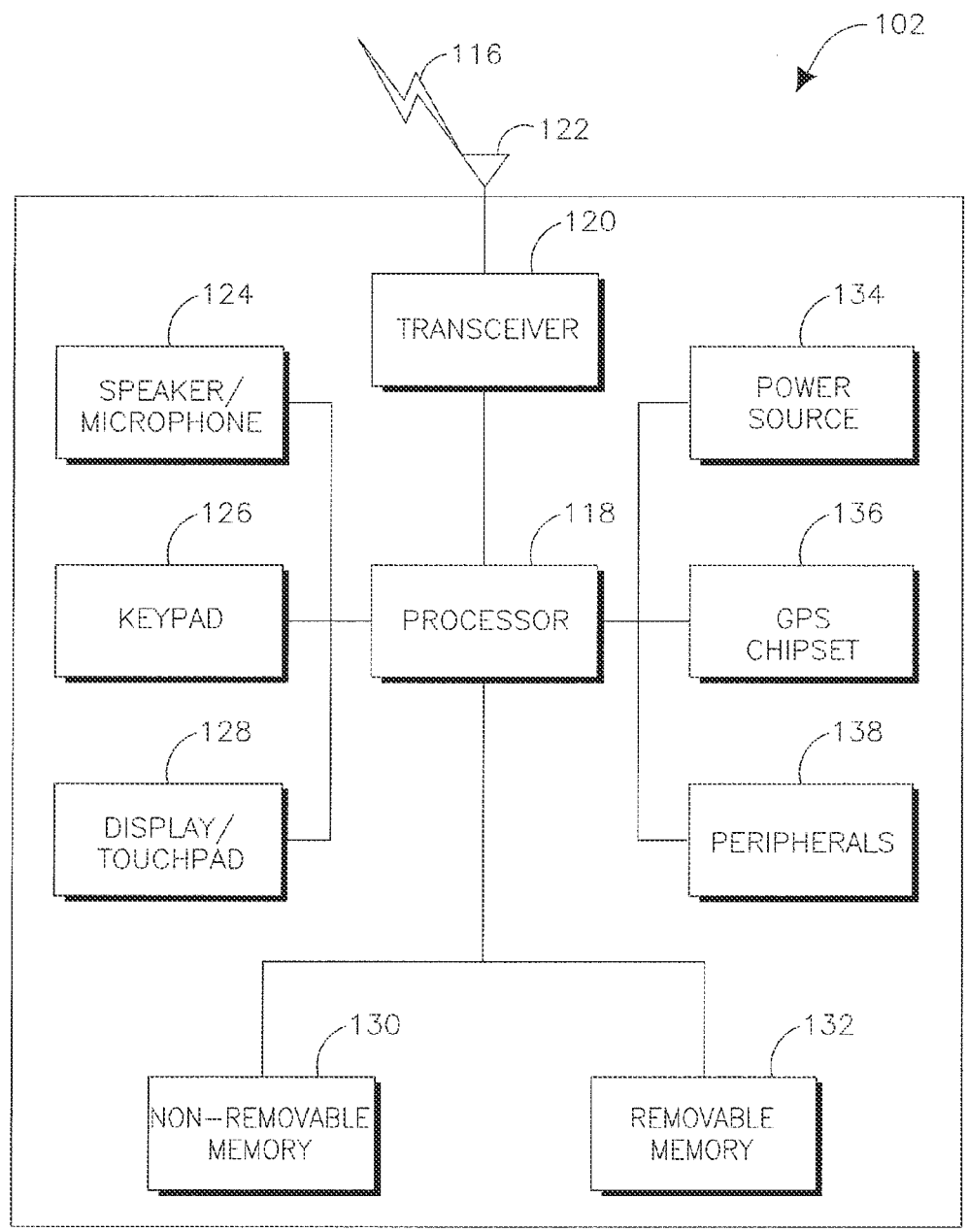
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
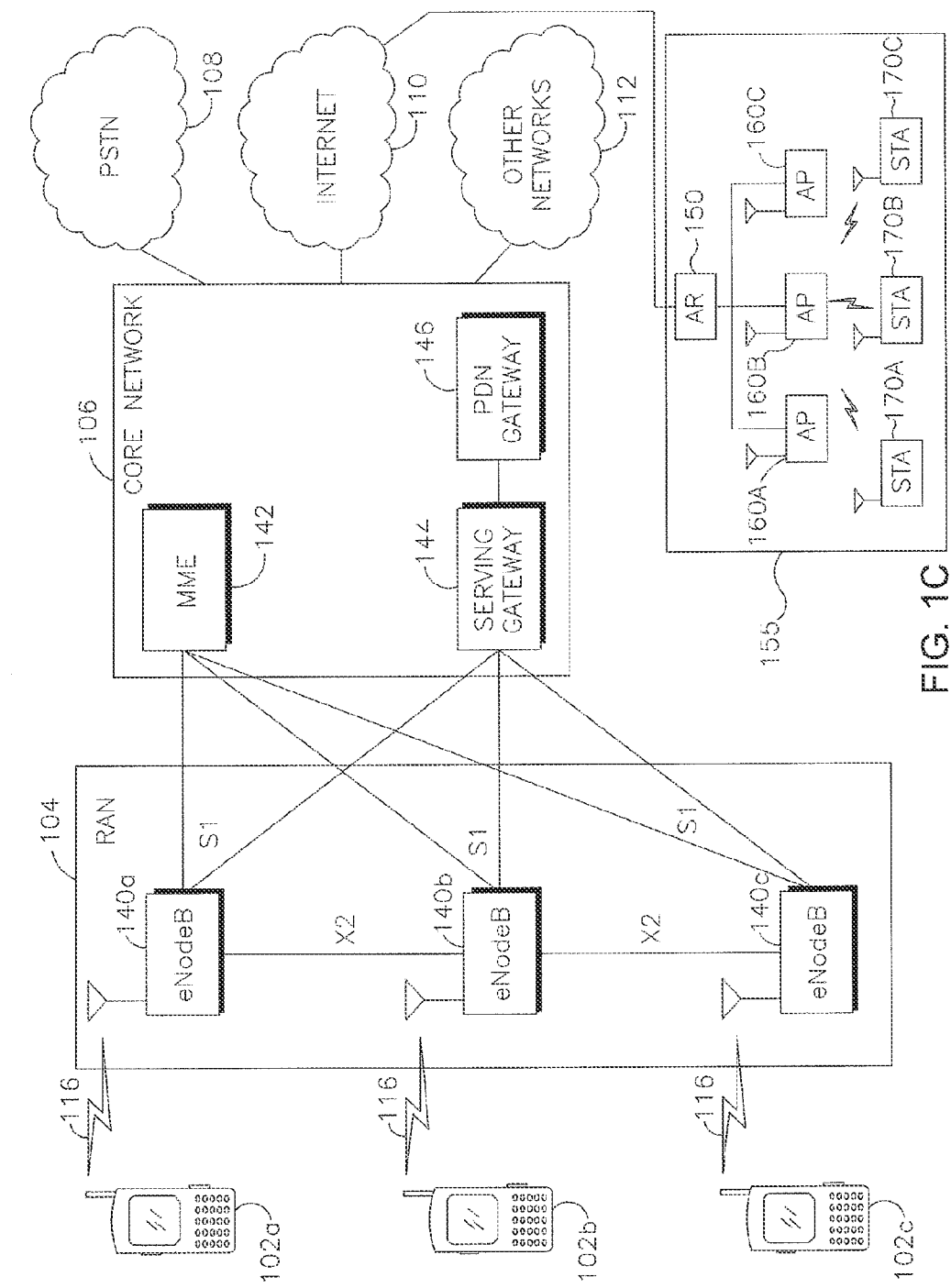
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A WLAN in Infrastructure Basic Service Set (BSS) mode has an Access Point (AP) for the BSS and one or more WTRUs associated with the AP. The AP typically has access or an interface to a Distribution System (DS) or another type of wired/wireless network that carries traffic in and out of the BSS. Traffic to WTRUs that originates from outside the BSS arrives through the AP and is delivered to the WTRUs. Traffic originating from WTRUs to destinations outside the BSS is sent to the AP to be delivered to the respective destinations. Traffic between WTRUs within the BSS may also be sent through the AP where the source WTRU sends traffic to the AP, and the AP delivers the traffic to the destination WTRU. Such traffic between WTRUs within a BSS is peer-to-peer traffic. Such peer-to-peer traffic may also be sent directly between the source and destination WTRUs with a direct link setup (DLS) using an 802.11e DLS or an 802.11z tunneled DLS (TDLS). A WLAN using an Independent BSS (IBSS) mode has no AP, and/or WTRUs, communicating directly with each other. This mode of communication is referred to as an "ad-hoc" mode of communication.

Using the 802.11ac infrastructure mode of operation, the AP may transmit a beacon on a fixed channel, which is usually the primary channel. This channel may be 20 MHz wide, and is the operating channel of the BSS. This channel is also used by the WTRUs to establish a connection with the AP. The fundamental channel access mechanism in an 802.11 system is Carrier Sense Multiple Access with Collision Avoidance (CSMA/CA). In this mode of operation, every WTRU, including the AP, will sense the primary channel. If the channel is detected to be busy, the WTRU backs off. Hence only one WTRU may transmit at any given time in a given BSS.

In 802.11ac, Very High Throughput (VHT) WTRUs may support 20 MHz, 40 MHz, 80 MHz, and 160 MHz wide channels. The 40 MHz, and 80 MHz, channels may be formed by combining contiguous 20 MHz channels similar to in 802.11n described above. For example, a 160 MHz channel may be formed either by combining 8 contiguous 20 MHz channels, or by combining two non-contiguous 80 MHz channels, which may also be referred to as an 80+80 configuration. For the 80+80 configuration, the data, after channel encoding, is passed through a segment parser that divides it into two streams. Inverse Fast Fourier Transform (IFFT), and time domain, processing may be done on each stream separately. The streams may then be mapped on to the two channels, and the data is transmitted. At the receiver, this mechanism is reversed, and the combined data is sent to the MAC.

Sub 1 GHz modes of operation are supported by 802.11af, and 802.11ah. For these specifications the channel operating bandwidths are reduced relative to those used in 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but they also include a requirement for a very long battery life.

WLAN systems which support multiple channels, and channel widths, such as 802.11n, 802.11ac, 802.11af, and 802.11ah, include a channel which is designated as the primary channel. The primary channel may, but not necessarily, have a bandwidth equal to the largest common operating bandwidth supported by all WTRUs in the BSS. The bandwidth of the primary channel is therefore limited by the WTRU out of all WTRUs operating in a BSS, which supports the smallest bandwidth operating mode. In the example of 802.11ah, the primary channel may be 1 MHz wide if there are WTRUs (e.g. MTC type devices) that only support a 1 MHz mode even if the AP, and other WTRUs in the BSS may support a 2 MHz, 4 MHz, 8 MHz, 16 MHz, or other channel bandwidth operating modes. All carrier sensing, and NAV settings, depend on the status of the primary channel. When the primary channel is busy, for example, due to a WTRU supporting only a 1 MHz operating mode transmitting to the AP, then the all available frequency bands are considered busy even though majority of them are idle and available.

In the United States, the available frequency bands which may be used by 802.11ah range from 902 MHz to 928 MHz. In Korea the frequency bands range from 917.5 MHz to 923.5 MHz; and in Japan the frequency bands range from 916.5 MHz to 927.5 MHz. The total bandwidth available for 802.11ah is 6 MHz to 26 MHz depending on the country code.

Current WLAN systems include 802.11n/ac and 802.11ad. These systems support multiple transmit antennas at both the transmitter (Tx), and receiver (Rx) including WTRU, and non-WTRU devices. For example, 802.11n supports up to 4 transmit and 4 receive antennas, and 802.11ac supports up to 8 transmit and 8 receive antennas. For such systems, transmit beamforming (precoding) may be used to improve the coverage area, throughput, or both.

For transmit beamforming (precoding), the transmitter may need to acquire Channel State Information (CSI) of the channel (e.g. amplitude/phase) prior to transmission, using either channel reciprocity, CSI feedback, or both. The actual transmit beamforming (precoding) coefficients may then be derived as a function of the channel state information. The more accurate the transmitter-side channel state information is, the more beneficial transmit beamforming (precoding) may be.

One issue in beamforming feedback is that the feedback has an excessively large overhead. The feedback information may be in the form of angles which when taken as a matrix V represent a compressed beamforming feedback report to the AP. Scalar quantization may be used to quantize the angles, which may be continuously distributed within a set of finite predetermined values. Note that quantization may be done such that the difference between the quantized and unquantized values is minimized. The scalar quantization operation may be extended directly for complex values, where the same scalar quantization may be carried out for the real part and imaginary part separately. In contrast to scalar quantization, vector quantization may be defined as the operation of quantizing a vector (real or complex) to one of a finite number of predetermined vectors, where the quantized vector may be selected to be closest to the unquantized vector, e.g. in the sense of minimizing the angle separation between the two vectors.

Quantization of the singular vectors V may be done in a scalar quantization fashion. In particular, any semi-unitary matrix V of size $N_t*N_r$ may be decomposed as a series of Givens rotations and diagonal rotations. Every diagonal rotation may be parameterized by an angle θ which may be used to make complex entries real. Every Givens rotation may be parameterized by an angle ψ which is used to make off-diagonal entries zero. Using this approach, the number of different angles to parameterize the entire $N_t*N_r$ semi-unitary matrix V is $(2*N_r*N_t-N_t*N_t)$, half of which are θ's, and half of which are ψ's. Nf may be defined as the number of subcarrier (groups), and Nb may be defined as the number of bits for each angle on average (note that number of bits for θ and ψ may be different). Then the total number of feedback bits may be $(2*N_r*N_t-N_t*N_t)*N_f*N_b$ in total. Such a scalar quantization scheme may incur an excessively large feedback overhead, especially when used for a large number of antenna elements. More efficient quantization methods, as described in the various embodiments that follow, may be used to reduce the feedback overhead for these occurrences.

Scalar quantization may be based on Givens rotations where the right singular matrix V is first processed to extract multiple angles, which are then quantized separately. In this method every angle θ may be used to make the complex entries real, and every angle ψ may be used to make off-diagonal entries in the matrix zero. It may be assumed that all ψ's are independent, and distributed evenly (uniformly) within the range of [0, π/2]. As an alternative, the numerical analyses described herein may show that different ψ's are in fact not evenly distributed within the same range. In particular, angles associated with earlier Givens rotations span wider ranges relative to angles associated with later Givens rotations. Such an observation may be used either to reduce feedback overhead or to improve feedback accuracy. The methods and apparatuses described herein may reduce this overhead and improve accuracy.

Indoor and outdoor wireless channels may demonstrate very different behavior. Generally, indoor wireless channels experience more reflections, and scattering due to walls, ceiling, and flooring. In indoor environments, typically the AP and WTRU are positioned at approximately the same height, which may be several feet. Conversely, for outdoor channel environments, an AP may be placed above the WTRU. Indoor wireless channels experience very slow fading with much less Doppler. However the outdoor wireless channel may experience a much higher Doppler, due in part to the opportunity for fast moving objects to be nearby. Another factor that needs to be taken into account is the carrier frequency, where a higher frequency typically sees a bigger path loss and a lower carrier frequency sees a smaller path loss. The beamforming (precoding) feedback methods described herein may be applied efficiently to other environments.

Frequency domain feedback also leads to excessively large overhead. Orthogonal frequency division multiplexing (OFDM) may be used in wireless communication systems. OFDM is a form of multi-carrier modulation, in contrast to single carrier modulation. In OFDM, the underlying channel may be represented either in the time domain or frequency domain. In the time domain, the underlying channel may be represented by multiple (Nc) taps, which convolves with the transmitted signals. In the multiple-input multiple-output (MIMO) scenario, the complete channel in the time domain may be specified by Nc*Nr*Nt complex coefficients where Nr is number of receive antennas and Nt is number of transmit antennas. In the frequency domain, the underlying channel may be represented by multiple (Nf) frequency tones, which multiplies with the transmitted signal. In the MIMO scenario, the complete channel in the frequency domain may be specified by Nf*Nr*Nt complex coefficients. Feedback of the channel state information may be done in the frequency domain. For each subcarrier (or subcarrier group), the frequency domain channels may be estimated first. Quantization may then be used to map the frequency domain channel into a finite number of feedback bits, sent over the feedback channel. Typically, Nf is much larger than Nc, and as a result frequency domain feedback incurs significantly larger feedback overhead. The methods and apparatuses described herein may reduce this overhead.

Left singular vectors may not be included in a compressed beamforming report. H may be defined as the frequency domain channel matrix on one subcarrier in the frequency domain. Once channel estimation is done, knowledge of H may be acquired. Quantization of H into finite bits may be done next. One approach may be to quantize the matrix H directly, and another may be to quantize one of its components after singular value decomposition (SVD). For an arbitrary matrix H of size Nr*Nt, its SVD may be represented as H=U*S*V', where U is a unitary matrix of size Nr*Nr, S is a diagonal matrix of size Nr*Nr, V is a semi-unitary matrix of size Nt*Nr (V'*V=I). Without loss of generality, Nt>=Nr is assumed herein. Diagonal entries of S are known as singular values; U is also known as left singular matrix, and columns of U are known as left singular vectors; V is also known as right singular matrix, and columns of V are known as right singular vectors. In particular, the largest diagonal value of S (the first row first column entry of S) is also known as principal singular value, the first column of U is also known as left principal singular vector, and the first column of V is also known as right principal singular vector. When only the singular values S and right singular vectors V are fed back to the transmitter, performance loss may occure, e.g. in multi-user multi-input multi-output (MU-MIMO). The methods and apparatuses described herein may prevent performance loss.

In creating a compressed beamforming report, the right singular matrix on each subcarrier (group) may first decomposed into a number of unitary matrices, where each matrix may be represented by a parameter $\Phi$ (within the range of [0, $2\pi$]) or $\Phi$ (within the range of [0, $\pi/2$]). Each angle may then be quantized uniformly within its own range. The beamforming report may be created angle after angle and meanwhile for each angle, the binary bit representations are transmitted least significant bits (LSB) to most significant bits (MSB). All bits may be placed in the same frame (segment) and transmitted using the same Modulation and Coding Scheme (MCS). Furthermore, a single Cyclic Redundancy Check (CRC) per frame may be applied to all the feedback bits (within a segment). However, a transmitter may not be able to determin if some MSBs failed or some LSB failed, and may then discard the entire beamforming report. Had the transmitter had this information, different actions may be taken at the transmitter to better utilize the feedback channel resource. The methods and apparatuses described herein may lead to better resource utilization.

Applying the beamforming precoding matrix at the transmitter to both the LTFs and data may allow the receiver to estimate the composite channel (physical channel+precoder) directly, without smoothing methods, such as least-squares, to improve the quality of the channel estimate. As a result the receiver has to perform zero-forcing channel estimation. This may lead to performance degradation, especially for low delay spread channels that may benefit from smoothing. The methods and apparatuses described herein may prevent performance loss.

Channel state information (CSI) may be used at the transmitter side for MU-MIMO grouping and transmission. Inaccurate CSI may cause performance loss. This may be more severe for MU-MIMO transmission since it is very sensitive to precoder weight for MU-MIMO transmissions. Extra protection mechanisms for MU-MIMO are described herein to avoid this performance loss.

Scenarios also exist where there may be a limited uplink channel capacity available for feedback (for example, a network with a large number of static nodes) or in which the change in the channel is a fraction of the overall channel energy (for example a strong Ricean channel in which the varying Rayleigh part of the channel has very low power). In both scenarios, the number of bits used to quantize the feedback channel (whether raw CSI feedback, non-compressed beamforming weights or Givens rotation based decomposition compressed beamforming feedback) may be reduced. However, this may diminish the accuracy of the channel that is fed back and may degrade the performance of schemes sensitive to CSI feedback errors such as MU-MIMO. The explicit feedback mechanisms may be used to reduce the feedback overhead and still maintain feedback accuracy.

Transmit beamforming inherently requires channel state information at the transmitter side, either through implicit feedback or explicit feedback. Hence, the beamforming report may be closely linked with the underlying channel. How the beamforming report is designed may be based on how the channel behaves (e.g. how fast it changes in the time domain and frequency domain, how correlated the channel is in the spatial domain, what kind of antennas are used physically at the transmitter and receiver).

The MIMO channel matrix H for each tap at one instance of time may be separated into a fixed line-of-sight (LOS) matrix and a Rayleigh distributed non-line-of-sight (NLOS) matrix (using a 4 transmit and 4 receive antennas example here):

$$H = \sqrt{P}\left(\sqrt{\frac{K}{K+1}} H_F + \sqrt{\frac{1}{K+1}} H_v\right) = \quad \text{Equation 1}$$

$$\sqrt{P}\left(\sqrt{\frac{K}{K+1}}\begin{bmatrix} e^{j\phi_{11}} & e^{j\phi_{12}} & e^{j\phi_{13}} & e^{j\phi_{14}} \\ e^{j\phi_{21}} & e^{j\phi_{22}} & e^{j\phi_{23}} & e^{j\phi_{24}} \\ e^{j\phi_{31}} & e^{j\phi_{32}} & e^{j\phi_{33}} & e^{j\phi_{34}} \\ e^{j\phi_{41}} & e^{j\phi_{42}} & e^{j\phi_{43}} & e^{j\phi_{44}} \end{bmatrix} + \sqrt{\frac{1}{K+1}}\begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix}\right)$$

where $X_{ij}$ (i-th receiving and j-th transmitting antenna) are correlated zero-mean, unit variance, complex Gaussian random variables as coefficients of the variable NLOS (Rayleigh) matrix $H_V$, $e^{j\Phi_{ij}}$ are the elements of the fixed LOS matrix $H_F$, K is the Ricean K-factor, and P is the power of each tap. It is assumed that each tap consists of a number of individual rays so that the complex Gaussian assumption may be valid. P in Equation 1 represents the sum of the fixed LOS power and the variable NLOS power (sum of powers of all taps).

Nt transmit antennas and 1 receive antenna may be used as an example. The LOS component may be represented as:

$$P_{LOS} = \begin{bmatrix} 1 \\ e^{j\theta_{1,1}} \\ e^{j\theta_{2,1}} \\ e^{j\theta_{3,1}} \\ \vdots \\ e^{j\theta(N_t-1),1} \end{bmatrix} \quad \text{Equation 2}$$

In general, different $\theta_{ij}$'s are independent of each other to account for an arbitrary antenna array setup. Scalar quantization may be used to quantize each $\theta_{ij}$ separately. Each angle $\theta_{ij}$ may fall in the range of [0,2πc]. Fine tuning of the range may be possible, depending on the channel modeling. To further reduce the feedback overhead, focus may be placed on some typical antenna array setups, e.g. uniform linear arrays (ULA) or cross-polarized uniform linear arrays (XOP-ULA).

Figure 2:
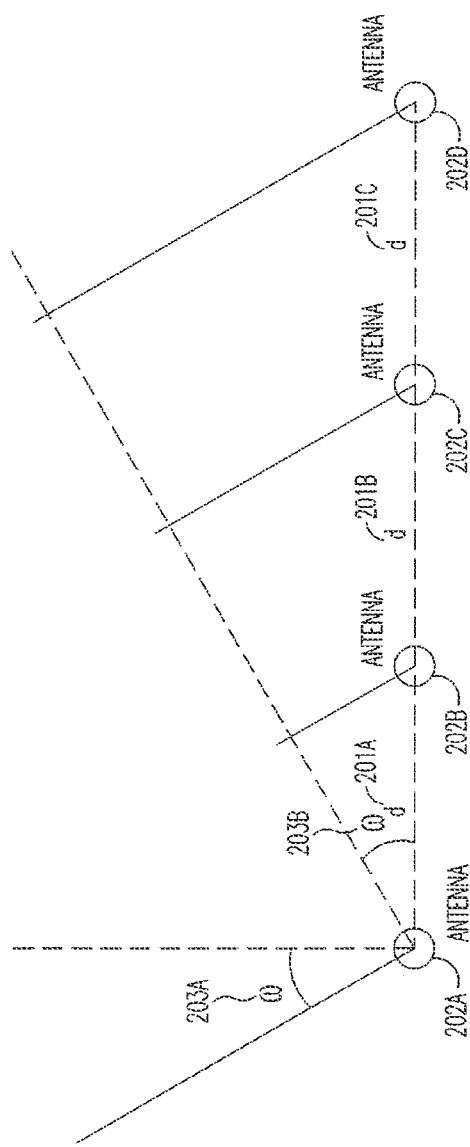
FIG. 2 is an illustration of uniform linear array.

FIG. 2 shows an example ULA 200. In FIG. 2, the uniform antenna distance d 201a, 201b, and 201c is between antennas 202a, 202b, 202c, and 202d respectively. The steering angles 203a and 203b are also shown. For an ULA as depicted in FIG. 2, the LOS channel response may take a structure as in Equation 3:

$$P_{ULA} = \begin{bmatrix} 1 \\ e^{j\theta} \\ e^{j2\theta} \\ \vdots \\ e^{j(N_t-1)\theta} \end{bmatrix} \quad \text{Equation 3}$$

where $$\theta = \frac{2\pi d}{\lambda}\sin\omega \quad \text{Equation 4}$$

and d is the uniform antenna distance, λ is the wavelength, and ω is the steering angle. The LOS codebook for ULA may be parameterized by a single variable. For such a ULA, the codebook for the LOS component may take a structure as in Equation 3 where the only variable θ is scalar quantized in the range of [0,2π]. Fine tuning of the range may be possible. Alternatively or additionally, because θ has a one-to-one mapping to the steering angle ω, the steering angle ω may also be quantized instead.

For XOP-ULA (using an 8-transmit antenna example with 4 ULA in horizontal and 4 ULA in vertical), the LOS term of the channel response may take a structure as:

$$P_{XPO} = \begin{bmatrix} 1 \\ e^{j\theta} \\ e^{j2\theta} \\ e^{j3\theta} \\ e^{j\varphi} \\ e^{j(\theta+\varphi)} \\ e^{j(2\theta+\varphi)} \\ e^{j(3\theta+\varphi)} \end{bmatrix} \quad \text{Equation 5}$$

The steering angle θ in the horizontal domain may be the same as the steering angle in the vertical domain. The angle φ may stand for the phase difference between the horizontal polarization and vertical polarization.

For such a XOP-ULA, the quantization codebook for the LOS component may take a structure as Equation 5. Both the steering angle θ and the phase difference φ are quantized within the range of [0, 2πc].

Figure 3:
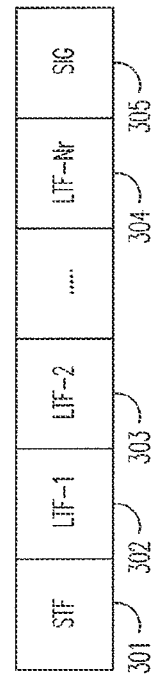
FIG. 3 is an example of an NDP packet for sounding.

Singular value decomposition for CSI feedback may be used in accordance with any of the embodiments described herein. FIG. 3 shows an example of a null data packet (NDP) that may be used in 802.11 to sound a channel 300. The NDP includes a short training field (STF) 301, multiple long training fields (LTFs) such as LTF-1 302, LTF-2 303 to LTF-Nr 304, and a signal field (SIG) 305. These fields may be transmitted to allow the channel to be estimated at the receiver side. Channel estimation may be carried out in the frequency domain leading to an estimated channel matrix of H with dimensions Nr*Nt, where Nr is number of receive antennas and Nt is number of transmit antennas.

After channel estimation, a singular value decomposition may be done per carrier:

$$H = U S V' \quad \text{Equation 6}$$

where U is the left singular matrix containing Nr left singular vectors in an Nr-dimension subspace, S is the diagonal matrix containing singular values in a non-increasing order, and V is the right singular matrix containing Nr right singular vectors in an Nt-dimension subspace. (Nt>=Nr is assumed here without loss of generality). U is a unitary matrix with UU'=U'U=I_{Nr}, while V is a semi-unitary matrix in general with V'V=I_{Nr}. The rows of U are orthogonal to each other, all columns of U are orthogonal to each other, and all columns of V are orthogonal to each other.

Instead of feeding back the complete channel H for each subcarrier, the right singular matrix V may be fed back to the transmitter. This may be done for single user MIMO (SU-MIMO). For MU-MIMO, extra information regarding singular values S may be fed back as well.

Figure 4:
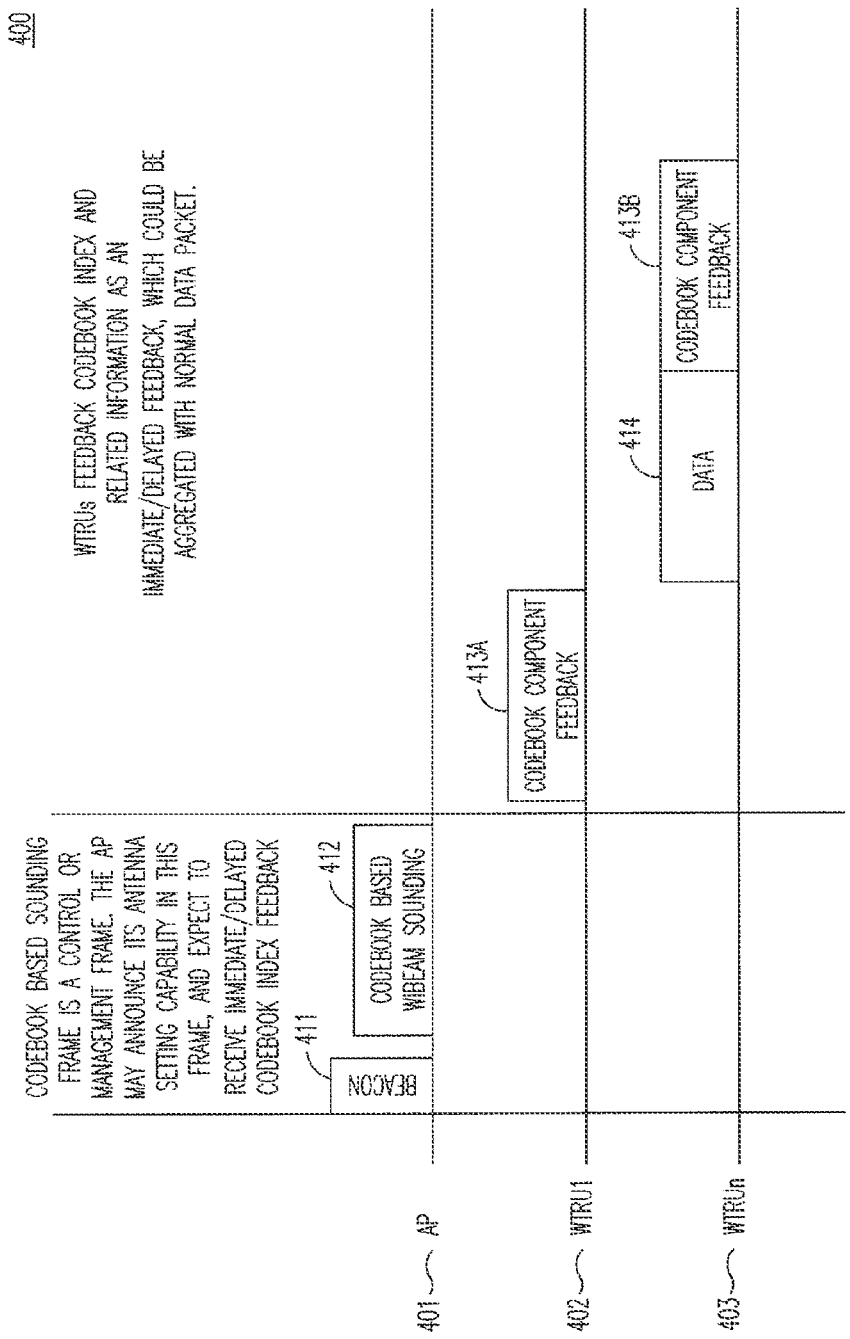
FIG. 4 is an example sequence exchange for codebook based sounding and feedback.

FIG. 4 illustrates an example sequence exchange based on sounding and feedback that may enable codebook based beamforming at an AP or WTRU in accordance with one embodiment 400. The codebook based beamforming procedure of FIG. 4 may also be used in combination with any of the other embodiments described herein. The signaling and sounding procedures described herein are applied to IEEE 802.11 WLAN systems as an example, but they may also be applied to other wireless communication systems.

The example procedure of FIG. 4 is in the AP 401 to WTRU 402 and WTRUn 403 directions, but it may also be in the WTRU1 402 and WTRUn 403 to AP 401 direction as well. Following the transmission of a beacon 411, a codebook based sounding frame 412 may be transmitted from the AP 401 to WTRU1 402 so that the WTRU1 402 may measure the channel state information (CSI) and may perform channel estimation. The codebook based sounding frame 412 may be transmitted after the beacon 411 as in the example of FIG. 4, based on a codebook based sounding frame request, or in some other time slot when AP 401 gains the Transmission Opportunity (TXOP). The AP also may broadcast/multicast/unicast the codebook based sounding frame 412 to all the WTRU1 402 and WTRUn 403, a group of WTRUs, or a single WTRU in the BSS.

After channel estimation, WTRU1 402 may transmit a codebook component feedback frame 413a to AP 401. WTRU1 402 may utilize the codebook based sounding frame 412 to measure CSI and select the codeword in the predefined codebook that gives the best performance. The codeword may also be referred to as a weight and are used interchangeably herein. Similarly, additional WTRUs in the system such a WTRUn 403 may transmit a codebook component feedback frame 413b to AP 401. The codebook component feedback frame 413b may be done individually in a MAC frame, or may be piggybacked together with another MAC data frame 414.

The codebook component feedback frame 413a and 413b may include but is not limited to the following information:

(1) Rank Indicator: an index which may indicate the channel rank of the WTRU.

(2) Codebook index: an index which may indicate which codeword defined in the codebook (or combination of codewords) may be utilized as the beamforming/MU-MIMO codeword for the WTRU.

(3) Codeword accuracy index: a quantized measurement of the accuracy of the codeword for the measured channel. There may be several ways to define the codeword accuracy index. For example the codeword accuracy index may be defined as a normalized correlation between the codeword with the measured channel state or the SNR or SINR, after applying the codeword.

(4) Time delay index: a time stamp from which the time duration between channel measurement and channel feedback may be calculated. This index may indicate when the CSI measurement occurred. Thus, the AP or WTRU on the transmitter side may use this information to determine whether the feedback is acceptable for representing the current channel conditions or is outdated and may be discarded.

The AP 401 or WTRU1 402 and WTRUn 403 may use information, such as the information included in codebook component feedback frames 413a and 413b as described above, when performing data transmission. For example, when the codeword accuracy index indicates a good match between a codeword and the measured channel, the AP may perform either MU-MIMO or beamforming using that codeword. If the codeword is not very accurate, the AP may decide to perform implicit beamforming based on the uplink traffic or normal transmission without beamforming. During implicit beamforming the codeword may be estimated from reverse traffic and channel reciprocity may be used.

In the codebook based sounding system example of FIG. 4, immediate feedback, delayed feedback, and/or unsolicited feedback may be used as defined below:

(1) Immediate feedback: when a codebook based sounding frame 412 is unicast to one user or multicast to a group of users, immediate feedback may be used. WTRU1 402 and WTRUn 403 receiving the codebook based sounding frame 412 may send a feedback response following a SIFS. When multiple users are involved in the feedback mechanism, AP 401 may send a poll frame for each user, who may respond to the poll frame with the codebook component feedback frames 413a and 413b. Note that the WTRUs involved with immediate feedback may report their capability of performing immediate feedback to the AP.

(2) Delayed feedback: the feedback system may also support delayed feedback. The feedback frame is sent when the responder WTRUs obtain their TXOP.

The codebook component feedback frames 413a and 413b may be standalone feedback frames or piggybacked with other data 414 frames as described above. The component feedback frames 413a and 413b may form a separate MAC protocol data unit (MPDU) packet with its own MAC header and/or be aggregated with other frames in an aggregated MPDU (A-MPDU) format. Alternatively or additionally, the component feedback frames 413a and 413b may be included in a MAC header.

Figure 5A:
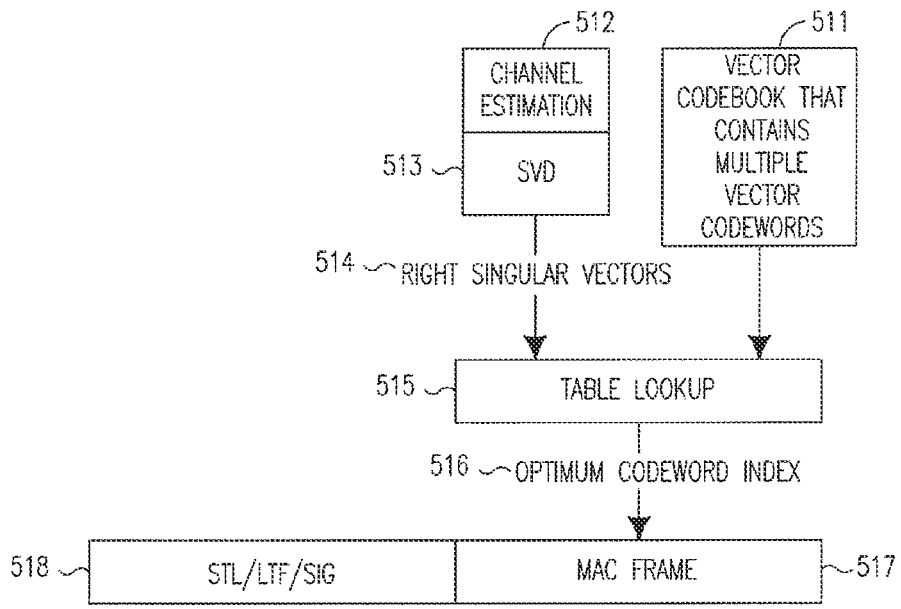
FIG. 5A is an illustration of the quantization operation at a receiver.

FIG. 5A provides an example of a procedure for use at the receiver side for quantization 500. For example a WTRU on the receiver side may have access to a vector codebook that contains multiple vector codewords 511. The beamforming/precoding codebook may be predefined by the system as a collection of matrices or vectors, which may be pre-determined in the standard specifications, and/or may be maintained at both the transmitter and receiver of the communication link. More than one codebook may be defined.

The WTRU may receive a sounding packet and then perform channel estimation 512 to obtain the channel estimates in the frequency domain. The WTRU may then perform SVD 513 for each carrier, or group of carriers for the resource, and obtain right singular vectors 514 for the channel estimated. The WTRU may then use right singular vectors to perform a table lookup 515 of codewords in a codebook and find the optimum codeword 516. When using right singular vectors $v_o$ to perform a table lookup 515, optimum codeword $w_i$ refers to the codeword inside the codebook that minimizes a certain matrix/vector norm, e.g. the Frobenius norm:

$$d(v_o, w_i) = \|v_o' w_i\|_F \qquad \text{Equation 7}$$

The WTRU may then use codeword index i in an information element in the MAC frame 517, prepended by STF/

LTF/SIG 518, to then feed back the optimum codebook to the transmitter as part of the response in the sounding procedure.

Figure 5B:
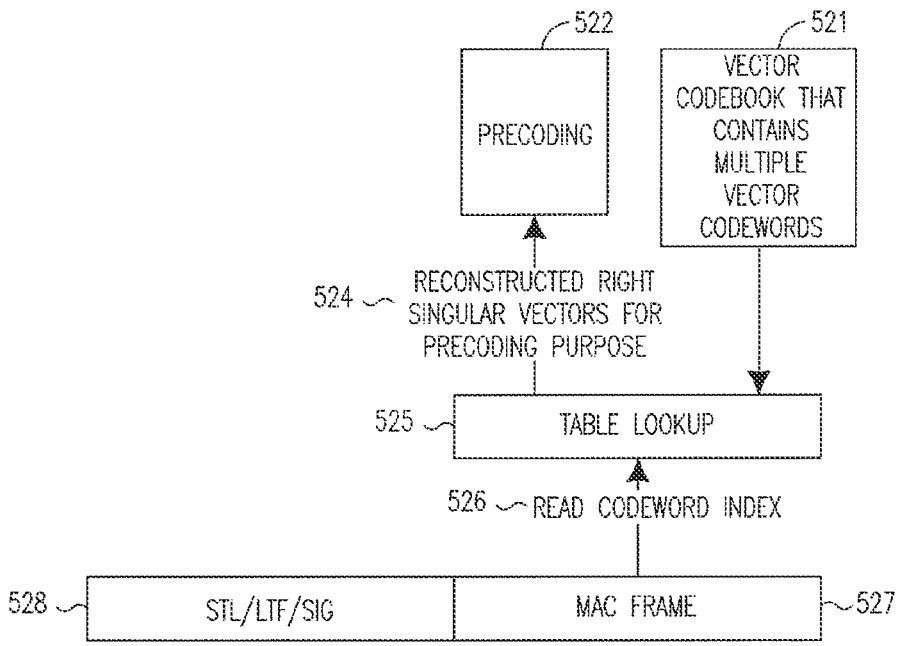
FIG. 5B is an illustration of the codeword reconstruction procedure in the transmitter.

FIG. 5B provides an example of a procedure for use at the transmitter side for codeword reconstruction. For example an AP on the transmitter side may have access to a vector codebook that contains multiple vector codewords 521. The AP may receive a MAC frame 527, prepended by STF/LTF/SIG 528 and may read the codeword index 526. The AP may then perform table lookup 525 and reconstruct the right singular vectors 524 that correspond to the received codeword index 526. The AP may then use the reconstructed right singular vectors to compute a precoder 522 to be used for precoding. In the SU-MIMO case, the precoder 522 may be the same as the reconstructed right singular vectors 524. In the MU-MIMO case, the precoders 522 may be a transformation of the reconstructed right singular vectors 524.

Figure 6A:
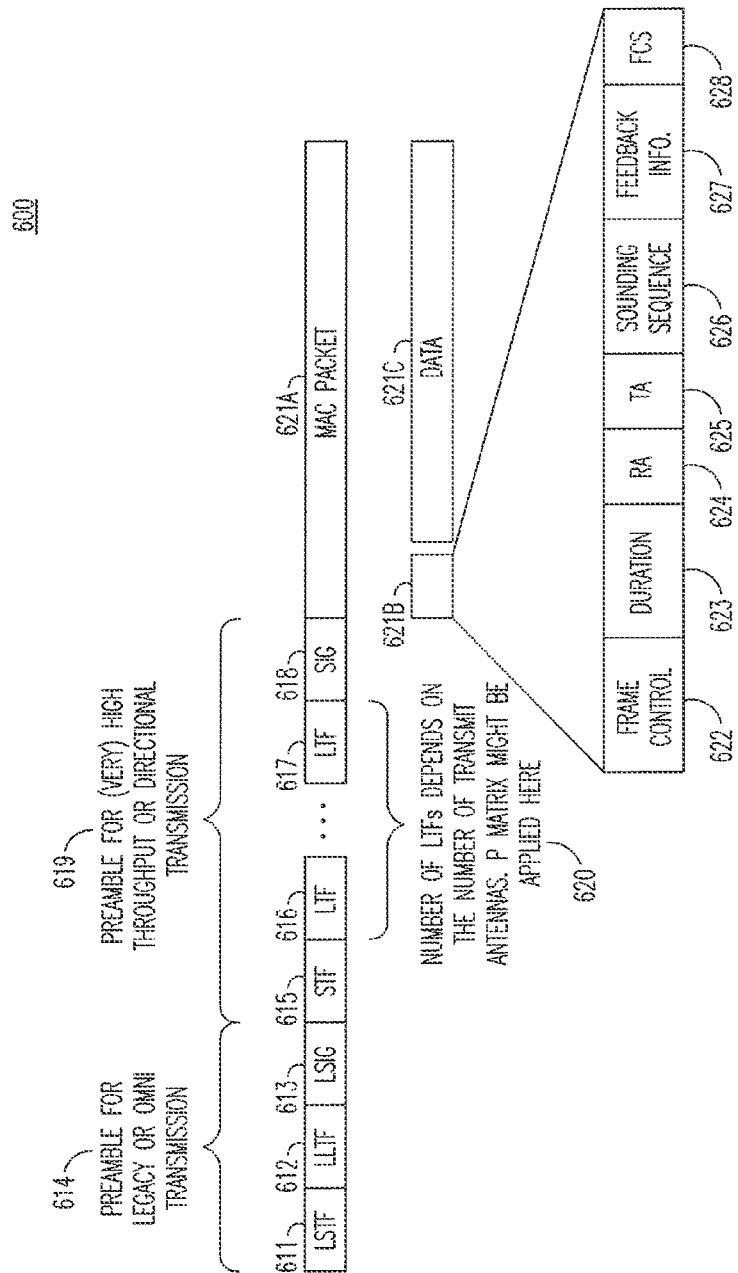
FIG. 6A is an example of a codebook based sounding frame format.

FIG. 6A shows an example codebook based sounding frame format 600. The codebook based sounding frame may be a control frame or a management frame. The PHY layer packet may be referred to as legacy or omni preamble 614 and may include a set of legacy STF (L-STF) 611, legacy LTF (L-LTF) 612, and legacy SIG (L-SIG) 613 fields. This legacy or omni preamble 614 may be transmitted without beamforming/MU-MIMO codewords. Another set of STF 615, LTF 616 and 617, and SIG 618 fields may be transmitted with beamforming/MU-MIMO codewords in the directional preamble 619. The number of LTFs transmitted in the directional preamble depends on the number of transmit antennas in the device 612.

The frame control field 622 in the MAC header 621b transmitted with the data 621c in the MAC packet 621a may indicate that it is a codebook based sounding frame. The MAC header 621b also may include a feedback info field 627, which may be used for the codebook based sounding frame. The feedback info field 627 may include codebook information, delayed feedback, piggyback feedback, codeword accuracy feedback, and delayed timing feedback. The detailed description is given in Table 1.

TABLE 1

Feedback Info Field

| Field | Description |
| --- | --- |
| Codebook information | When the system defines more than one codebook, this field may be used to identify which codebook(s) could be used for feedback calculation |
| Delayed feedback | May indicate whether delayed feedback is allowed |
| Piggyback feedback | May indicate whether piggyback feedback is allowed |
| Codeword accuracy feedback | May indicate whether Code Accuracy Index is required or what kind of code accuracy index is required |
| Delayed timing feedback | May indicate whether Time Delay Index feedback is required |

The MAC header may also include a frame control field 622, duration 623, receiver address (RA) 624, transmitter address (TA) 625, sounding sequence 626, and frame check sequence (FCS) 628 fields.

Figure 6B:
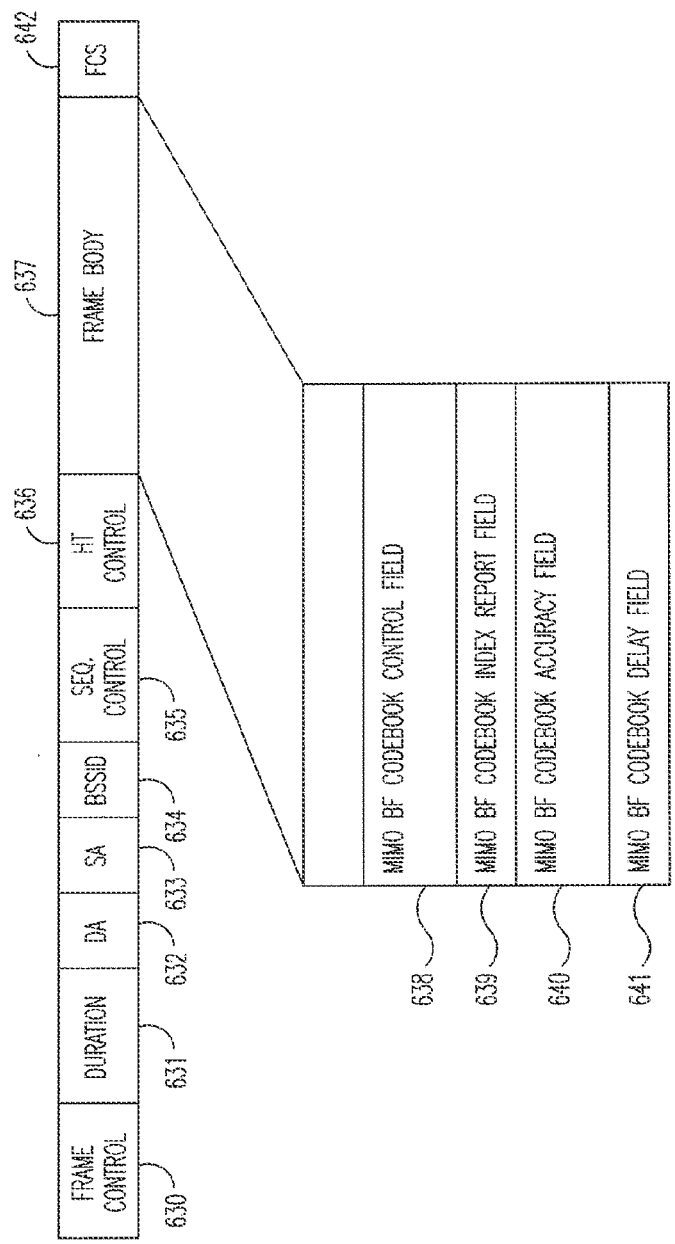
FIG. 6B is an example of codebook component feedback frame format.

FIG. 6B shows an exemplary format for a codebook component feedback frame. The codebook component feedback frame may be a management frame or a control frame and may include a frame control 630, duration 631, destination address (DA) 632, sender address (SA) 633, basic service set identification (BSSID) 634, sequence control 635, high throughput (HT) control 636, and FCS 642 fields.

The frame body 637 may include a MIMO beamforming (BF) codebook control field 638 that may provide general information about the MIMO BF codebook based feedback and may include the subfield identified in Table 2 below.

TABLE 2

MIMO BF Codebook Control Field

| Subfield | Description |
| --- | --- |
| Channel Width | May indicate the width of the channel in which the measurement has been performed |
| Subcarrier Grouping Info | May indicate subcarrier grouping for codeword index feedback. |
| MIMO BF Codebook Accuracy Field | May indicate whether the MIMO BF Codebook Accuracy Field is presented |
| MIMO BF Codebook Delay Field | May indicate whether the MIMO BF Codebook Delay Field is presented |
| Feedback Type | May indicate either SU or MU |

The frame body 637 may also include a MIMO BF codebook index report field 639. The codebook index may be included in the MIMO BF codebook index report field 639 and may include the subfield as identified in Table 3 below.

TABLE 3

MIMO BF Codebook Index Report Field

| Codebook Info | May indicate which codebook is utilized for the feedback |
| --- | --- |
| Codebook Index | May indicate which codeword/weight defined in the codebook gives the best performance |

The frame body 637 may also include a MIMO BF codebook accuracy field 640, which may include the codebook accuracy index. The frame body 637 may also include a MIMO BF codebook delay field 641, which may include the time delay index.

Codebook based MU-MIMO could group users may perform MU-MIMO transmission according to the codeword index. Additional MU-MIMO protection mechanisms may be used in the event that the MIMO BF codebook accuracy field 640 and the MIMO BF codebook delay field 641 do not enable the MU-MIMO transmission to be successfully decoded at the receiver.

Figure 7:
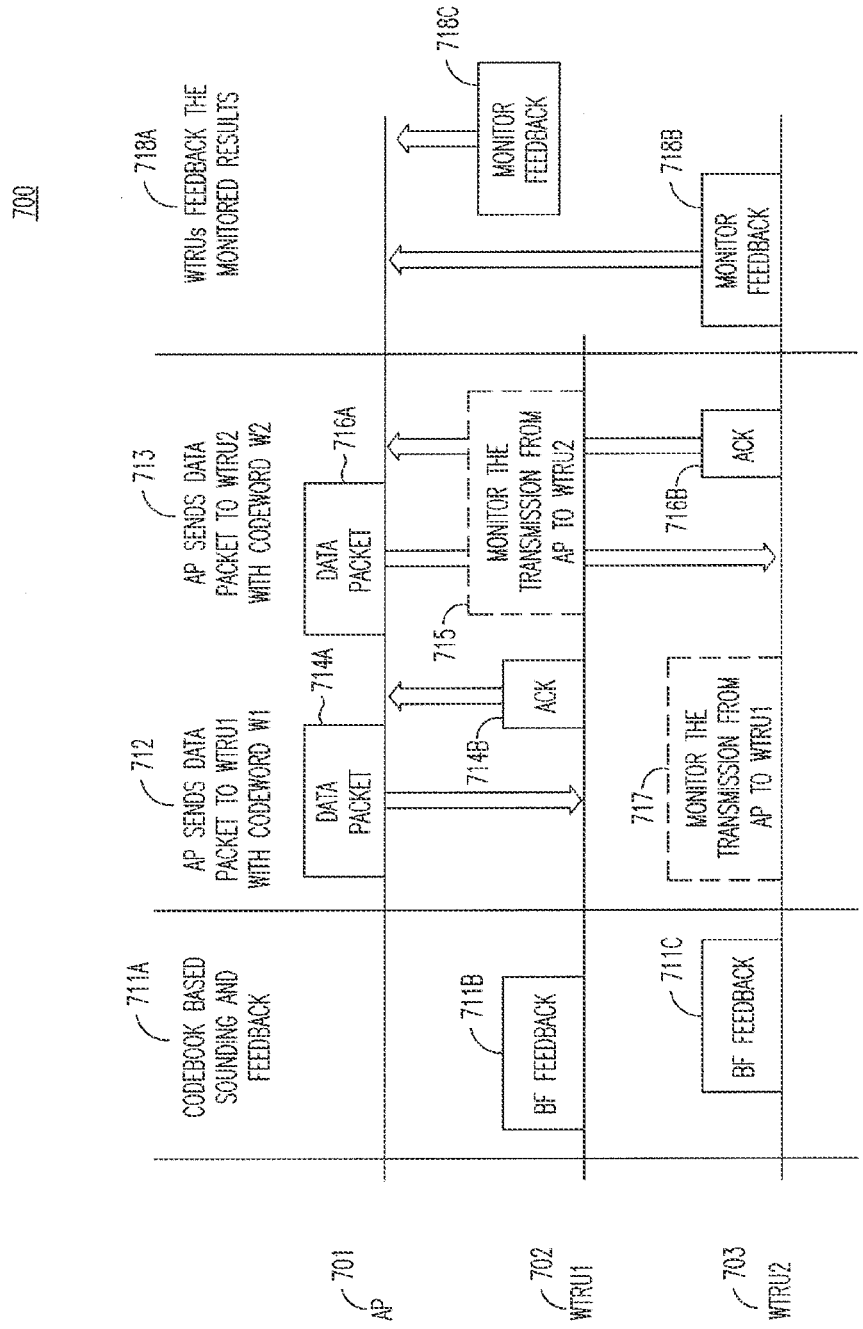
FIG. 7 is an example of codebook based MU-MIMO protection mechanism.

FIG. 7 shows an example of a codebook based MU-MIMO protection procedure 700. Codebook based sounding and feedback 711a may be performed as described in the example procedure above. WTRU1 702 and WTRU2 703 may transmit BF feedback 711b and 711c respectively to AP 701. Once codebook based sounding and feedback 711a has been performed, AP 701 may use codeword/weight w1 712 to transmit a data packet 714a to WTRU1 702, which responds with ACK 714b. Similarly, AP 701 may use codeword/weight w2 713 to transmit a data packet 716a to WTRU2, which responds with ACK 716b. Alternatively, AP 701 may perform MU-MIMO transmission to both WTRU1 702 and WTRU2 703. AP 701 may assign a group ID to WTRU1 702 and WTRU2 703 that indicates that they are within a MU-MIMO transmission group. AP 701 may apply a MU-MIMO protection mechanism during the MU-MIMO session by instructing WTRU2 703 to monitor 717 the transmission between AP 701 and WTRU1 702. Similarly AP 701 may instruct WTRU1 702 to monitor 715 the transmission between AP 701 and WTRU2 703. WTRU1 702 and WTRU2 703 may then feed back the monitor results 718a by transmitting monitor feedback 718b and 718c respectively to AP 701. AP 701 may then use the monitor feedback to determine whether it should continue MU-MIMO transmission to WTRU1 702 and WTRU2 703 simultaneously.

FIG. 8 shows an example format of a physical layer convergence protocol (PLCP) protocol data unit (PPDU) that may be used by the AP to instruct WTRUs to monitor transmissions 800. In the example of FIG. 8, a group ID is used with modifications to the SIG field. One set of omni STF (OSTF) 811, omni LTF (OLTF) 812, and omni SIG (OSIG) 813 fields may be transmitted in a preamble 801 for omni antenna pattern transmission. Accordingly, the omni preamble 801 may be detected by the WTRUs. Another set of STF 814, LTF 815 to LTF 821, and SIG 822 fields may be transmitted with the MAC packet 823 using the codeword/weight selected by the AP.

The AP may establish the MU-MIMO group for use during a MU-MIMO protection/monitoring period. A group ID may be used for the WTRUs in the system and be included in the OSIG field 813. The OSIG field 813 is a general name for a SIG field which may be transmitted with an omni antenna pattern. The preselected codeword/weight chosen in the procedures described herein may be the beamforming codeword/weight for only one WTRU in the group, and as a result another WTRU in the group may not be able to decode the beamformed part of the packet. However, that WTRU may measure the energy of the packet to perform monitor feedback. The monitor feedback may be defined as average SNR measured on the beamformed portion of the transmitted packet.

The number of space time streams (NSTS) field may indicate the number of data streams transmitted for each WTRU. For example, the NSTS for one WTRU in the group may be defined according to the number of data streams transmitted to that WTRU, while NSTS for another WTRU in the group may be 0 if no data stream is transmitted in the MU-MIMO protection/monitoring period. A monitor field with one bit may be defined in the OSIG field 813, which may indicate whether the WTRUs in the MU-MIMO group with an NSTS equal to 0 may still be instructed to monitor the channel. The monitor field bit may be set for WTRUs with an NSTS of 0 such that those WTRUs monitor the transmissions to the WTRUs with an NSTS greater than 0. The monitoring WTRUs may then feed back the monitored results to the AP on the next TXOP as described in the procedure detailed above. By receiving this PPDU frame, When a WTRU receives the PPDU frame as shown in the example of FIG. 8, it may be notified of its inclusion in the MU-MIMO group and instructed to monitor group transmissions as described above.

Enhanced feedback based on Givens rotation based decompositions and on angle statistics may also be used in accordance with yet another embodiment and in combination with any of the embodiments described herein. When Givens rotation based decompositions are used to decompose an arbitrary vector, the resulting angles (Φ's) are assumed to be uniformly and independently distributed within the range of $[0, \pi/2]$. The following example illustrates that this assumption may not always be correct. For example, after pre-processing to remove the imaginary part, an 8×1 real-valued vector v may be decomposed into 7 different angles corresponding to 7 different Givens rotations performed one after another. In general, the vector v may be expressed as:

$$v = \begin{bmatrix} \cos\varphi_1\cos\varphi_2\cos\varphi_3\cos\varphi_4\cos\varphi_5\cos\varphi_6\cos\varphi_7 \\ -\sin\varphi_7 \\ -\sin\varphi_6\cos\varphi_7 \\ -\sin\varphi_5\cos\varphi_6\cos\varphi_7 \\ -\sin\varphi_4\cos\varphi_5\cos\varphi_6\cos\varphi_7 \\ -\sin\varphi_3\cos\varphi_4\cos\varphi_5\cos\varphi_6\cos\varphi_7 \\ -\sin\varphi_2\cos\varphi_3\cos\varphi_4\cos\varphi_5\cos\varphi_6\cos\varphi_7 \\ -\sin\varphi_1\cos\varphi_2\cos\varphi_3\cos\varphi_4\cos\varphi_5\cos\varphi_6\cos\varphi_7 \end{bmatrix} \quad \text{Equation 8}$$

The 7 different angles may be quantized individually. From Equation 8, it is evident that some entries involve fewer angles than others. In general, increasing the number of angles introduces more quantization error.

FIG. 9A shows a cumulative distribution function (CDF) for 7 different angles 900. The example in FIG. 9A shows that depending on the order of the Givens rotations, the range of angles may actually have a large variation. The angle 907 for earliest Givens rotation may be distributed within $[0, \pi/2]$, whereas the angles for later Givens rotations 906, 905, 904, 903, 902, and 901 may be distributed within a smaller range, $[0, \pi/4]$. In this example, eight transmit and eight receive antennas are considered. $N_c=1$ is chosen and supports one dimensional beamforming. Also, in the example in FIG. 9A, perfect channel estimation is assumed at the receiver side, upon which SVD is applied per subcarrier, or per subcarrier group. However, a similar figure is still expected when used with more realistic channel estimation. To generate the cumulative distribution function (CDF) in this example, the following may be used: a channel ensemble of 2,000 realizations of a type B channels (delay spread of 80 ns), plus 2,000 realizations of a type D channel (delay spread of 390 ns), plus 2,000 realizations of a type E channels (delay spread of 730 ns). These channels are also used for evaluating performance for the IEEE 802.11ac specification. A uniform antenna spacing of 0.52 may be assumed at both the transmitter (AP) and receiver (WTRU). A channel of bandwidth 100 MHz may be simulated while the signal bandwidth of 20 MHz may be chosen. Only the frequency domain channel realizations on data/pilot tones are used in this analysis.

In accordance with this embodiment, different ranges may be used for different angles to quantize the angles after a Givens rotation based decomposition. For each angle, the range $\Omega_\psi = [a, b] \subset [0, 2\pi]$. The two endpoints a, b may be different or identical. This has the benefit including but not limited to improved feedback accuracy and reduced feedback overhead.

One example in setting the ranges for different angles is given as follows: ψ1, 2, 3, 4: uniform over $$\left[0, \frac{\pi}{2}\right]$$

and ψ5, 6, 7: uniform over $$\left[0, \frac{\pi}{4}\right].$$

Quantization of the angles may be done as shown in Table 4.

TABLE 4

Quantization examples for different angles.

| Quantized $\psi$1,2,3,4 | Quantized $\psi$5,6,7 |
|---|---|
| $\psi = \frac{k\pi}{2^{b+1}} + \frac{\pi}{2^{b+2}}$ radians | $\psi = \frac{k\pi}{2^{b+2}} + \frac{\pi}{2^{b+3}}$ radians |
| where k = 0, 1, ..., $2^b$ − 1 and b is the number of bits to quantize $\psi$ | where k = 0, 1, ..., $2^b$ − 1 and b is the number of bits to quantize $\psi$ |

The candidate angles in the left column are uniformly distributed within the range of [0, π/2], and the candidate angles in the right column are uniformly distributed within the range of [0, π/4].

Feedback may also be improved based on channel correlations in the frequency domain. SVD may be performed independently across all subcarrier groups. For example in the two subcarrier groups below:

$$H_1 = U_1 S_1 V'_1 \qquad \text{Equation 9}$$

$$H_2 = U_2 S_2 V'_2 \qquad \text{Equation 10}$$

H1, H2 are the channels on those two different subcarrier groups. U1, S1, V1 are the SVD of H1. Similarly, U2, S2, and V2 are the SVD of H2.

The feedback overhead may be linearly proportional to the number of subcarriers. Instead of doing SVD independently, feeding back $V_1$ may be done first, and then $V_2$ may be fed back second.

For example, let $V_1$ be of dimension Nt*Nc spanning the range space, $W_1$ be of dimension Nt*(Nt−Nc) spanning the null space of $V_1$. Once $V_1$ is fed back accurately, $W_1$ may be constructed with some ambiguity, which is acceptable.

If $V_2$ is quantized directly, a Nt*Nc matrix may be quantized via the Givens rotation based decomposition. Since no prior information may be given about $V_2$, full overhead of (2*Nr*Nt−Nt−Nt*Nt)*Nb may be used, assuming all θ's distributed uniformly within the range of [0, 2π] and all Φ's distributed uniformly within the range of [0, π/2]. Instead of quantizing $V_2$ directly, the following may be quantized instead:

$$D = \begin{bmatrix} V'_1 V_2 \\ W'_1 W_2 \end{bmatrix} \qquad \text{Equation 11}$$

where $V'_1 V_2$ is of dimension Nc*Nc, $W'_1 V_2$ is of dimension (Nt−Nc)*Nc. The upper part may be a projection of $V_2$ on the range space, the bottom part may be a projection of $V_2$ on the null space.

Since the two subcarrier groups are adjacent, $V_1$ and $V_2$ are correlated, with the correlation depending on the subcarrier group size. In the extreme case, $V'_1 V_2$ may be close to an identity matrix, while $W'_1 V_2$ may be close to an all zero matrix. Thus, prior information on the statistics of different entries of D may be obtained.

In the same manner as in Table 4, information of the statistics may be used to limit the range of Φ's and $\psi$'s, in order to improve the feedback accuracy or to reduce the feedback overhead.

Figure 9B:
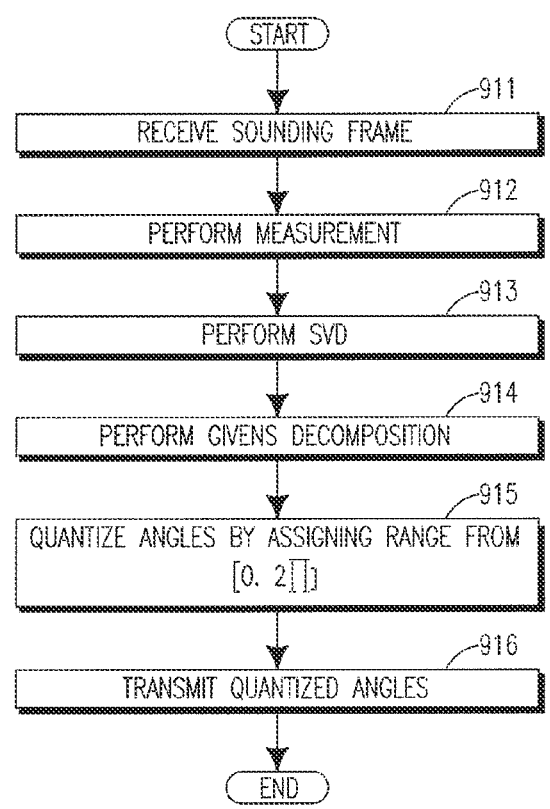
FIG. 9B is a high level flow diagram of an example of enhanced feedback based on Givens rotations and on angle statistics.

FIG. 9B shows a flow diagram of an example of enhanced feedback based on Givens rotations and on angle statistics. The WTRU may receive a sounding frame or frames 911 from an access point (AP). The WTRU may then perform measurements 912 on the sounding frame to estimate the channel or channels. The WTRU may then perform a singular value decomposition (SVD) 913 on the performed measurements. Next, the WTRU may perform a Givens rotation based decomposition 914 on the performed measurements.

The WTRU may then quantize each resulting angle 915 from the Givens rotation based decomposition by assigning a range to each resulting angle. The assigned range or ranges may be determined in various methods. For example, the assigned range may be a subset of [0, 2π]. In another example, the assigned range may also be only a single value from the subset of [0, 2π]. In yet another example, the ranges for different resulting angles may be assigned different range values, or unique range values. Finally, the WTRU may transmit the quantized angles 916 to the AP in a feedback frame or frames.

Feedback overhead reduction may also be achieved using differential quantization. Givens rotation based decompositions may be performed on a per subcarrier group basis. The subcarrier group may be a group of adjacent subcarriers, with the group size $N_g$ up to 4.

Figure 10:
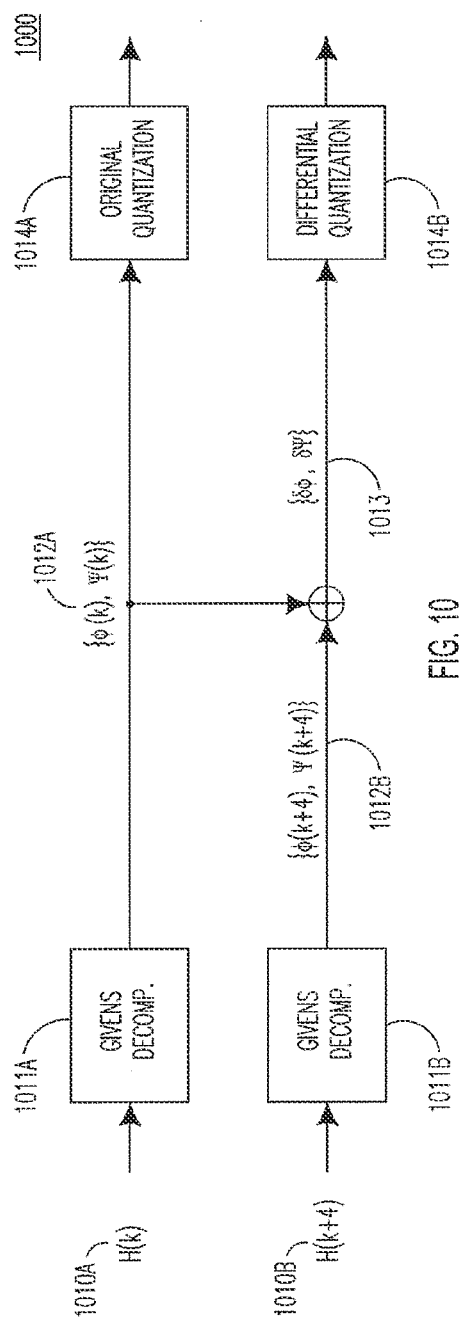
FIG. 10 is a diagram of differential quantization based on Givens decompositions.

FIG. 10 shows an example of using differential quantization based on Givens rotation based decompositions which may result in reduced feedback overhead 1000. The feedback overhead associated with both φ's and $\psi$'s may be reduced in the example of FIG. 10, in which two adjacent frequency groups are considered. In this example it is assumed that $N_g$=4, and thus the adjacent groups are separated by 4 sub-carriers with a sub-carrier index k and (k+4). The 4-sub-carrier separation may be larger than the 3-sub-carrier separation.

In the example of FIG. 10, H(k) 1010a and H(k+4) 1010b may be estimated channels on sub-carriers k and k+4 respectively. H(k) 1010a and H(k+4) 1010b may also be averaged channels on the subcarrier groups. As illustrated in FIG. 10, Givens rotation based decompositions may be applied on each sub-carrier group separately 1011a and 1011b. Applying Givens rotation based decompositions on each subcarrier separately may lead to the decomposed angles {φ(k),$\psi$(k)} 1012a and {φ(k+4),$\psi$(k+4)} 1012b respectively. Then instead of quantizing each set of angles directly, the angle difference {δφ,δ$\psi$} 1013 across the two frequency tones may be calculated and quantized, which may be referred to as differential quantization 1014b. The direct quantization is shown as original quantization 1014a.

Figure 11:
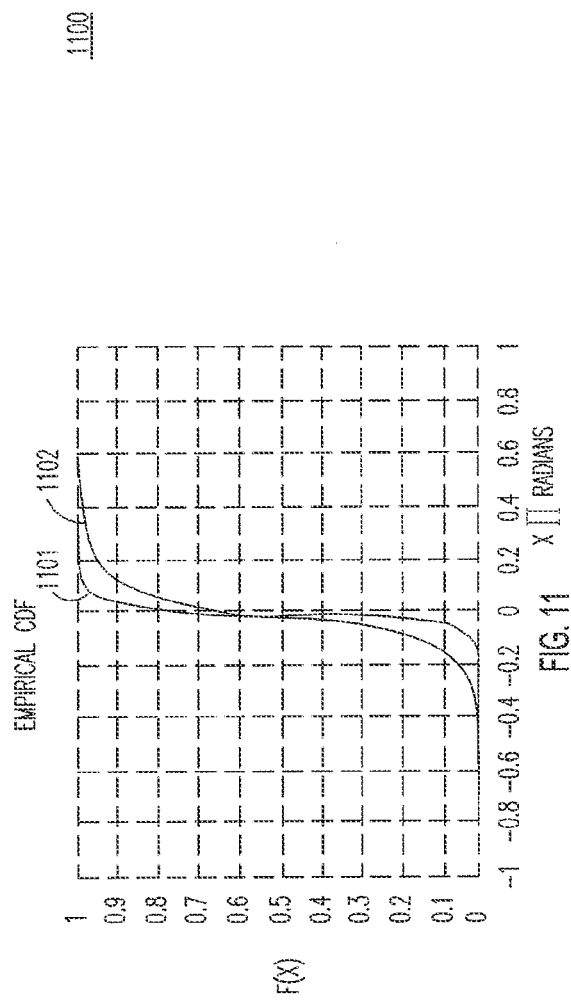
FIG. 11 shows the CDF of δΦ with a frequency separation of 4 sub-carriers.

FIG. 11 shows a plot of the distribution statistics of δφ for 6,000 realizations of channel B, D, and E 1100. The CDF for channel B only 1101 and for channel B, D, and E 1102 are both shown. δφ is approximately distributed within the range of $$[-\frac{\pi}{2}, \frac{\pi}{2}],$$

as shown in the example of FIG. 11.

Figure 12:
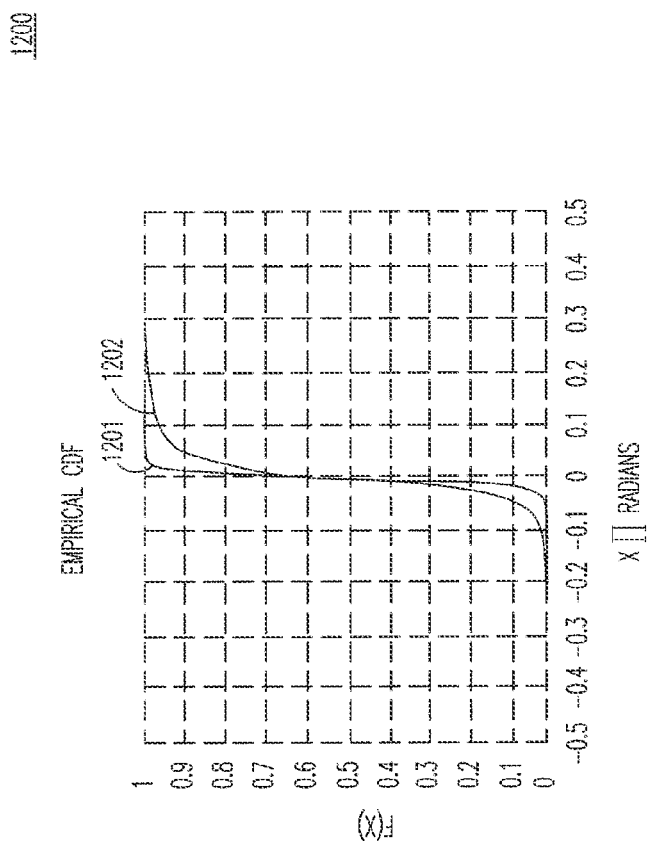
FIG. 12 shows the CDF of δΨ with a frequency separation of 4 sub-carriers.

FIG. 12 shows a plot of the distribution statistics of δ$\psi$ for 6,000 realizations of channel B, D, and E 1200. The CDF for channel B only 1201 and for channel B, D, and E 1202 are both shown. In the example of FIG. 12, δ$\psi$ is approximately distributed within the range of $$[-\frac{\pi}{8}, \frac{\pi}{8}],$$

achieving approximately a 50% reduction in the support for angles $\phi$ and $\psi$ at the same time. This may provide a reduction in the feedback.

Figure 13A:
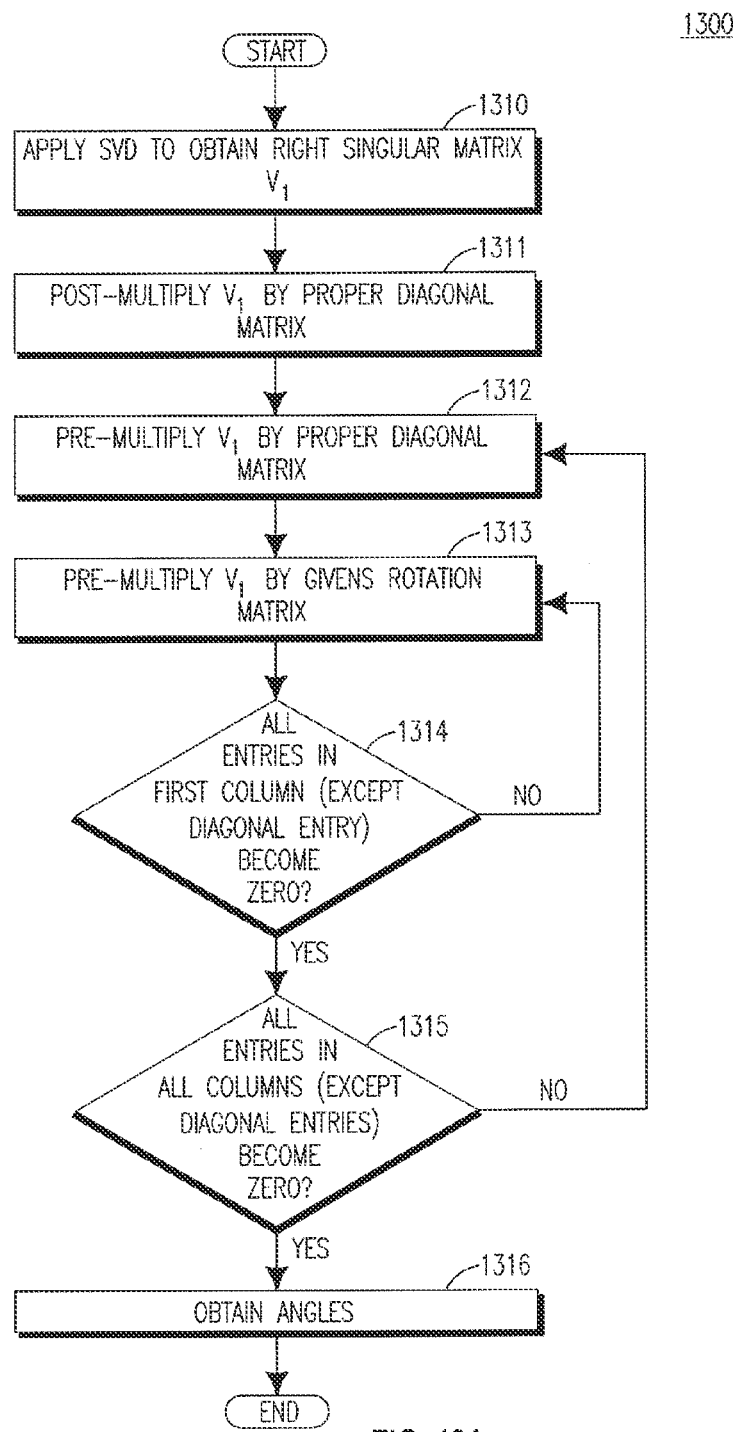
FIG. 13A shows a flow chart for an example procedure using differential quantization for a first subcarrier group with frequency domain channel estimate H1.
Figure 13B:
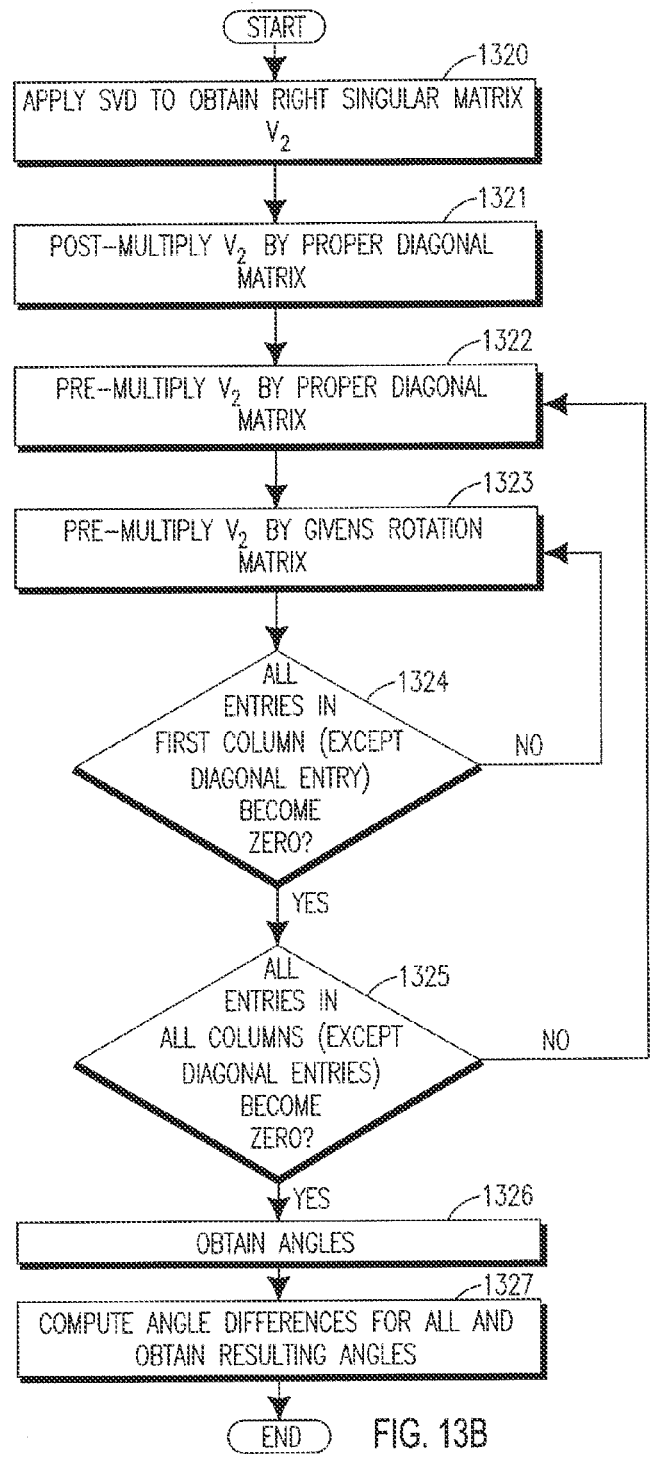
FIG. 13B shows a flow chart for an example procedure using differential quantization for a second subcarrier group with frequency domain channel estimate H2.

FIG. 13A-13B show flow charts of an example procedure using differential quantization at the beamformee 1300. In this example, the beamformee may be the transmitter of the beamforming feedback packet.

FIG. 13A shows a flow chart for an example procedure using differential quantization for a first subcarrier group with frequency domain channel estimate H1. For the estimated channel, SVD may be applied to obtain a right singular matrix V1 1310. Then V1 may be post-multiplied by a proper diagonal matrix 1311 to overwrite V1 such that entries in the last row of V1 become non-negative real values. The post-multiplication matrix may be parameterized by $N_r$ angles $\theta_1^1, \theta_2^1, \ldots, \theta_{N_r}^1$, where Nr is number of receive antennas. Next, V1 may be pre-multiplied by a proper diagonal matrix 1312 $B_1$ to overwrite V1 such that entries in the first column of n become non-negative real values. The pre-multiplication matrix $B_1$ may be parameterized by $N_t-1$ angles $\phi_{1,1}^1, \phi_{2,1}^1, \ldots, \phi_{Nt-1,1}^1$, where Nt is number of transmit antennas. Next, V1 may be pre-multiplied by a Givens rotation matrix 1313 to overwrite V1 such that the second entry in the first column becomes zero. The pre-multiplication matrix may be parameterized by an angle $\psi_{2,1}^1$. This step may be repeated until all entries in the first column (except the diagonal entry) become zero 1314. Steps 1312 to 1314 may be repeated for all columns until all entries in all columns (except the diagonal entries) become zero 1315. This procedure may result in obtaining the angles 1316, $\{\phi_{1,1}^1, \phi_{2,1}^1, \ldots, \phi_{Nt-1,1}^1, \ldots\}$ and $\{\psi_{2,1}^1, \psi_{3,1}^1 \ldots \psi_{Nt,1}^1, \ldots\}$ where the superscript represents the frequency tone index. The angles may then be quantized using any quantization scheme described herein (e.g. first column of Table 4).

FIG. 13B shows a flow chart for an example procedure using differential quantization for a second subcarrier group with frequency domain channel estimate H2. For the estimated channel, SVD may be applied to obtain a right singular matrix V2 1320. Then V2 may be post-multiplied by a proper diagonal matrix 1321 to overwrite V2, such that entries in the last row of V2 become non-negative real values. The post-multiplication matrix may be parameterized by $N_r$ angles $\theta_1^2, \theta_2^2, \ldots, \theta_{N_r}^2$, where Nr is the number of receive antennas. Next, V2 may be pre-multiplied by a proper diagonal matrix 1322 $B_1$ to overwrite V2 such that entries in the first column of V2 become non-negative real values. The pre-multiplication matrix $B_1$ may be parameterized by $N_t-1$ angles $\phi_{1,1}^2, \phi_{2,1}^2, \ldots, \phi_{Nt-1,1}^2$, where Nt is the number of transmit antennas. Then V2 may be pre-multiplied by a Givens rotation matrix 1323 to overwrite V2 such that the second entry in the first column becomes zero. The pre-multiplication matrix may be parameterized by an angle $\psi_{2,1}^2$. This step may be repeated until all entries in the first column (except the diagonal entry) become zero 1324. Steps 1322 to 1324 may be repeated for all columns until all entries in all columns (except the diagonal entries) become zero 1325. This procedure may result in obtaining the angles 1326, $\{\phi_{1,1}^2, \phi_{2,1}^2, \ldots, \phi_{Nt-1,1}^2, \ldots\}$ and $\{\psi_{2,1}^2, \psi_{3,1}^2, \ldots, \psi_{Nt,1}^2, \ldots\}$ where the superscript represents the frequency tone index. Next the angle differences may be computed for all resulting angles 1327, e.g. $\phi_{1,1}^d = \Phi_{1,1}^1 - \Phi_{1,1}^2$. As a result, the angles $\{\phi_{1,1}^d, \Phi_2, 1^d, \ldots \Phi_{Nt-1,1}^d, \ldots\}$ and $\{\psi_{2,1}^d, \psi_{3,1}^d, \ldots, \psi_{NT,1}^d, \ldots\}$ may be obtained, where the superscript represents the differential operation. The angles may then be quantized using any quantization scheme described herein (e.g. second column of Table 4). Step 1321 may be repeated for other frequency tones (or subcarrier groups). These quantized bits across all subcarrier groups may then be put in a MAC management frame and sent back to the transmitter in accordance with any of the feedback procedures described herein.

Figure 13C:
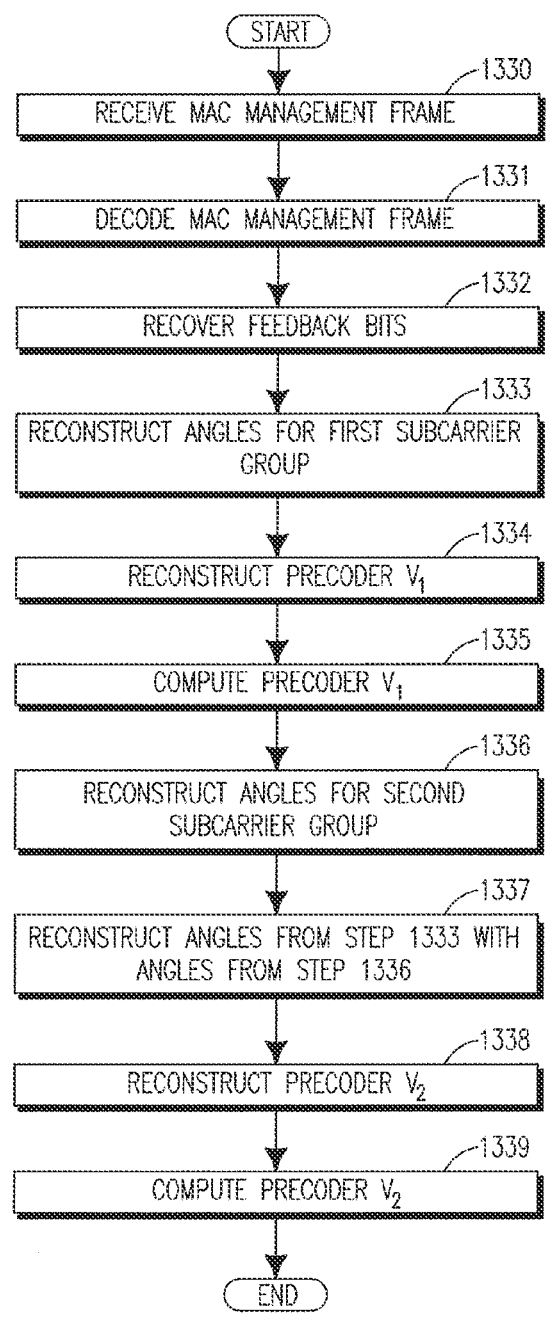
FIG. 13C shows an example procedure for using differential quantization at the beamformer.

FIG. 13C shows an example procedure for using differential quantization at the beamformer for determining a precoder for each subcarrier. In this example, the beamformer may be the receiver of the beamforming feedback packet. A MAC management frame may be received 1330 that contains the feedback content. The MAC management feedback content may be decoded 1331, and the feedback bits may be recovered 1332. The angles $\{\phi_{1,1}^1, \phi_{2,1}^1, \ldots \phi_{Nt-1,1}^1, \ldots\}$ and $\{\psi_{2,1}^1, \psi_{3,1}^1, \ldots, \psi_{Nt,1}^1, \ldots\}$ for a first subcarrier group may be reconstructed from their binary representations, using any of the quantization schemes described herein (e.g. first column of Table 4). Then the precoder V1 may be reconstructed 1334. The precoder P1 may be further computed 1335 for the first subcarrier group. Then the angles $\{\phi_{1,1}^d, \Phi_2, 1^d, \ldots, \Phi_{Nt-1,1}^d, \ldots\}$ and $\{\psi_{2,1}^d, \Psi_3, 1^d, \ldots, \Psi_{Nt,1}^d, \ldots\}$ for a second subcarrier group may be reconstructed 1336 from their binary representations, using any of the quantization schemes described herein (e.g. the second column of Table 4). Then with the above angles, the angles $\{\phi_{1,1}^2, \phi_{2,1}^2, \ldots \phi_{Nt-1,1}^2, \ldots\}$ and $\{\psi_{2,1}^2, \psi_{3,1}^2, \ldots, \psi_{Nt,1}^2, \ldots\}$ may be further reconstructed 1337. For example, $\phi_{1,1}^2 = \phi_{1,1}^1 + \phi_{1,1}^d$. Then the precoder V2 may be further reconstructed 1338 with the above angles. Finally the precoder P2 may be further computed 1339 for the second subcarrier group.

CSI feedback containing multiple components may be used in accordance with yet another embodiment and in combination with any of the embodiments described herein. For example, one component may include long term channel feedback, and the other component may include short term channel feedback. The long term channel feedback may be fed back less frequently than the short term channel feedback. The long term channel feedback may be protected more securely than the short term channel feedback. In general, the long term channel feedback may be quantized using more bits per entry than the short term channel feedback.

Also, one component may include wideband channel feedback and the other component may include subband channel feedback. The wideband channel feedback may be fed back less frequently in frequency domain than the subband channel feedback. The wideband channel feedback may also be protected more strongly than the subband channel feedback. The wideband channel feedback may be quantized using more bits per entry than the subband channel feedback in general.

Furthermore, one component may include LOS channel feedback and the other component may include NLOS channel feedback. The LOS feedback may be protected more strongly than NLOS feedback. The LOS feedback may be quantized using more bits per entry than NLOS feedback.

As described above, an SVD may be done after channel estimation. Only the right singular matrix V may be used for the feedback. The mechanism to feed back the right singular matrix V implies that the beamformee performs SVD and feeds back the right singular vectors. It may be assumed that singular values are ordered in a descending way.

Due to the dynamic MU-MIMO scheduling and pairing from the beamformer's point of view (number of MU-MIMO users, index of users getting paired in the same MU-MIMO operation as well as the time varying channel condition between AP and all potential MU-MIMO receivers), the beamformer might use either a partial or full V matrix to carry out the MU-MIMO transmissions. For example, when the beamformer transmits two data stream packets, the beamformee may feed back only the first two columns of the V matrix. In this way an incremental request for CSI information may be supported.

Figure 14:
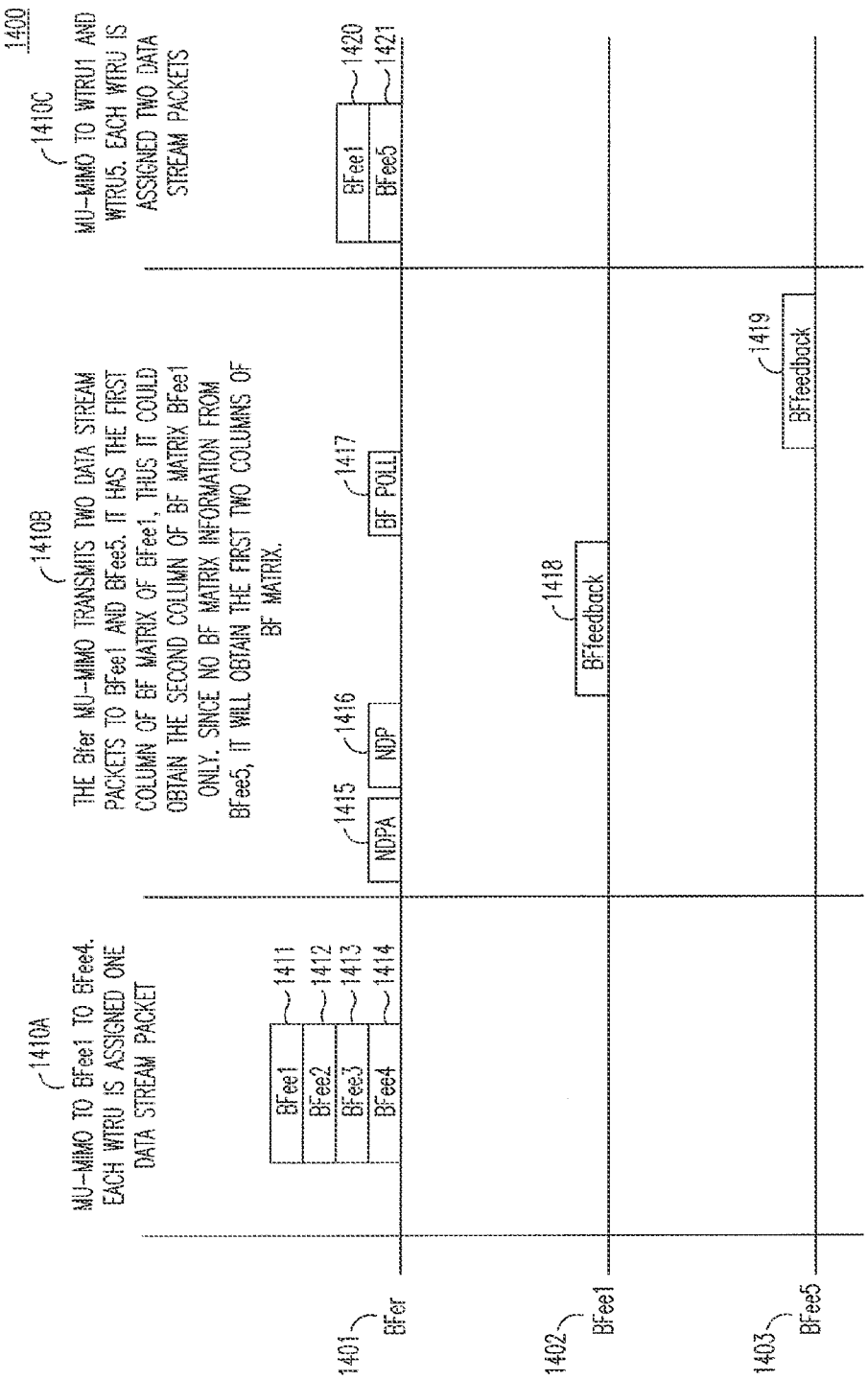
FIG. 14 shows an example of a MU-MIMO transmission using incremental BF feedback.

FIG. 14 shows an example of a MU-MIMO transmission using incremental BF feedback 1400. Note that an explicit BF/MU-MIMO may be assumed in this example. Beamformer (BFer) 1401, which may be an AP, may require the Beamformees (BFees) 1402 and 1403, which may be WTRUs, to feed back the CSI.

BFer 1401 may use the feedback to perform BF/MU-MIMO. BFer 1401 may perform MU-MIMO transmission 1410a to BFee1 through to BFee4. Each BFee may be assigned a single data stream packet 1411, 1412, 1413, and 1414 respectively. BFer 1401 may have knowledge of the first column of the V matrix of the BFees through a previous feedback transmission.

BFer 1401 may then choose to perform MU-MIMO 1410c to BFee1 1420 and BFee5 1421 where each BFee may be assigned two data streams by deriving knowledge of the second column of V matrix from BFee1 and the first two columns of the V matrix from BFee5 1410b. In this example BFer 1401 may only require BFee1 to feed back 1418 the second column of the V matrix because it already has the first column of the V matrix as stated above.

Nc may be identified in a NDPA frame 1415 and/or BF feedback frame 1418 and 1419 respectively, such that both BFer 1401 and BFee1 1402 may know that the first Nc columns of V matrix may be transmitted. Ms may be defined to enable incremental feedback and may be transmitted in the MAC header. Ms may represent the starting column of the V matrix which may be fed back. For example, with Ms=2, Nc=1, both BFer 1401 and BFee1 1402 may know that the second column of V matrix may be the only column needed.

Ms may be transmitted using various methods. In one example, BFer 1401 may initiate the sounding by sending a NDPA frame 1415 followed by a NDP frame 1416 and BF poll frame 1417 after a SIFS. BFer 1401 may include at least one WTRU info field for each BFee in the NDPA frame. The WTRU info field may be defined as shown in Table 5.

TABLE 5

| WTRU Info Field | | | |
|---|---|---|---|
| AID | Feedback Type | Nc Index | Ms Index |

Ms may also be transmitted using a very high throughput (VHT) compressed Beamforming frame, which may also be utilized to feed back the Beamforming matrix (V matrix). The VHT compressed Beamforming frame is an action frame. A VHT MIMO Control field, VHT compressed BF report field, and MU exclusive BF report field may be included in the frame body. The incremental feedback may be compressed following the previous feedback, i.e. it may continue to compress the corresponding columns of the V matrix based on the previously compressed first several columns of the V matrix. So the BFer may combine this feedback with the previous feedback to decompress the corresponding columns of V matrix. Alternatively or additionally, the incremental feedback may be independent with the previous feedback, i.e. the compression and decompression of the certain columns of V matrix do not depend on the previous feedback. The VHT compressed Beamforming frame may be defined as in Table 6.

TABLE 6

| VHT Beamforming frame | | | | | | | | | | |
|---|---|---|---|---|---|---|---|---|---|---|
| Nc Index | Nr Index | Ms Index | Channel Width | Grouping | Codebook Information | Feedback Type | Remaining Segment | First Segment | Reserved | Sounding Segment |

A sounding procedure with multi component feedback is may be used with any of the embodiments described herein. Two sounding PPDU formats may be used. One is referred to as the regular or staggered PPDU, which carries a MAC frame. The regular or staggered PPDU may be a normal PPDU with extended LTFs for channel sounding. Another is referred to as the null data packet (NDP), which does not carry a MAC frame, i.e. no MAC header is included in a NDP. Thus, a NDP may follow a PPDU which contains the necessary MAC information in its MAC header and sets the NDP Announcement bit to 1. Usually this kind of PPDU is called a null data packet announcement (NDPA).

Both immediate and delayed sounding feedback may be considered. The feedback may be standalone or aggregated with other packets. The BF feedback component index may be defined according to the detailed multi component feedback method utilized by the system. For example, if long term and short term are both to be utilized, a BF feedback component index of 0 may indicate long term feedback, while a BF feedback component index of 1 may indicate short term feedback. Note that it may be possible that one system utilizes more than one multi component feedback method, e.g., long term/short term feedback, wideband/subband feedback, and LOS/NLOS feedback may be utilized together. In this scenario, the index may be defined to cover all possibilities.

FIG. 15 shows an example of a beamformer initiated multi component sounding procedure in accordance with the description above and that may be used with any of the embodiments described herein 1500. In this example, beamformer 1501 may indicate the BF feedback component index in the MAC header 1510 of NDPA 1511 when a NDP 1512 is utilized. Beamformee 1502 may detect the BF feedback component index, and prepare the requested BF feedback 1514 component to beamformer 1501. When a staggered sounding PPDU is transmitted, the BF feedback component index may be included in the MAC header 1513 of the PPDU. In this example, beamformer 1501 may decide that one component of the BF feedback is enough, and include this information as the BF feedback component index in this sounding frame as shown in FIG. 15.

FIG. 16 is an example NDPA frame 1600. The NDPA frame 1601 may include a frame control 1610 field, duration 1611 field, RA 1612 field, TA 1613 field, sounding sequence 1614 field, WTRU information field such as WTRU info1 1615a to WTRU info n 1616, and FCS 1617 field. With more than one beamformee, as in the MU-MIMO case, the BF feedback (FB) component index 1615e field may also be defined in each WTRU info1 1615a field. The WTRU info1 1615a field may also include an association ID (AID) 1615b, FB type 1615c field, and Nc index 1615d field.

Alternatively, as shown in the example of FIG. 17, the BF feedback (FB) component index 1707 may be included in the NDPA frame, which is shared by all WTRUs indicated as the intended receiver by the frame 1700. The NDPA frame 1701 may also include a frame control 1702 field, duration 1703 field, RA 1704 field, TA 1705 field, sounding sequence 1706 field, WTRU information field such as WTRU info1 1708 to WTRU info n 1709, and FCS 1710 field.

When using multi component feedback, the beamformer may use some of the feedback components to perform some preprocessing. For example, MU-MIMO grouping may be performed based on several feedback components. Due to memory limitations, the beamformer, which may be the AP as in this example, may want to keep the more important channel component(s), and eliminate the less important channel component(s).

When explicitly feeding back multiple singular vectors from beamformee to beamformer, there may be different feedback periods for different modes. For example, the dominant singular vectors may be fed back with a longer period (less frequently) than the remaining singular vectors.

Furthermore, as described herein, implicit feedback may be used for dominant eigenmodes (relying on channel reciprocity) and explicit feedback may be used for the remaining eigenmodes. In such a case, less frequent implicit feedback may also be used (corresponding to uplink sounding) for the dominant eigenmodes than explicit feedback (corresponding to explicit uplink feedback) for the remaining eigenmodes.

Instead of feeding back the frequency domain channel response, the time domain channel impulse response may be fed back. This is motivated by the fact that typically, the number of samples in the frequency domain (number of subcarriers) is much larger than the number of samples in the time domain (number of taps). Time domain channel feedback may thus be able to reduce the overall feedback overhead. On the other hand, time domain channel feedback may provide not only the right singular vectors of the channel, but also the left singular vectors of the channel as well as the singular values of the channel.

If channel estimation is done in the frequency domain, the obtained frequency domain channel response may be first transformed to time domain channel response via inverse fast fourier transform (FFT). The time domain channel may be represented by a three-dimension channel matrix:

$$H_{Nr \times Nt \times L} = \{h_{i,j,k}\}_{i=0,\ldots,Nr-1; j=0,\ldots,Nt-1; k=0,\ldots,L-1} \quad \text{Equation 12}$$

where Nr is number of receive antennas, Nt is number of transmit antennas, L is number of taps, i is index of receive antennas, j is index of transmit antennas, and k is index of multipath taps.

The three-dimensional channel matrix may be fed back using direct element wise feedback. For each complex entry, the real part (using quantization of a real scalar) and the imaginary part (using quantization of a real scalar) may be quantized separately. Alternatively, the amplitude (using quantization of a positive real scalar) and phase (using quantization of an angle between 0 and $2\pi$) may be quantized separately.

FIG. 18 shows an example in which Givens rotation based decompositions may be used to feed back the multipath channel taps 1800. In the example of FIG. 18, the STF/LTF/SIG 1817 fields precede a MAC frame 1818. Within the MAC frame may be feedback for each tap and antenna 1814, 1815, and 1816. Within each feedback for each tap and antenna may be a tap index 1810 field, antenna index 1811 field, tap delay spread 1812, and Givens rotation based feedback for the channel vector on ith tap and jth rx antenna 1813.

For this example, h may be defined as a time domain channel vector, corresponding to either a transmit-antenna-receive-antenna pair $\{h_{i,j,:}\}$, a transmit-antenna-multipath pair $\{h_{:,j,k}\}$, or a receive-antenna-multipath pair $\{h_{i,:,k}\}$. Each vector may be expressed as the vector strength h as well as the vector direction $$\frac{h}{|h|}$$

of unit norm. While the vector strength may be quantized as a single positive real number, quantization of the vector direction is used for this example. In the following, $$\left\{ \frac{h_{i,:,k}}{|h_{i,:,k}|} \right\}$$

may be used for example, where there are Nr*L such vectors, each of size Nt×1.

Givens rotation based decompositions may be used on each unit-norm vector essentially decomposing the vector into multiple angles ($\Phi$'s and $\Psi$'s) that may be quantized separately. Diagonal phase rotations ($\Phi$'s) may be used to remove imaginary parts from the original vector. As a result of this step, there is a real-valued unit norm vector of size Nt*1. Next, for each real-valued entry from the second entry of the vector to the last entry of the vector, a Givens rotation ($\Psi$'s) may be used to transform that entry to 0. In this example, the first entry of the vector is real value 1. As a result of this step, there is a unit norm vector with the first entry 1 and all other entries 0. Then, quantization of the angles $\Phi$'s and $\Psi$'s, each with a finite number of bits N_$\Phi$ and N_$\Psi$ may be performed. All angles $\Phi$'s and $\Psi$'s thus uniquely (together with their ordering info) determine the original vector before decomposition, and may be used to reconstruct the original vector. For those vectors with relatively larger vector strength $\{|h_{i,:,k}|\}$, a larger number of bits N_$\Phi$ (N_$\Psi$) to quantize the angles $\Phi$ and $\Psi$ may be used.

In certain cases a hybrid of frequency domain channel feedback and time domain channel feedback may be used. In particular, the long term channel mean may be fed back separately in the time domain. This is possible because the long term channel mean does not change much across the frequency domain. In such a case, the difference between the instantaneous channel and the long term channel mean may be different across the frequency domain, and may be fed back individually for all subcarriers in the frequency domain.

On the other hand, the LOS component may be fed back in the time domain, while the NLOS component of the channel may be fed back in the frequency domain.

When transmit beamforming is used, the channel state information may be obtained in two different general methods. One method may be implicit feedback, wherein the uplink channel (from WTRU to AP) may be treated as reciprocal to the downlink channel (from AP to WTRU). As such, the AP may measure the uplink channel first and derive the downlink beamforming vectors based on the uplink channel. Notice that channel reciprocity applies mainly for time division duplexing (TDD), where the uplink/downlink transmissions use the same carrier frequency. Also, the channel may refer to the physical radio channel only, while the transmitter/receiver RF parts may not be reciprocal and need to be calibrated in advance. The need for calibration to some extent may limit the use of implicit feedback.

The other method may be explicit feedback, which may not require RF calibration. In this case, the receiver (WTRU) may estimate the downlink channel and send back information of the downlink channel to the transmitter (AP), in the form of time domain CSI, freq domain CSI, recommended precoders, or others. Explicit feedback does not suffer from any transmitter/receiver RF mismatch, but does require WTRU's cooperation to perform the feedback.

Implicit feedback for dominant eigenmodes and explicit eigenmodes and explicit feedback for remaining eigenmodes are disclosed:

$H_d = U_d S_d V_d'$ may be defined as an SVD of the downlink channel $H_d$, where $U_d = [u_{1d}, u_{2d}, u_{3d}, \ldots]$ are the left singular vectors, $S_d = \text{diag}([s_{1d}, s_{2d}, s_{3d}, \ldots])$ are the singular values in a decreasing order, and $V_d = [v_{1d}, v_{2d}, v_{3d}, \ldots]$ are the corresponding right singular vectors. The collection of $\{u_{1d}, s_{1d}, v_{1d}\}$ may be known as the first dominant eigenmode of the downlink channel $H_d$, and the collection of $\{u_{2d}, s_{2d}, v_{2d}\}$ may be known as the second dominant eigenmode of the downlink channel $H_d$, and so on.

$H_u = U_u S_u V_u'$ may be defined as the SVD of the downlink channel $H_u$, where $U_u = [u_{1u}, u_{2u}, u_{3u}, \ldots]$ are the left singular vectors, $S_u = \text{diag}([s_{1u}, s_{2u}, s_{3u}, \ldots])$ are the singular values in a decreasing order, and $V_u = [v_{1u}, v_{2u}, v_{3u}, \ldots]$ are the corresponding right singular vectors. The collection of $\{u_{1u}, s_{1u}, v_{1u}\}$ may be known as the first dominant eigenmode of the downlink channel $H_u$, and the collection of $\{u_{2u}, s_{2u}, v_{2u}\}$ may be known as the second dominant eigenmode of the downlink channel $H_u$, and so on.

Implicit feedback may be used to acquire dominant eigenmodes at the transmitter (AP), and explicit feedback may be used to acquire residual eigenmodes (or part of the residual eigenmodes) at the transmitter (AP). In general, the dominant eigenmodes are less susceptible to uplink/downlink mismatches if any.

Examples below are disclosed with the first eigenmode as the dominant eigenmode. The transmitter may receive $\{u_{1u}, s_{1u}, v_{1u}\}$ directly from an uplink measurement, as an estimate of the downlink $\{u_{1d}, s_{1d}, v_{1d}\}$ which may otherwise be fed back explicitly. On the other hand, for all the remaining eigenmodes $\{u_{2d}, s_{2d}, v_{2d}\}, \{u_{3d}, s_{3d}, v_{3d}\}$ and so on the transmitter may rely on explicit feedback. The overall channel may be reconstructed as:

$$H = s_{1u} u_{1u} v'_{1u} + s_{2d} u_{2d} v'_{2d} + s_{3d} u_{3d} v'_{3d} + \quad \text{Equation 13}$$

In the above, when eigenmode is referenced, it is referring to the collection of the singular values and vectorss $\{u_{1u}, s_{1u}, v_{1u}\}$.

In some cases, the right singular vectors may only be needed for each mode, e.g. when SU-MIMO communications may be done. As such, implicit feedback may be used to acquire dominant right singular vectors, and explicit feedback may be used to acquire remaining right singular vectors.

In some other cases, only the right singular vectors may be needed as well as the singular values for each mode. As such, implicit feedback may be used to acquire the singular values and right singular vectors for the dominant eigenmodes, and explicit feedback may be used to acquire the singular values and right singular vectors for the remaining eigenmodes.

Figure 19:
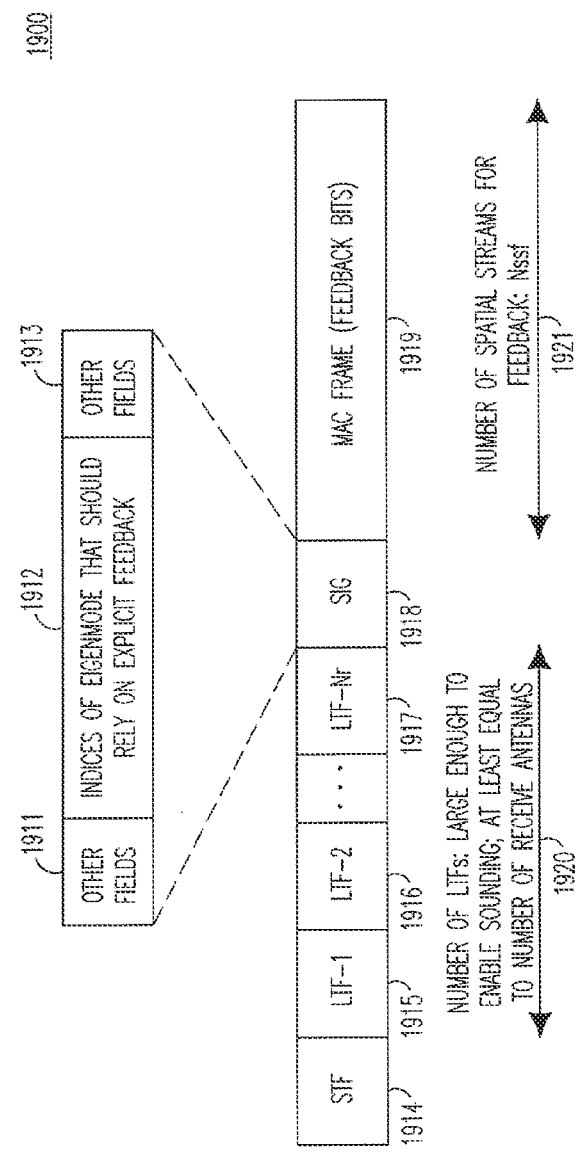
FIG. 19 is an illustration of frame format for feedback.

FIG. 19 shows an example frame format for enable the hybrid implicit/explicit feedback, which may be used in accordance with another embodiment and in combination with any of the embodiments described herein 1900. The MAC frame 1919 may contain the actual feedback bits from the non-dominant eigenmodes, using a certain MCS. One spatial stream for feedback 1921 transmission may be used to send out the feedback from the receiver side. In this case, following STF 1914, one LTF-1 1915 may be used to deliver the explicit feedback. However, there may be more than one LTF used, and the number of LTFs may be at least equal to the number of receive antennas 1920 in order for the transmitter to be able to estimate the entire uplink channel. This is shown in FIG. 19 with LTF-2 1916 to LTF-Nr 1917. Furthermore, SIG 1918 may include indices of eigenmodes that should be relied on for explicit feedback 1912 in addition to other fields 1911 and 1913 that may be included.

Figure 20A:
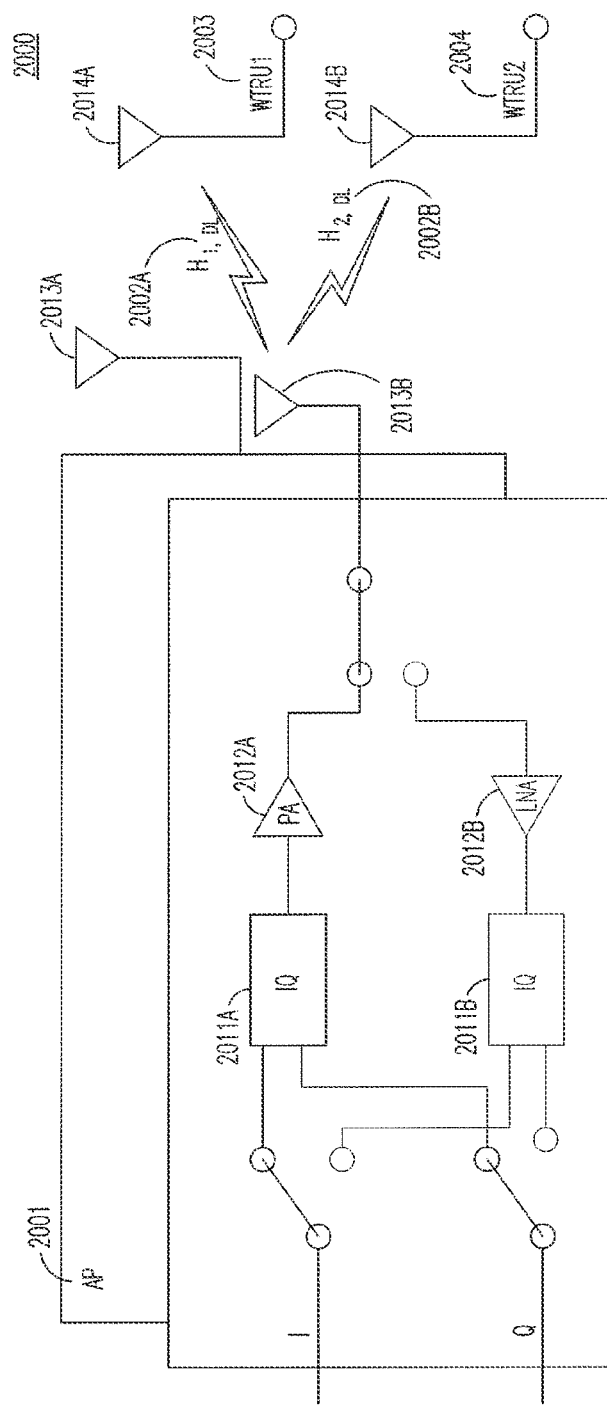
FIG. 20A is an example of transceiver paths for MU-MIMO at the AP side for the downlink channels.
Figure 20B:
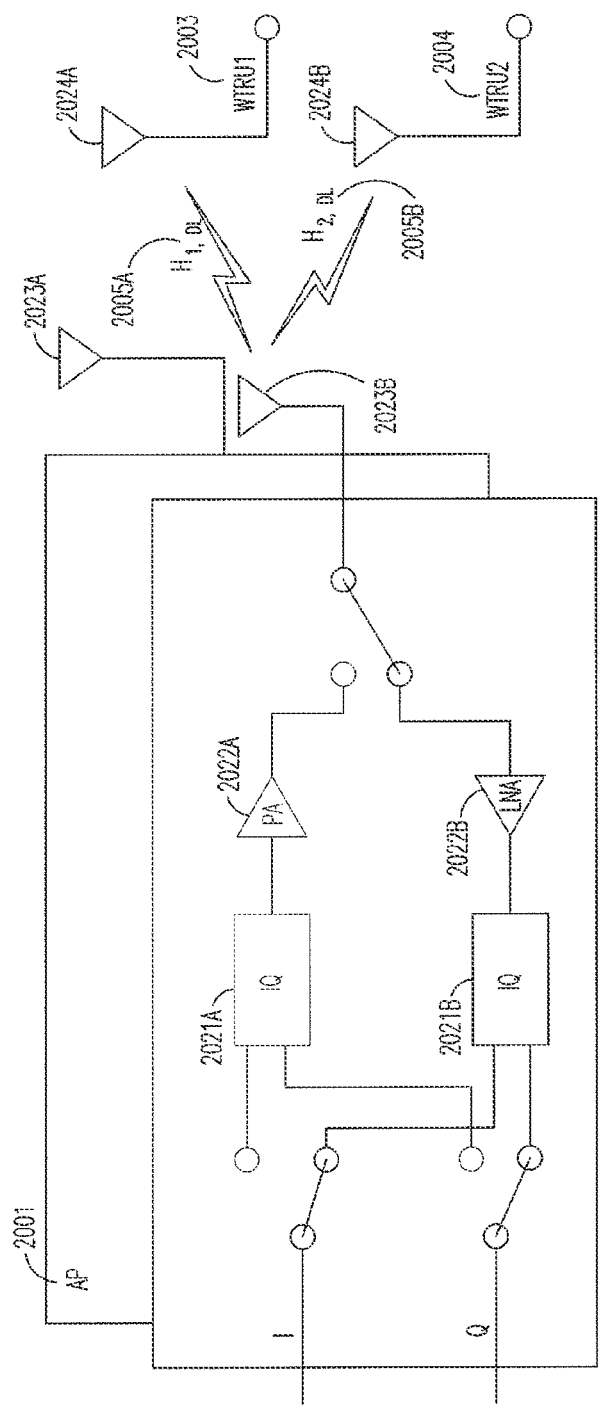
FIG. 20B is an example of transceiver paths for MU-MIMO at the AP side for the uplink channels

FIG. 20A-20B show an example of the downlink and uplink channels in an AP 2000. The far-field transmit/receive beam patterns for an antenna may be equivalent based on electromagnetic reciprocity. Hence, for WLAN systems using TDD (time division duplexing), the propagation channel $H_{DL}$ in the downlink (from AP to WTRU) is reciprocal to the propagation channel $H_{UL}$ in the uplink (from WTRU to AP). Mathematically this may be expressed as $H_{DL} = H'_{UL}$. Here $H_{DL}$ may be of size Nr*Nt, with Nr being number of receive antennas at WTRU side and Nt being number of transmit antennas at AP side.

In the examples of FIGS. 20A and 20B, the propagation channel between AP 2001 and WTRUs in the downlink and uplink may be reciprocal. However, the interference may not be reciprocal. In WLAN systems, interference signals may be WiFi signals from adjacent APs and WTRUs, or Bluetooth/microwave signals. More importantly, different I/Q mixers may be used in the transmitter path and receiver path. Furthermore, different amplifiers may be used in the transmitter path and receiver paths. Finally different path lengths and antennas may be used in the transmitter path and receiver paths.

As shown in the example of FIG. 20A, the propagation channel in the downlink between AP 2001 and WTRU1 2003, $H_{1,DL}$ 2002a, uses I/Q mixer 2011a, amplifier 2012a, and antennas 2013b and 2014a (as opposed to I/Q mixer 2011b, amplifier 2012b, and antenna 2013a). Similarly, the propagation channel in the downlink between AP 2001 and WTRU2 2004, $H_{1,DL}$ 2002b, uses I/Q mixer 2011a, amplifier 2012a, and antennas 2013b and 2014b.

However as shown in FIG. 20B, the propagation channel in the uplink between AP 2001 and WTRU1 2003, $H_{1,UL}$ 2005a, uses I/Q mixer 2021b, amplifier 2022b, and antennas 2023b and 2024a (as opposed to I/Q mixer 2021a, amplifier 2022a, and antenna 2023a). Similarly, the propagation channel in the downlink between AP 2001 and WTRU2 2004, $H_{2,UL}$ 2005b, uses I/Q mixer 2021b, amplifier 2022b, and antennas 2023b and 2024b.

Hence, the overall channel which includes the radio propagation path as well as the analog frontend may not be reciprocal. The RF distortion may be modeled as a diagonal matrix $H_{DL} = H'_{UL} \cdot \Lambda$, where $\Lambda = \text{diag}(\lambda_1 e^{j\alpha_1}, \lambda_2 e^{j\alpha_2}, \ldots \lambda_{Nt} e^{j\alpha_{Nt}}), \lambda_n$, represents the amplitude error on the nth antenna path, and $\alpha_n$ represents the phase error on the nth antenna path. The diagonal structure of the distortion matrix stems from the assumption that antenna coupling is very low, which may be true in most cases. Antenna calibration may be used to remove the distortion caused by the antenna coupling. In practice, due to internal temperature changes in the electronics and due to oscillator drifts, frequent antenna calibration may be desired.

Figure 21:
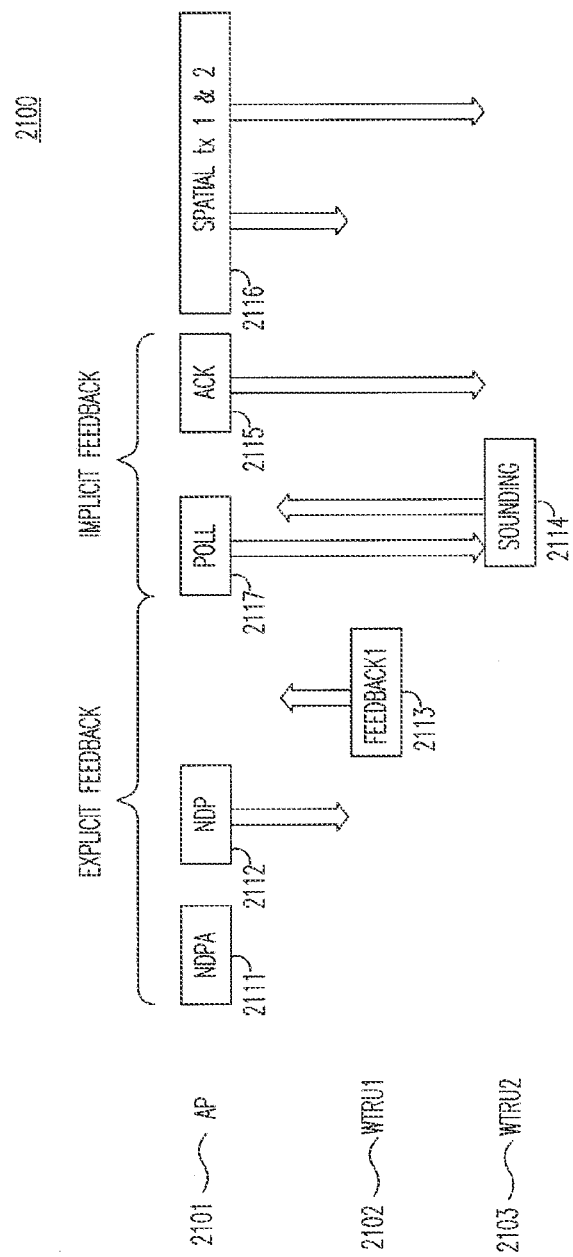
FIG. 21 is an example of hybrid feedback for MU-MIMO.

FIG. 21 shows an example of a MU-MIMO procedure based on hybrid feedback 2100. AP 2101 may transmit an NDPA frame 2111, which may include WTRU1's 2102 address, WTRU2's 2103 address, and also specify that WTRU1 2102 may perform explicit feedback, while WTRU2 2103 may perform implicit feedback. On receiving NDPA frame 2111 and NDP frame 2112, WTRU1 2102 may prepare for channel estimation and beamforming reporting, while WTRU2 2103 may prepare for uplink sounding. Other WTRUs in the system may choose to hibernate. AP 2101 may then transmit an NDP frame 2112 to WTRU1 2102 and WTRU2 2103. WTRU1 2102 may transmit feedback 2113 that includes the CSI corresponding to $H_1 DL$, using a beamforming report. This beamforming report may be sent with N_g=1, so that the calibration may be done by AP 2101. The LTFs in the feedback 2113 packet may enable AP 2101 to estimate the uplink channel from WTRU1 2102.

Upon receiving feedback from WTRU1 2102, AP 2101 may then reconstruct the downlink channel from the beamforming report. At the same time, AP 2101 may estimate the uplink channel directly based on the LTFs. With these two estimates, AP 2101 may then calculate the instantaneous calibration correction matrix Λ. The AP may then transmit a poll packet 2117 requesting WTRU2 2103 to transmit a sounding packet 2114. WTRU2 2103 may transmit an uplink sounding packet 2114. AP 2101 may transmit an ACK 2115 and then estimate the uplink channel $H_2^{UL}$ based on the LTFs in the preamble of the sounding packet 2114. AP 2101 may then estimate the downlink channel $H_2^{DL}$ using the estimated channel $H_2^{UL}$ as well as the uplink/downlink calibration correction matrix Λ. AP 2101 may then calculate the precoder based on $H_1^{DL}$ and $H_2^{DL}$ and transmit spatial MU-MIMO packets 2116 to WTRU1 2102 and WTRU2 2103 using the calculated precoders.

This example MU-MIMO hybrid feedback procedure may allow for frequent calibration updates without high feedback overhead. Calibration may be performed between the transmitter and receiver chains of AP 2101. Hence it may be sufficient to perform the calibration procedure with any individual WTRU in a MU-MIMO group. APs that know the uplink channel and downlink channel for any WTRU in the group may perform a calibration procedure. Thus, once WTRU1 2102 is calibrated by Λ, the same calibration may be applied for WTRU2 2103 from the AP 2101 side. As a result, explicit feedback of WTRU2's channel may not be necessary.

Although two WTRUs are used in the example of FIG. 21, this procedure may be extended to more than two WTRUs. The explicit feedback may be applied to one of the WTRUs, and implicit feedback may be applied to the rest of WTRUs. A plurality of criteria may be evaluated for choosing which WTRU may be used for the explicit feedback. For example, the WTRU with the strongest RSSI may be chosen.

Figure 22:
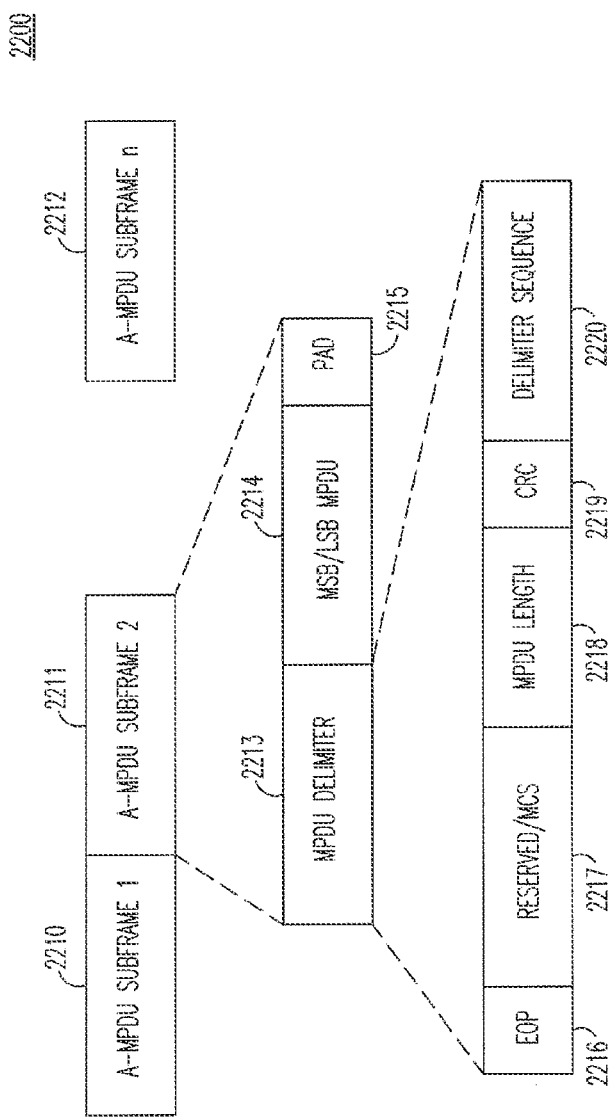
FIG. 22 is an illustration of unequal protection for bits of unequal importance.
Figure 23:
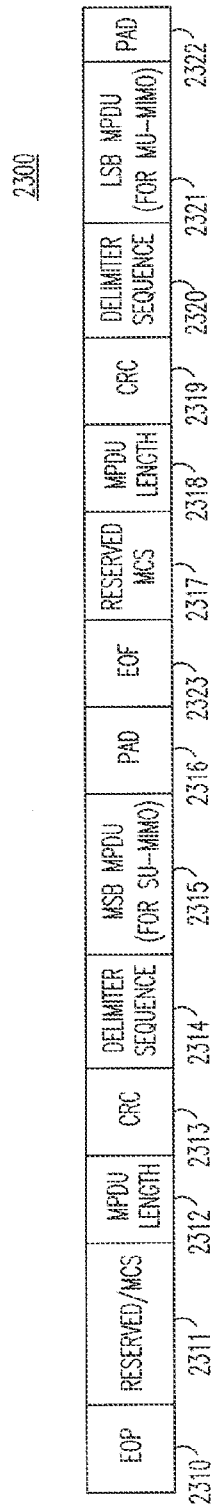
FIG. 23 is an illustration of using different CRC for MSB MPDU for SU/MU-MIMO and LSB MPDU for MU-MIMO.

FIGS. 22 and 23 show examples of how prioritization of the beamforming report may be performed, which may be used in accordance with yet another embodiment and in combination with any of the embodiments described herein.

Compressed beamforming reports are used in IEEE 802.11ac, where each right singular matrix may be decomposed to multiple unitary matrices with each unitary matrix represented by a parametric angle Φ (within the range of [0, 2π]) or Ψ (within the range of [0, π/2]). Each angle may then be quantized uniformly within its range, represented by a finite number of bits $b_0, b_1, b_2, \ldots, b_{t-1}$, where t is the number of bits to represent an angle, $b_0$ is the least significant bit (LSB), and $b_{t-1}$ is the most significant bit (MSB). Depending on the SU/MU operation or desired accuracy, t=4, 5, 6, 7, 8, or 9 and may be configurable.

However, different feedback bits $b_0, b_1, b_2, \ldots, b_{t-1}$ for each angle carry different weights, and as a result errors in different feedback bits may have a different impact on the feedback quality in general. For example, for Ψ (within the range of [0, π/2]), a bit error of $b_0$ may have a much smaller impact than a bit error of $b_{t-1}$, especially with a large value for t. Thus, more significant bits (MSB or its nearest neighbors) may need more secure protection than less significant bits (LSB or its nearest neighbors).

FIG. 22 shows an example in which unequal protection of feedback bits of unequal significance is applied in order to enable improved protection and security of the MSBs 2200. Different feedback bits with unequal significance may be protected differently, possibly via different MCS. It may be possible to group the MSBs of all angles together into a MSB subframe, and group the LSBs of all the angles together into a LSB subframe. Different error protection mechanisms may then be used. For example, a more robust MCS (lower code rate, smaller constellation size) may be used to carry the MSB subframe. On the other hand, a less robust MCS (higher code rate, larger constellation size) may be used to carry the LSB subframe.

The example of FIG. 22 enables unequal protection of feedback bits by using aggregate MPDUs (A-MPDUs) 2210, 2211, 2212. Within a single A-MPDU 2211 the MSB subframe and LSB subframe 2214 may aggregated together as independent subframes followed by a pad field 2215. The reserved bit 2217 in the MPDU delimiter 2213 may be reused for the purpose of an MCS indication. The MPDU delimiter 2213 may also include an end of frame (EOF) field 2216, MPDU length field 2218, CRC field 2219, and a delimiter sequence 2220. Such unequal error protection of the feedback bits may allow more efficient radio resource utilization in the feedback link.

FIG. 23 shows an example in which separate CRC checks for feedback bits of unequal importance may also be used to help differentiate error events of different feedback bits 2300. Instead of discarding an entire feedback packet following a CRC failure, separate CRCs 2313 and 2319 may be applied to the feedback content, which may be divided into multiple subframes. In this way each subframe may be supplied with a separate CRC such that only the subframe with the failed CRC may be discarded. Meanwhile other subframes with a passing CRC may still be fed back to the transmitter to provide useful channel info, which may be used for beamforming, help user selection, or interference coordination.

This example may be used in combination with A-MPDU aggregation as described in other embodiments herein. For example, a further step may be to divide the feedback frame into multiple subframes according to their importance, e.g. a MSB MPDU subframe 2315 and a LSB MPDU subframe 2321 with a separate CRC 2313 and 2319 respectively. As a result, if the LSB MPDU subframe 2321 CRC fails and MSB MPDU subframe 2315 CRC passes, there may still be some level of channel information to assist in beamforming, in user selection for MU-MIMO, or in interference coordination.

One application of this method is when both SU/MU feedback is being performed. For example, MU feedback may use 3 extra bits for each angle. As a result, when 4-bit quantization is used for each angle Ψ in the SU feedback, then 7-bit quantization may be used for each Ψ in the MU feedback mode. In this case, the entire feedback frame may be separated into two subframes, the SU-subframe that contains 4 more significant bits for each angle and the MU-subframe that contains the remaining three less significant bits for each angle. In such a case, if the MSB MPDU subframe 2315 (for SU feedback) CRC passes and the LSB MPDU subframe 2321 (for MU feedback) CRC fails, then SU beamforming or other transmission schemes that are implementation dependent may be performed instead of not doing any transmission at all. The example of FIG. 23 shows that each feedback subframe also may also be sent with EOF fields 2310 and 2323 respectively, MCS fields 2311 and 2317 respectively, MPDU length fields 2312 and 2318 respectively, delimiter sequences 2314 and 2320 respectively, and pad fields 2316 and 2322 respectively.

When beamforming is used, the preamble may be designed such that the LTFs are beamformed with the same precoding matrix as used for the data. This precoding matrix is usually the right singular matrix, V, from the SVD. The composite channel (physical channel+precoding matrix) may then be estimated at the receiver using the LTFs. Since the composite channel is not necessarily smooth, channel estimation techniques such as least-squares smoothing cannot be used at the receiver.

Figure 24:
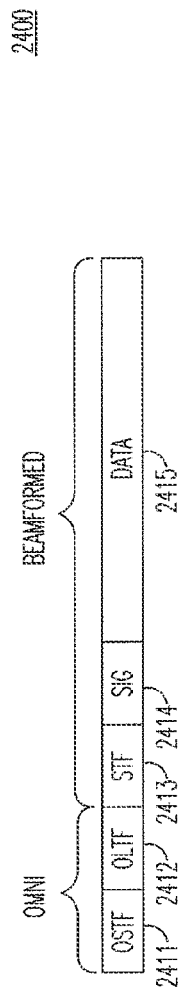
FIG. 24 is an example preamble design for beamforming.

FIG. 24 shows an example preamble structure that may enable smoothing at the receiver in accordance with yet another embodiment, which may be used in combination with any of the other embodiments described herein 2400. The OSTF 2411 and OLTF 2412 fields may be sent in an omni mode and may be used by the receiver to estimate the physical channel directly, using a smoothing method. The number of OLTFs 2412 may be sufficient to estimate the channel for each transmit antenna. Beamforming may then begin from the STF 2413 which may be used to set the automatic gain control (AGC) at the receiver. In order to enable such a preamble, the receiver may know separately the precoding matrix that could be used based on the STF 2413, SIG 2414, and DATA 2415 fields.

Figure 25:
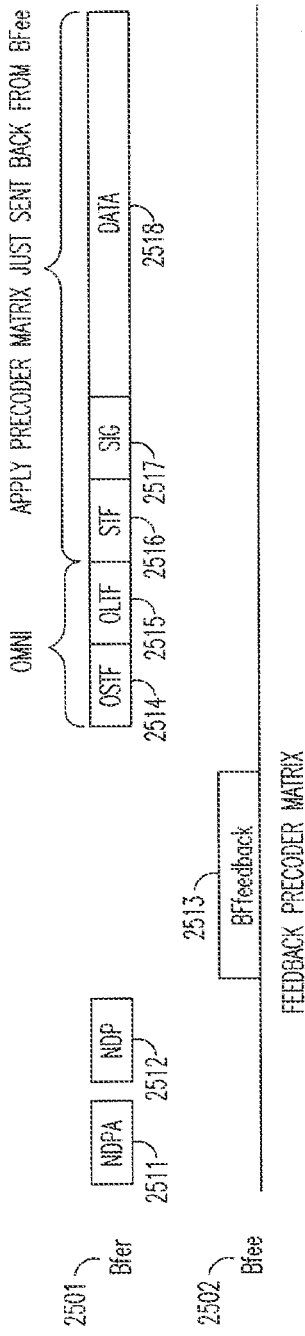
FIG. 25 is an example signaling procedure for single user beamforming.

FIG. 25 shows an example signaling procedure for single user beamforming that allows beamforming using the preamble described above 2500. Beamformer (BFer) 2501, which may be an AP, may send a NDPA 2511 followed by an NDP 2512. Beamformee (BFee) 2502, which may be a WTRU, may use NDP 2512 to perform channel estimation and may use smoothing methods if desired. BFee 2502 may then compute a precoding matrix and may transmit the precoding matrix in a BF Feedback frame 2513 using compressed feedback or other feedback methods. BFer 2501 may then use the preamble and the precoder matrix that it received from BFee 2502 to transmit the data. The preamble structure may include the OSTF 2514 and OLTF 2515 fields transmitted in omni mode and STF 2516 and SIG 2517 fields followed by the data packet 2518. BFee 2502 may then use the omni LTFs to estimate the physical channel and may use smoothing if desired. BFee 2502 may then use the precoding matrix it computed during the channel sounding phase to decode the data packet 2518. This procedure may enable smoothing of channel estimates on both links and performance enhancement. BFee 2502 may combine the channel estimates it computed from the NDP 2512 and the OLTF 2515 to further refine the channel estimate.

Figure 26:
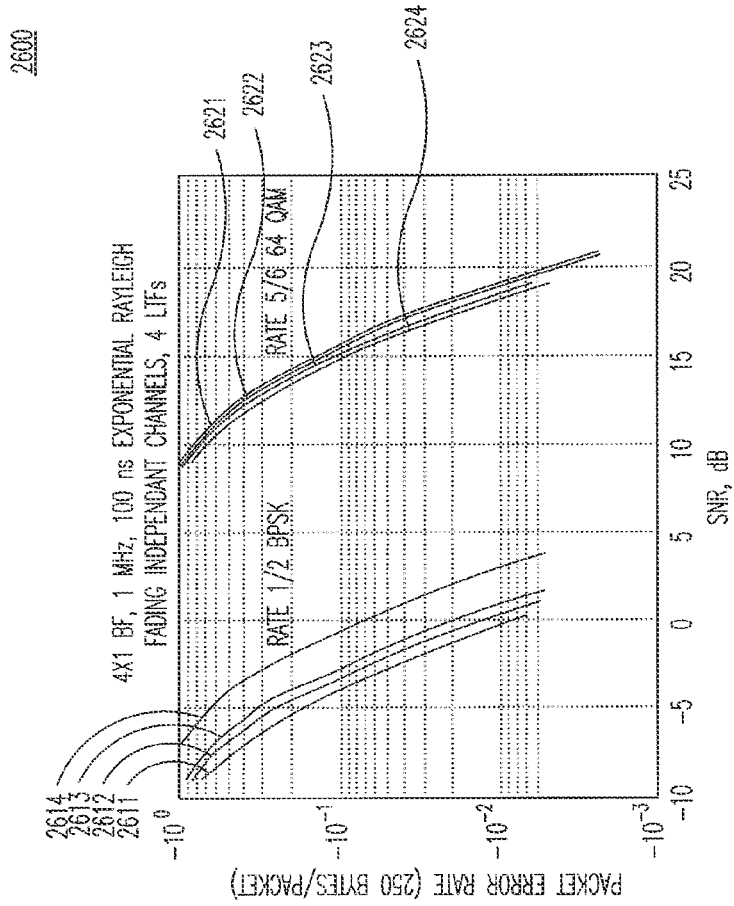
FIG. 26 is an illustration of the performance of channel smoothing in beamformed transmissions.

FIG. 26 shows simulation results from when smoothing is enabled on the data transmission using the preamble structure of FIG. 24 and the signaling procedure in FIG. 25 2600. The example of FIG. 26 shows a performance improvement of about 0.75 dB may be obtained for 100 ns rms delay spread channels using rate ½ binary phase-shift keying (BPSK) on perfect channels on sounding and transmission 2611, channels applying least square (LS) estimation on sounding and transmission 2612, channels applying LS estimation on sounding with zero-forcing (ZF) on transmission 2613, and channels applying ZF on sounding and ZF on transmission 2614.

Similarly, a performance improvement of about 0.75 dB may also be obtained for 100 ns rms delay spread channels using rate 5/6 64 Quadrature amplitude modulation (QAM) on perfect channels on sounding and transmission 2621, channels applying LS estimation on sounding and transmission 2622, channels applying LS estimation on sounding with ZF on transmission 2623, and channels applying ZF on sounding and ZF on transmission 2624.

Figure 27:
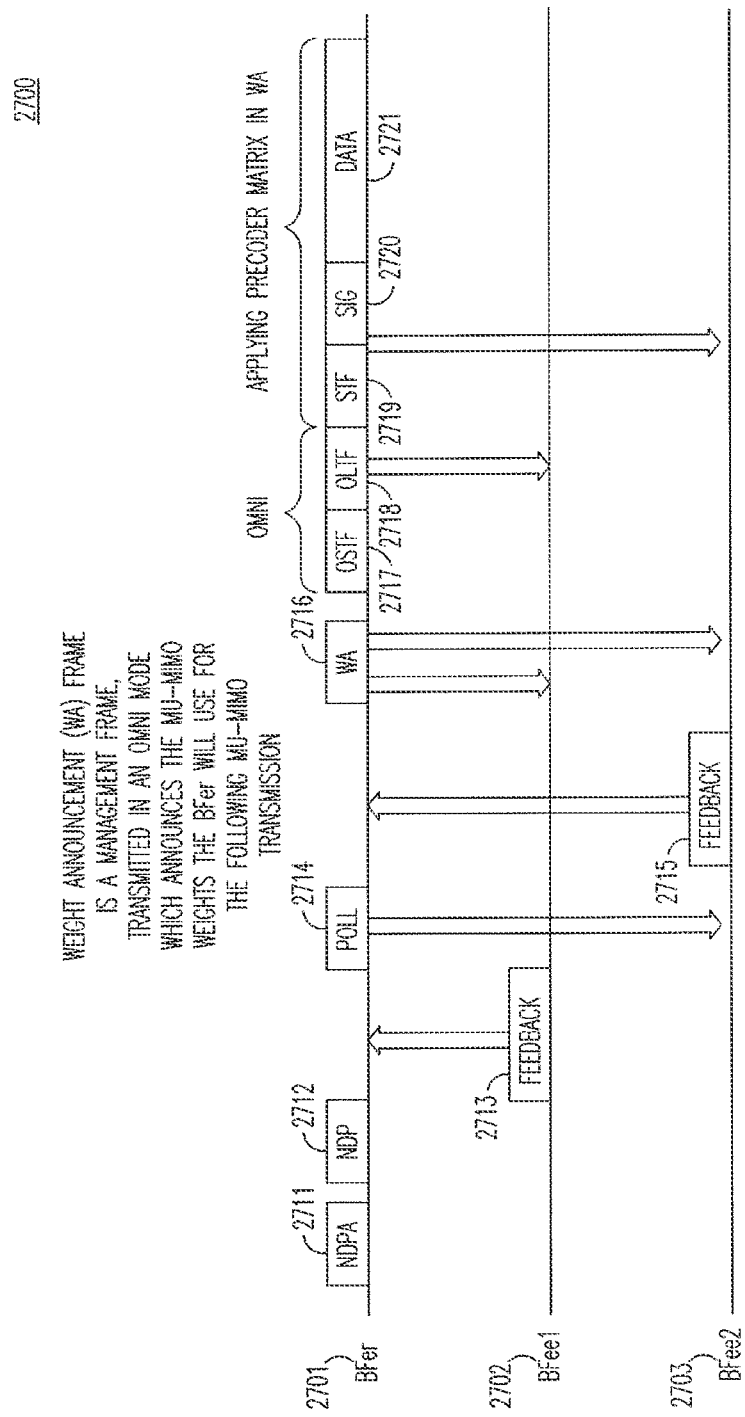
FIG. 27 is a signaling procedure for Multi-User MIMO.

FIG. 27 shows an example signaling procedures for MU MIMO 2700. BFer 2701, which may be an AP, may send a NDPA 2711 followed by an NDP 2712. BFee1 2702, which may be a WTRU, and BFee2 2703, which may be a second WTRU, may then transmit their individual BF feedback packets 2713 and 2715 to BFer 2701. In this example BFer 2701 also may transmit a poll 2714 to BFee1 2702 and BFee2 2703. BFer 2701 may then compute the precoder matrix to be used and may transmit this information in a weight announcement (WA) frame 2716 in omni mode. After an SIFS interval, the MU data packet 2721 may be transmitted using the preamble structure described above. Specifically, the MU data may be transmitted with the OSTF 2717, OLTF 2718, STF 2719, and SIG 2720 fields.

Since the WA frame 2716 may be transmitted in omni mode, it may be more robust than the MU data packet 2721 following it and may be received without errors. A modification to the procedure may allow an ACK exchange between BFer 2701 and BFees 2702 and 2703 before transmission of the precoded data packet 2721 in order to ensure that the WA frame 2716 may be received error-free by all BFees.

In the case where BFee1 2702 and BFee2 2703 may receive transmissions from each other and may have the capability to decode the BF feedback packets 2713 and 2715 from each other, the WA frame may be further simplified. A set of MU-MIMO weight calculation schemes may be predefined and assigned an MU-MIMO weight mode index to them. For example, index 0 may represent ZF; index 1 may represent MMSE, etc. BFer 2701 and BFee1 2702 and BFee2 2703 may know exactly the method by which these predefined MU-MIMO weight calculation algorithms may be performed. As a result the WA frame 2716 may include the MU-MIMO weight mode index with no need to transmit the full set of MU-MIMO weights. Alternatively, the WA frame 2716 may be omitted and the MU-MIMO weight mode index may be transmitted in the NDPA frame 2711. In this way, the NDPA frame 2711 may be modified to contain this index. On receiving BF feedback 2715 from BFee2 2703, BFee1 2702 may calculate the MU-MIMO weight to be used according to its own channel and channel feedback from BFee2 2703. BFee2 2703 may calculate the MU-MIMO weight for itself in the same way.

Processing at the receiver may also enable smoothing. The number of antennas at the transmitter may be defined as $N_T$ and the number of antennas at the receiver and number of data streams may be defined as $N_R$ where $N_T \geq N_R$. The received signal vector $\underline{r}_k$ on frequency bin k,k=0, . . . N−1 may then be represented as:

$$\underline{r}_k = H_k V_k \underline{a}_k + \underline{n}_k \qquad \text{Equation 14}$$

where $\underline{r}_k$ is the received vector of length $N_R$ and $\underline{a}_k$ may be the transmitted data vector of length, $N_R$, and $\underline{n}_k$ is the complex additive Gaussian noise vector of length $N_r$. The channel matrix $H_k$ may then be defined as $N_R \times N_T$ with a SVD decomposition given by $H_k = U_k S_k V_k^H$, where $U_k$ and $V_k$ are unitary matrices and $S_k$ is a diagonal matrix of non-negative, real, singular values. It may be assumed that the right singular matrix $V_k$ is used to precode the data. Hence, the above received signal model may be reduced to:

$$\underline{r}_k = U_k S_k \underline{a}_k + \underline{n}_k \qquad \text{Equation 15}$$

Usually, the composite channel matrix $\tilde{H}_k = U_k S_k$ is estimated directly from the LTFs and used in subsequent data decoding. However, by doing so, no channel smoothing may be done.

Alternatively, because SVD was performed at the receiver, it already may have obtained the left singular matrix, $U_k$, and hence it may be used explicitly as follows:

$$\underline{\tilde{r}}_k = U_k^H \underline{r}_k = S_k \underline{a}_k + \underline{n}_k \qquad \text{Equation 16}$$

Now, the channel estimation may be done on a per-data stream basis as follows. Consider the $i^{th}$ element of $\underline{\tilde{r}}_k$, $i = 1, \ldots N_R$:

$$\tilde{r}_{k,i} = S_{k,i} a_{k,i} + n_{k,i} \qquad \text{Equation 17}$$

Define the N×1 vectors $\underline{t}_i = [\tilde{r}_{0,i}, \tilde{r}_{1,i} \ldots \tilde{r}_{N-1,i}]^T$, $\underline{L}_i = [S_{0,i} S_{1,i} \ldots S_{N-1,i}]^T$, $\underline{d}_i = [a_{0,i} a_{1,i} \ldots a_{N-1,i}]^T$, $\underline{w}_i = [n_{0,i} n_{1,i} \ldots n_{N-1,i}]^T$, and the data matrix $D = \text{diag}(\underline{d}_i)$. Then for the $i^{th}$ data stream:

$$\underline{t}_i = D\underline{L}_i + \underline{w}_i \qquad \text{Equation 18}$$

Note that the elements of the channel vector $\underline{L}_i$ may all be composed of singular values, which are by definition non-negative real values. Since these may be the channel coefficients in the frequency domain, the equivalent time-domain response, $\underline{l}_i$, may be symmetric, i.e. $l_{i,h} = l^*_{N-k}$. $E_N$ may be defined as the Fourier matrix of dimension N. Then:

$$\underline{L}_i = F_N \underline{l}_i \qquad \text{Equation 19}$$

The fact that the length of the channel impulse response, $L_h$, in time is usually much less than the FFT size N, may be used to form the N×(2$L_h$+1) matrix G and (2$L_h$+1) vector $\underline{h}_i$ as follows:

$$G = [\underline{F}_{N,0} 2Re\{\underline{F}_{N,1}\} - 2Im\{\underline{F}_{N,1}\} 2Re\{\underline{F}_{N,2}\} - 2Im\{\underline{F}_{N,2}\} \ldots 2Re\{\underline{F}_{N,L_h}\} - 2Im\{\underline{F}_{N,L_h}\}] \qquad \text{Equation 20}$$

$$\underline{h}_i = [l_{i,0} Re\{l_{i,1}\} Im\{l_{i,1}\} Re\{l_{i,2}\} Im\{l_{i,2}\} \ldots Re\{l_{i,L_h}\} Im\{l_{i,L_h}\}]^T \qquad \text{Equation 21}$$

where $\underline{F}_{n,j}$ is the $j^{th}$ column of $F_N$ and $l_{i,j}$ is the $j^{th}$ component of $\underline{l}_i$. As a result Equation 19 may be rewritten as follows: $\underline{L}_i = G\underline{h}_i$ and inserted into Equation 18 to get: $\underline{t}_i = DG\underline{h}_i + \underline{w}_i$.

The least squares estimate for $\underline{L}_i$ may now be obtained as follows:

$$\underline{\hat{L}}_i = Re\{G(G^H D^H DG)^{-1} G^H D^H \underline{t}_i\} \qquad \text{Equation 22}$$

Figure 28:
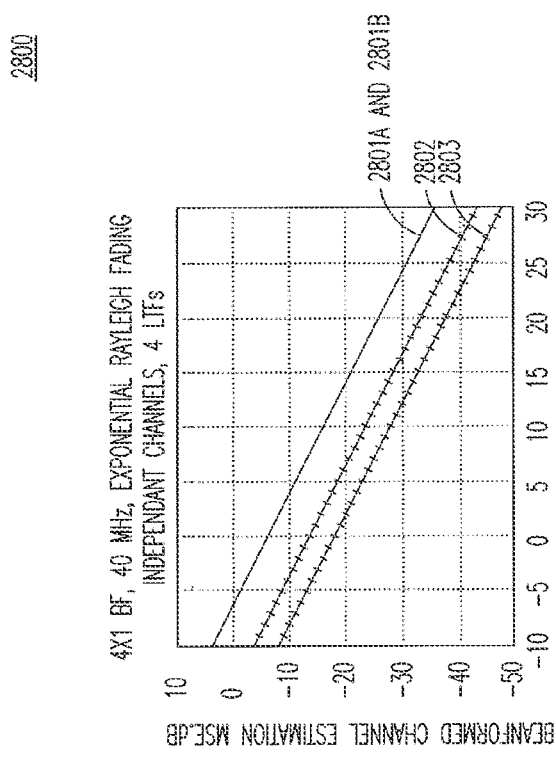
FIG. 28 is a beamformed channel estimation MSE with ZF and LS estimation.

Instead of least-squares, a minimum-mean-squared-estimate (MMSE) may also be obtained, using an estimate of the noise variance. FIG. 28 shows the improvement in channel estimation mean-squared-error when the above algorithm is used 2800. In FIG. 28 the above algorithm may be used with a 4×1 beamformed system over 40 MHz bandwidth with a 50 ns rms delay spread Rayleigh fading channel, using $N_T$=4, $N_R$=1, N=128 and $L_h$=20 and with a 15 ns rms delay spread Rayleigh fading channel, using $N_T$=4, $N_R$=1, N=128 and $L_h$=7. It may be determined that the LS estimation 2802 provides a 7.4 dB gain over the ZF channel estimate 2801a for the 50 ns channel. The LS estimation 2803 provides a 11.8 dB gain over the ZF channel estimate 2801b for the 15 ns channel. The ZF channel estimates 2801a and 2801b have the same performance, independent of the channel delay spread because they do not perform smoothing.

Codebook designs in accordance with yet another embodiment are described herein and may be used in combination with any of the other embodiments described herein. First, a LOS codebook for uniform rectangular array (URA) is disclosed.

Figure 29:
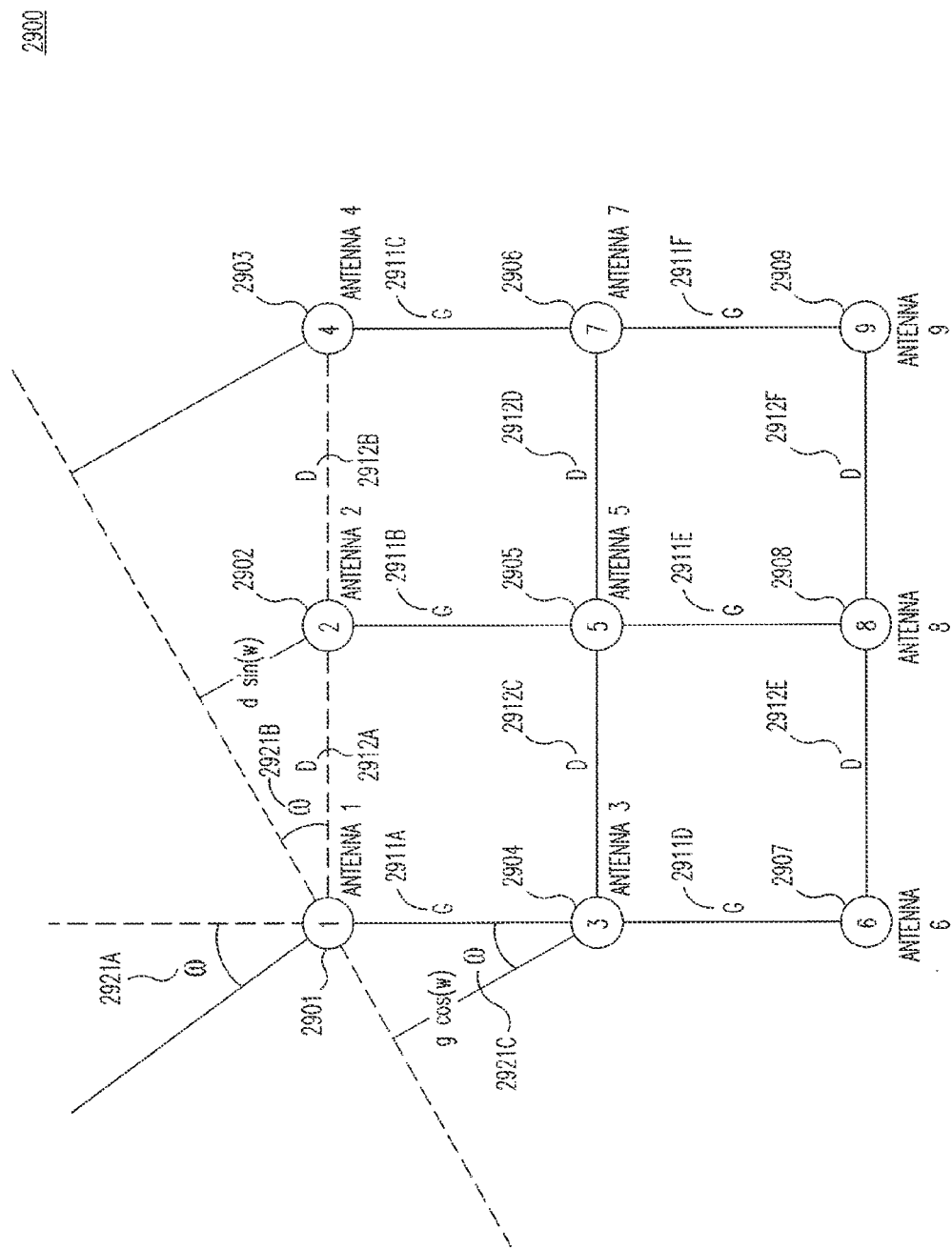
FIG. 29 is an illustration of a uniform rectangular array.

FIG. 29 shows an example with 9 transmit antennas (3×3 rectangular setup) and 1 receive antenna 2900. If the transmitter is equipped with a uniform rectangular array, a LOS codebook may be used, where each codeword is of the form:

$$P_{URA} = \begin{bmatrix} 1 \\ e^{j\theta} \\ e^{j\chi} \\ e^{j2\theta} \\ e^{j(\theta+\chi)} \\ e^{j2\chi} \\ e^{j(2\theta+\chi)} \\ e^{j(\theta+2\chi)} \\ e^{j(2\theta+2\chi)} \end{bmatrix} \qquad \text{Equation 23}$$

where $$\theta = \frac{2\pi d}{\lambda} \sin\omega \qquad \text{Equation 24}$$

and $$\chi = \frac{2\pi\vartheta}{\lambda} \cos\omega \qquad \text{Equation 25}$$

In the example of FIG. 29, d and g are the uniform antenna distance in each direction, λ is the wavelength, and ω is the steering angle. The antenna elements 2901, 2902, 2904, 2903, 2905, 2907, 2906, 2908, and 2909 are labeled 1 to 9 respectively, corresponding to the first element to the 9th element in Equation 23. Different labeling of the antenna elements would lead to reshuffling of the entries in Equation 23. Uniform antenna distances 2911a, 2911b, 2911c, 2911d, 2911e, and 2911f correspond to distance g. Similarly, uniform antenna distances 2912a, 2912b, 2912c, 2912d, 2912e, and 2912f correspond to distance d. Steering angles 2921a, 2921b, and 2921c correspond to ω.

Equation 23 gives the generic form that all codewords within the same codebook may follow, while the actual parameter θ and χ may differ from one codeword to another codeword.

Figure 30:
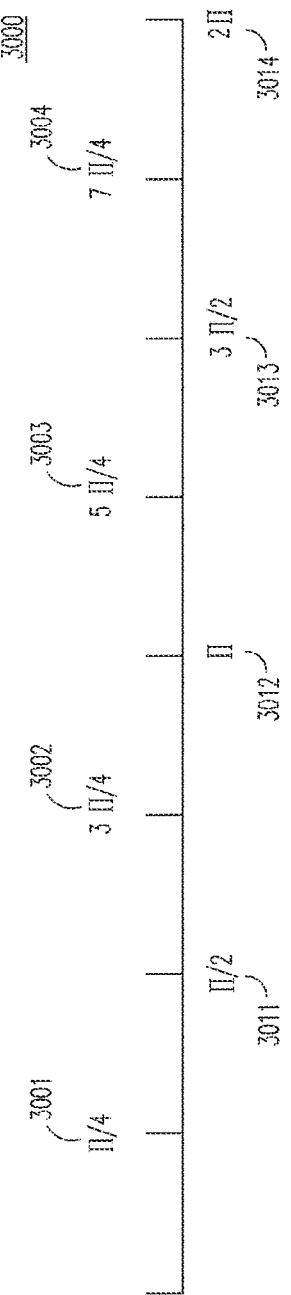
FIG. 30 is an example of quantizing in the range $[0, 2\pi]$ and the values available.

The variables θ and χ may be quantized in the range of [0,2π]. FIG. 30 shows an example of the ranges available 3000. Fine tuning of the ranges may also be possible. For example, θ (or χ) may be quantized to one of four different values of π/4 3001, 3π/4 3002, 5π/4 3003, and 7π/4 3004, which may consume 2 bits. As shown in FIG. 30, any angle between 0 and π/2 3011 may be quantized to π/4 3001; any angle between π/2 3011 and π 3012 may be quantized to 3π/4 3002; any angle between π 3012 and 3π/2 3013 may be quantized to 5π/4 3003; and any angle between 3π/2 3013 and 2π 3014 may be quantized to 7π/4 3004.

Alternatively, since both θ and χ depend on the steering angle ω the steering angle ω may be quantized directly, and each codeword within the LOS codebook may take a form as:

$$P_{URA} = \begin{bmatrix} 1 \\ e^{j\frac{2\pi}{\lambda}d\sin\omega} \\ e^{j\frac{2\pi}{\lambda}d\cos\omega} \\ e^{j2\frac{2\pi}{\lambda}d\sin\omega} \\ e^{j\frac{2\pi}{\lambda}(d\sin\omega+g\cos\omega)} \\ e^{j2\frac{2\pi}{\lambda}g\cos\omega} \\ e^{j\frac{2\pi}{\lambda}(2d\sin\omega+g\cos\omega)} \\ e^{j\frac{2\pi}{\lambda}(d\sin\omega+2g\cos\omega)} \\ e^{j\frac{2\pi}{\lambda}(2d\sin\omega+2g\cos\omega)} \end{bmatrix} \quad \text{Equation 26}$$

Similar codebook structures may be extended in a straightforward manner for a different number of antenna elements. In general, for an N-element rectangular antenna array with $m_i, n_i$ being the distances in terms of the number of unit distances between the origin (the top left corner antenna array element) and the $i^{th}$ antenna element where d is the unit distance in the horizontal direction and g is the unit distance in the vertical direction, each codeword within the codebook may take a form as:

$$P_{URA} = \begin{bmatrix} 1 \\ e^{j(m_1\theta + n_1\chi)} \\ e^{j(m_2\theta + n_2\chi)} \\ e^{j(m_3\theta + n_3\chi)} \\ \ldots \\ \ldots \\ \ldots \\ e^{j(m_{N-1}\theta + n_{N-1}\chi)} \end{bmatrix} \quad \text{Equation 27}$$

Equation 21 gives the generic form that all codewords within the same codebook may follow, while the actual parameter θ and χ differ from one codeword to another codeword. In reality, only the parameters θ and χ (or alternatively the steering angle ω) may be quantized and fed back.

Alternatively or additionally, dual polarization may be used on top of URA to further double the number of antenna elements without increasing the antenna array size. 8 transmit antennas (2×2 horizontal URA and 2×2 vertical ULA vertical) and 1 receive antenna may be used as an example. In this 8-tx example, the first 4 transmit antenna may share horizontal polarization and may take a URA structure, the last 4 transmit antenna may share vertical polarization and may take a URA structure as well. For such a URA-XOP antenna array, each codeword within the LOS codebook may take a form as:

$$P_{XPO-URA} = \begin{bmatrix} 1 \\ e^{j\theta_1} \\ e^{j\theta_2} \\ e^{j(\theta_1+\theta_2)} \\ e^{j\varphi} \\ e^{j(\theta_1+\varphi)} \\ e^{j(\theta_2+\varphi)} \\ e^{j(\theta_1+\theta_2+\varphi)} \end{bmatrix} \quad \text{Equation 28}$$

The steering angle in the horizontal domain may be the same as the steering angle in the vertical domain. The angle φ stands for the phase difference between the horizontal polarization and vertical polarization. Equation 28 gives the generic form that all codewords within the same codebook may follow, while the actual parameter $\theta_1$ and $\theta_2$ and φ differ from one codeword to another codeword. In reality, only the parameters $\theta_1$ and $\theta_2$ and φ may be quantized and fed back.

The codebook structure in Equation 28 may support rank-1 transmissions. To support rank-2 transmissions, each codeword within the LOS codebook may take a form as:

$$Q_{XPO-URA} = \begin{bmatrix} 1 & 1 \\ e^{j\theta_1} & e^{j\tau_1} \\ e^{j\theta_2} & e^{j\tau_2} \\ e^{j(\theta_1+\theta_2)} & e^{j(\tau_1+\tau_2)} \\ e^{j\varphi} & -e^{j\varphi} \\ e^{j(\theta_1+\varphi)} & -e^{j(\tau_1+\varphi)} \\ e^{j(\theta_2+\varphi)} & -e^{j(\tau_2+\varphi)} \\ e^{j(\theta_1+\theta_2+\varphi)} & -e^{j(\tau_1+\tau_2+\varphi)} \end{bmatrix} \quad \text{Equation 29}$$

It is noted that the second column is guaranteed to be orthogonal to the first column, by the design in Equation 29.

Similar codebook structures may be extended in a straightforward manner for a different numbers of antenna elements and other polarization combinations.

Figure 31:
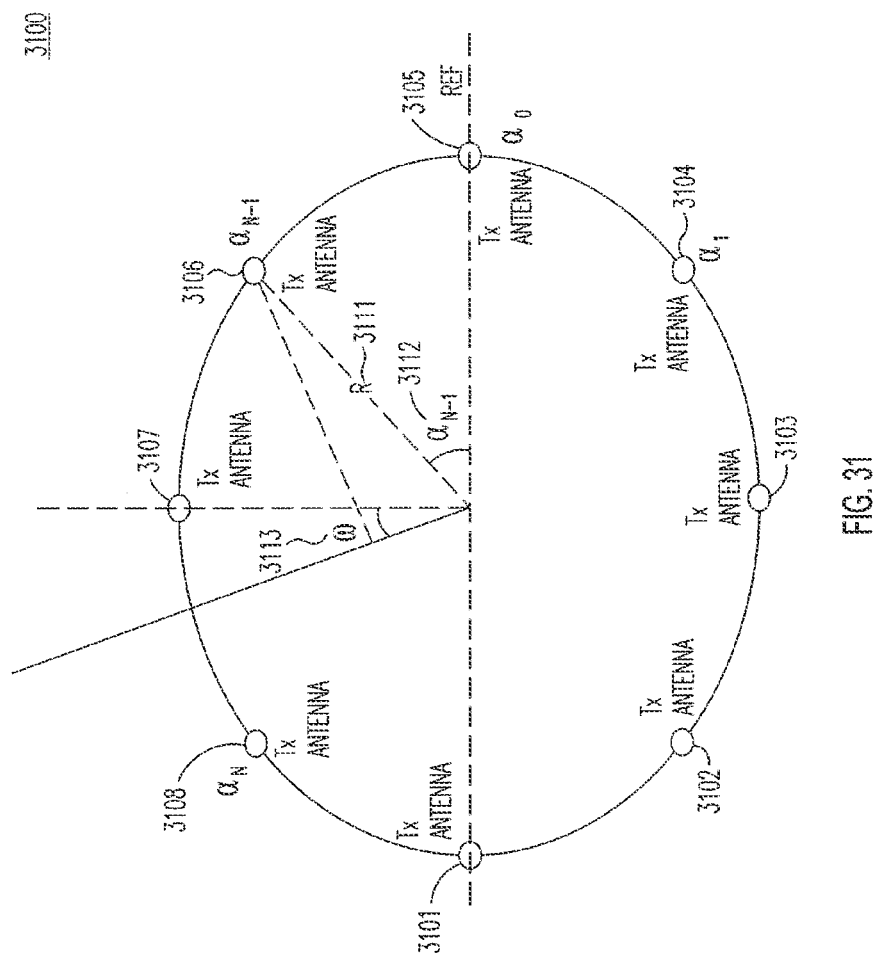
FIG. 31 is an illustration of a uniform circular array.

An LOS codebook design for uniform circular array (UCA) in accordance with yet another embodiment is described herein and may be used in combination with any of the other embodiments described herein. FIG. 31 shows an example of how a circular array may be used to increase the number of antenna elements further, with a relatively constrained antenna array size 3100. Nt transmit antennas and 1 receive antenna are used as an example, where the Nt transmit antennas 3101, 3102, 3103, 3104, 3105, 3106, 3107, and 3108 are uniformly distributed on a uniform circle with radius r 3111. Each antenna element is placed with an angle of $\alpha_n$ 3112 relative to a fixed reference line (the horizontal dashed line in the diagram) going through the origin. The steering angle ω 3113 is with reference to the vertical dashed line in FIG. 31. For such a UCA array as shown, a LOS codebook may be used where each codeword within takes a form as:

$$P_{UCA} = \begin{bmatrix} e^{j\theta_0} \\ e^{j\theta_1} \\ e^{j\theta_2} \\ e^{j\theta_3} \\ \vdots \\ \vdots \\ e^{j\theta_{N-1}} \end{bmatrix}$$

Equation 30 where $$\theta_n = \frac{2\pi r}{\lambda}\sin(\alpha_n - \omega)$$

Equation 31

When more than one transmit antenna array geometry/structure is supported, the overall LOS codebook may be a concatenation of the different LOS codebooks shown above.

Higher rank codebooks in accordance with yet another embodiment are described herein and may be used in combination with any of the embodiments described herein. The following method may be used to construct a rank-N codeword $W_0$ based on an orthogonal matrix Q and a rank-1 codeword $P_0$. When Q is chosen as a N*n orthogonal matrix, the same method may be used to construct a rank-n codeword.

Let $$P_o = \begin{bmatrix} e^{j\theta_0} \\ e^{j\theta_1} \\ e^{j\theta_2} \\ e^{j\theta_3} \\ \vdots \\ \vdots \\ e^{j\theta_{N-1}} \end{bmatrix}$$

Equation 32 be any codeword within a rank-1 codebook. All entries of the codeword may share the same amplitude.

Let Q=[Q1 Q2 ... QN] be an arbitrary orthogonal matrix, where Q1 is the first column of Q, Q2 is the second column of Q, ..., and QN is the Nth column of Q.

Define the matrix-vector product between matrix Q and vector $P_0$ as:

$$W_0 = Q \odot P_0 = [Q1 \odot P_0 \; Q2 \odot P_0 \; \ldots \; QN \odot P_0]$$

Equation 33 such that the $i^{th}$ column of the product matrix is an element-wise product between the $i^{th}$ column of Q and $P_0$.

When the above method is applied to all rank-1 codewords within a rank-1 codebook, a new rank-n codebook may be constructed containing all rank-n codewords.

Multi-resolution explicit feedback in accordance with yet another embodiment is described herein and may be used in combination with any of the other embodiments described herein.

In explicit feedback, the information fed back may be represented by a finite number of bits $b_0, b_1, b_2, \ldots, b_{t-1}$, where t is the number of bits to represent a scalar or an angle depending on the type of feedback, which may be referred to as the feedback precision. In this representation, $b_0$ is the least significant bit (LSB) and $b_{t-1}$ is the most significant bit (MSB). Depending on the SU/MU operation or desired accuracy, t=4, 5, 6, 7, 8, or 9 and may be configurable. The information may represent a uniformly quantized scalar from explicit CSI feedback, non-compressed beamforming weights feedback, or may represent a quantized parametric angle Φ (within the range of [0, 2π]) or Ψ (within the range of [0, π/2]) from Givens rotation based decomposition compressed beamforming weights feedback.

FIG. 32 shows an example of multi-resolution explicit feedback 3200. In multi-resolution feedback the channel may be fed back in multiple separate elements or instances (for example over time or frequency). Also, the n MSBs may be sent in one instance or elememt and the (t–n) LSBs may be sent in a second instance or element. The AP may then combine the feedback elements to form a full precision t-bit feedback. In this manner, the system may adapt the amount of feedback to the uplink channel capacity and still achieve the feedback accuracy needed for schemes that require high feedback accuracy. It also may allow for channel tracking with reduced feedback overhead in the case that there is a change in the channel over the (t–n) LSBs only. In both cases, the MSBs may not be changing during this period. In the example of FIG. 32, feedback instance 1 3201, feedback instance 2 3202, feedback instance 3 3203, feedback instance 4 3204, feedback instance 5 3205, feedback instance 6 3206, and feedback instance 7 3207 may be used in such a way that combining the separate feedback instances increases the accuracy of the fed back channel.

FIG. 33 shows an example signaling packet to set up multi-resolution feedback 3300. Information may be placed in a multi-resolution feedback initialization MAC packet to enable the AP or WTRU to request specific multi-resolution feedback parameters. A multi-resolution feedback ACK may be sent to acknowledge that the parameters have been understood and accepted. The explicit feedback type used 3301 including but not limited to CSI feedback, non-compressed beamforming weight feedback, or Givens-rotation-based compressed beamforming weight feedback may be included. The overall feedback precision 3302 may be included. In explicit CSI or non-compressed beamforming weight based feedback, there may be a single feedback precision value. In Givens-rotation-based feedback, there may be two independent feedback precision values (one for angles Φ and one for angles Ψ). The number of resolution elements 3304 required to feed back the channel with desired feedback precision may be included. For example, multi-resolution feedback implies more than two feedback elements or instances. The identifier and resolution of each feedback element or instance may be included. Each feedback element or instance may be assigned a feedback resolution index and a corresponding feedback resolution in bits. The sum of the feedback resolution bits for all the elements or instances may be equal to the overall feedback precision. For example in multi-resolution feedback, instance 1 is assigned FB resolution 1, n bits 3305 and instance 2 is assigned FB resolution 2, t–n bits 3306. In the case of Givens rotation based decomposition feedback, instances 1 and 2 for 0 may be assigned FB resolution 1, n bits 3305 and FB resolution 2, t–n bits 3306 while instances 1 and 2 for W may be assigned FB resolution 1, m bits and FB resolution 2, u–m bits, where t and u may be the overall precision in bits, and n and m may be the resolution of the second instance. An overall feedback precision field 3303 and additional FB index 1 3307 and FB index 2 3308 may also be included.

FIG. 34 shows additional information that may be included in the case of Givens-rotation-based feedback

3400. Additional fields may include a feedback resolution index 3401 and the existing feedback packet 3402. During the feedback process, this information may be used to indicate the feedback index of the current feedback packet.

FIG. 35 shows an example in which a VHT MIMO control field may be modified to support multicomponent feedback 3500. A VHT compressed beamforming frame may be utilized to feed back beamforming matrix (V matrix). The VHT compressed beamforming frame may be an action frame, and the VHT MIMO Control field, the VHT compressed BF report field, and the MU exclusive BF report field may be included in the frame body. The VHT MIMO Control field may include an Nc index 3501, Nr index 3502, FB resolution index 3503, channel width 3504, grouping 3505, codebook information 3506, feedback type 3507, remaining segment 3508, first segment 3509, reserved field 3510, and sounding segment 3511. Also a multi-resolution feedback bit may also be added to allow the WTRU to adaptively change between single resolution and multi-resolution feedback.

FIG. 36A-36B show a comparison between a single resolution feedback packet and two multi-resolution feedback packets 3600. FIG. 36A shows the single resolution feedback packet 3601 may include a preamble 3611, MAC header 3612, VHT MIMO control field 3613, compressed beamforming report for Φ 3614, and compressed beamforming report for W 3615.

FIG. 36B shows an example of two multi resolution feedback packets 3602, which each may include a preamble 3621 and 3631 respectively, a MAC header 3622 and 3632 respectively, a VHT MIMO control element for FB element index 1 3623 or 2 3633, compressed beamforming report for Φ 3624 and 3634 respectively, and compressed beamforming report for W 3625 and 3535 respectively.

Figure 37:
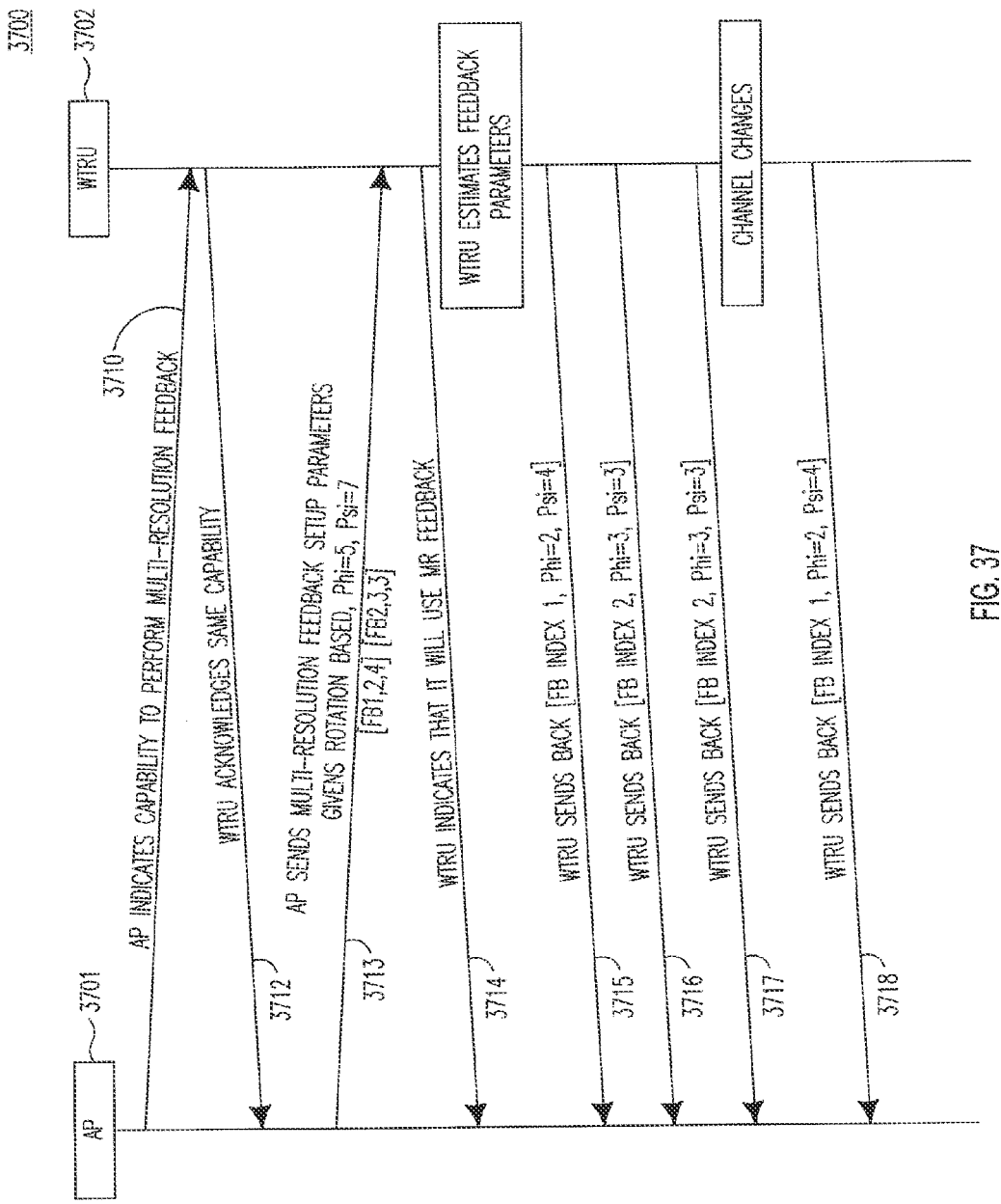
FIG. 37 is an example procedure of multi-resolution Givens rotation based feedback.

FIG. 37 shows an example procedure that may be defined to use multi-resolution quantization for a WTRU using Givens-rotation-based compressed beamforming feedback 3700. AP 3701 and WTRU 3700 may exchange capability information to verify that both devices support multi-resolution feedback 3710. WTRU 3702 may acknowledge the same capability 3712. AP 3701 may send information to WTRU 3702 to indicate that Givens rotation based decomposition multi-resolution feedback may be used for the packets that follow and may specify multi-resolution feedback parameters 3713. Overall precision of the feedback required for the parameterized angles Φ (e.g 5-bits) and W (e.g. 7-bits) may be defined. The number of feedback resolution indices may be defined; for example the number of feedback resolution indices may be two. The resolution required for each feedback element may also be defined.

WTRU 3702 may then transmit a multi-resolution feedback ACK to AP to indicate that it may use multi-resolution feedback 3714 going forward. WTRU 3702 may also estimate feedback parameters and quantize Φ and Ψ using the desired number of bits. WTRU 3702 may then transmit one or more feedback packets to the AP with information indicating the FB resolution ID. WTRU 3702 may transmit element 1 with FB indexl 3715 initially. WTRU 3702 may transmit element 2 with FB index 2 repeatedly 3716 and 3717 based on changes to channel. Alternatively or additionally, WTRU 3702 may send elements 1 and 2 based on a previously agreed upon schedule. WTRU 3702 may also update element 1 with FB index 1 3718 on demand, or may update it periodically.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) for providing beamforming feedback, the method comprising:

receiving a sounding frame;

performing a first measurement on the sounding frame;

performing a first decomposition on the performed first measurement;

performing a second decomposition on the performed first measurement to generate a set of resulting angles;

selecting a first subset of the set of resulting angles and a second subset of the set of resulting angles, wherein the first subset of the set of resulting angles is distinct from the second subset of the set of resulting angles;

quantizing each angle of the set of resulting angles to generate quantized angles by:

determining a first range based on first angle statistics associated with the first subset of the set of resulting angles, assigning the first range to each angle of the first subset of the set of resulting angles, determining a second range based on second angle statistics associated with the second subset of the set of resulting angles, and assigning the second range to each angle of the second subset of the set of resulting angles, wherein the first range is different than the second range; and transmitting the quantized angles in a feedback frame.

2. The method of claim 1 wherein the first decomposition is a singular value decomposition (SVD).

3. The method of claim 1 wherein the second decomposition is a Givens rotation based decomposition.

4. The method of claim 1 wherein the feedback frame is a codebook component feedback frame.

5. The method of claim 1 wherein the feedback frame includes results of a monitored transmission by another WTRU.

6. The method of claim 1 further comprising:

performing a second measurement on the sounding frame;

performing a third decomposition on the performed second measurement;

performing a fourth decomposition on the performed second measurement to generate a second set of resulting angles;

calculating a difference between the set of resulting angles and the second set of resulting angles to determine differential resulting angles;

selecting a first subset of the set of differential resulting angles and a second subset of the set of differential resulting angles, wherein the first subset of the set of differential resulting angles is distinct from the second subset of the set of differential resulting angles;

quantizing each differential resulting angle by:
- determining a third range based on third angle statistics associated with the first subset of the set of differential resulting angles,
- assigning a third range to each angle of the first subset of the set of differential resulting angles,
- determining a fourth range based on fourth angle statistics associated with the second subset of the set of differential resulting angles, and
- assigning the fourth range to each angle of the second subset of the set of differential resulting angles,
- wherein the third range is different than the fourth range; and transmitting the quantized differential resulting angles in a second feedback frame.

7. The method of claim 1 wherein the quantized angles are transmitted in multiple frames.

8. The method of claim 1 wherein the feedback frame comprises a plurality of subframes, wherein each subframe includes a separate cyclic redundancy check (CRC).

9. The method of claim 1 wherein the feedback frame comprises a plurality of subframes, wherein feedback bits are assigned to each subframe based on significance.

10. The method of claim 1 wherein the feedback frame is transmitted in a plurality of feedback elements.

11. A wireless transmit/receive unit (WTRU) configured for providing beamforming feedback, the WTRU comprising:
- a receiver configured to receive a sounding frame;
- a processor configured to:
  - perform a first measurement on the sounding frame,
  - perform a first decomposition on the performed first measurement,
  - perform a second decomposition on the performed first measurement to generate a set of resulting angles,
  - select a first subset of the set of resulting angles and a second subset of the set of resulting angles, wherein the first subset of the set of resulting angles is distinct from the second subset of the set of resulting angles,
  - quantize each angle of the set of resulting angles to generate quantized angles by:
    - determining a first range based on first angle statistics associated with the first subset of the set of resulting angles,
    - assigning the first range to each angle of the first subset of the set of resulting angles,
    - determining a second range based on second angle statistics associated with the second subset of the set of resulting angles, and
    - assigning the second range to each angle of the second subset of the set of resulting angles,
    - wherein the first range is different than the second range; and
- a transmitter configured to transmit the quantized angles in a feedback frame.

12. The WTRU of claim 11 wherein the first decomposition is a singular value decomposition (SVD).

13. The WTRU of claim 11 wherein the second decomposition is a Givens rotation based decomposition.

14. The WTRU of claim 11 wherein the feedback frame is a codebook component feedback frame.

15. The WTRU of claim 11 wherein the feedback frame includes results of a monitored transmission by another WTRU.

16. The WTRU of claim 11 wherein the quantized angles are transmitted in multiple frames.

17. The WTRU of claim 11 wherein the feedback frame comprises a plurality of subframes, wherein each subframe includes a separate cyclic redundancy check (CRC).

18. The WTRU of claim 11 wherein the feedback frame comprises a plurality of subframes, wherein feedback bits are assigned to each subframe based on significance.

19. The WTRU of claim 11 wherein the feedback frame is transmitted in a plurality of feedback elements.

20. The WTRU of claim 11,
- wherein the processor is further configured to:
  - perform a second measurement on the sounding frame,
  - perform a third decomposition on the performed second measurement,
  - perform a fourth decomposition on the performed second measurement to generate a second set of resulting angles,
  - calculate a difference between the set of resulting angles and the second set of resulting angles to determine differential resulting angles,
  - select a first subset of the set of differential resulting angles and a second subset of the set of differential resulting angles, wherein the first subset of the set of differential resulting angles is distinct from the second subset of the set of differential resulting angles; and
  - quantize each differential resulting angle by:
    - determining a third range based on third angle statistics associated with the first subset of the set of differential resulting angles,
    - assigning a third range to each angle of the first subset of the set of differential resulting angles,
    - determining a fourth range based on fourth angle statistics associated with the second subset of the set of differential resulting angles, and
    - assigning the fourth range to each angle of the second subset of the set of differential resulting angles,
    - wherein the third range is different than the fourth range; and
- wherein the transmitter is further configured to transmit the quantized differential resulting angles in a second feedback frame.

* * * * *